United States Patent [19]

Magliveras et al.

[11] Patent Number: 6,038,317
[45] Date of Patent: Mar. 14, 2000

[54] SECRET KEY CRYPTOSYSTEM AND METHOD UTILIZING FACTORIZATIONS OF PERMUTATION GROUPS OF ARBITRARY ORDER $2^L$

[76] Inventors: Spyros S. Magliveras, 3010 Jackson Dr., Lincoln, Nebr. 68502; Van Trung Tran, Mombertplatz 35, 69126 Heidelberg; Tamas Horvath, Maxstrasse 22, 45127 Essen, both of Germany

[21] Appl. No.: 09/057,123

[22] Filed: Apr. 8, 1998

Related U.S. Application Data

[60] Provisional application No. 60/068,811, Dec. 24, 1997.

[51] Int. Cl.$^7$ .......................................... H04L 9/28
[52] U.S. Cl. ................................. 380/28; 380/37; 380/43
[58] Field of Search ................................. 380/28, 29, 37, 380/42, 43; 708/250, 254, 255

[56] References Cited

U.S. PATENT DOCUMENTS

| | | | |
|---|---|---|---|
| 3,962,539 | 6/1976 | Ehrsan et al. | 380/29 |
| 4,078,152 | 3/1978 | Tuckerman | 178/22 |
| 4,200,770 | 4/1980 | Hellman et al. | 380/30 |
| 4,405,829 | 9/1983 | Rivest et al. | 380/30 |
| 4,850,019 | 7/1989 | Shimizu et al. | 380/29 |
| 5,003,597 | 3/1991 | Merkle | 380/37 |
| 5,214,703 | 5/1993 | Massey et al. | 380/37 |
| 5,270,956 | 12/1993 | Oruc et al. | 380/28 X |
| 5,276,737 | 1/1994 | Micali | 380/30 |
| 5,351,299 | 9/1994 | Matsuzaki et al. | 380/29 |
| 5,511,123 | 4/1996 | Adams | 380/29 |
| 5,515,307 | 5/1996 | Aiello et al. | 364/717 |
| 5,577,123 | 11/1996 | Shimada | 380/30 |
| 5,740,250 | 4/1998 | Moh | 380/28 |

OTHER PUBLICATIONS

"A New Random Number Generator from Permutation Groups", S. S. Magliveras, B. A. Oberg and A. J. Surkan, *Rend. del Sem. Matemat. e Fis. di Milano*, LIV (1984), pp. 203–223.

"A cryptosystem from logarithmic signatures of finite groups", S. S. Magliveras, *Proceedings of the 29'th Midwest Symposium on Circuits and Systems*, Elsevier Publishing Company (1986), pp. 972–975.

"The Linear Complexity Profile of Cryptosystem PGM", S. S. Magliveras and N. D. Memon, *Congressus Numerantium*, Utilitas Mathematica, 72 (1989), pp. 51–60.

"On Logarithmic Signatures and Applications", N. D. Memon, *M.Sc. Thesis, University of Nebraska–Lincoln*, (1989), pp. 1–59.

"Complexity tests for cryptosystem PGM", S. S. Magliveras, N. D. Memon and K.C. Tam, *Congressus Numerantium*, Utilitas Mathematica, 79 (1990), pp. 61–68.

"Algebraic Properties of Cryptosystem PGM", S. S. Magliveras and N. D. Memon, *Journal of Cryptology*, 5 (1992), pp. 167–183.

"Factorizations of elementary Abelian p–groups and their cryptographic significance", M. Qu and S. A. Vanstone, J. of Cryptology, 7 (1994), pp. 201–212.

"A Parallel Permutation Multiplier for a PGM Crypto–chip", T. Horváth, S. Magliveras, Tran van Trung, *Advances in Cryptology—CRYPTO'94*, Springer–Verlag 1994, pp. 108–113.

*Primary Examiner*—Pinchus M. Laufer
*Attorney, Agent, or Firm*—James D. Welch

[57] ABSTRACT

A secret-key block-cipher utilizing the principles of factorization and composition with respect to general logarithmic signatures in permutation groups of arbitrary size $2^l$, and methods of use thereof are disclosed. The preferred embodiment uses two encryption/decryption stages from composition and factorization means including novel and efficient circuits for multiplication and inversion of permutations, operating in their compact form representation. The system is scalable to any input/output block size l and performs encryption/decryption at very high data rates.

25 Claims, 11 Drawing Sheets

$$\mathbb{Z}_{|G|}$$

$$\lambda^{-1}$$

$$\tilde{\alpha} = \lambda^{-1}\Theta_\alpha$$

$$\mathbb{Z}_{r_0} \oplus \cdots \oplus \mathbb{Z}_{r_{w-1}} \longrightarrow G$$

$$\Theta_\alpha$$

Figure 5.

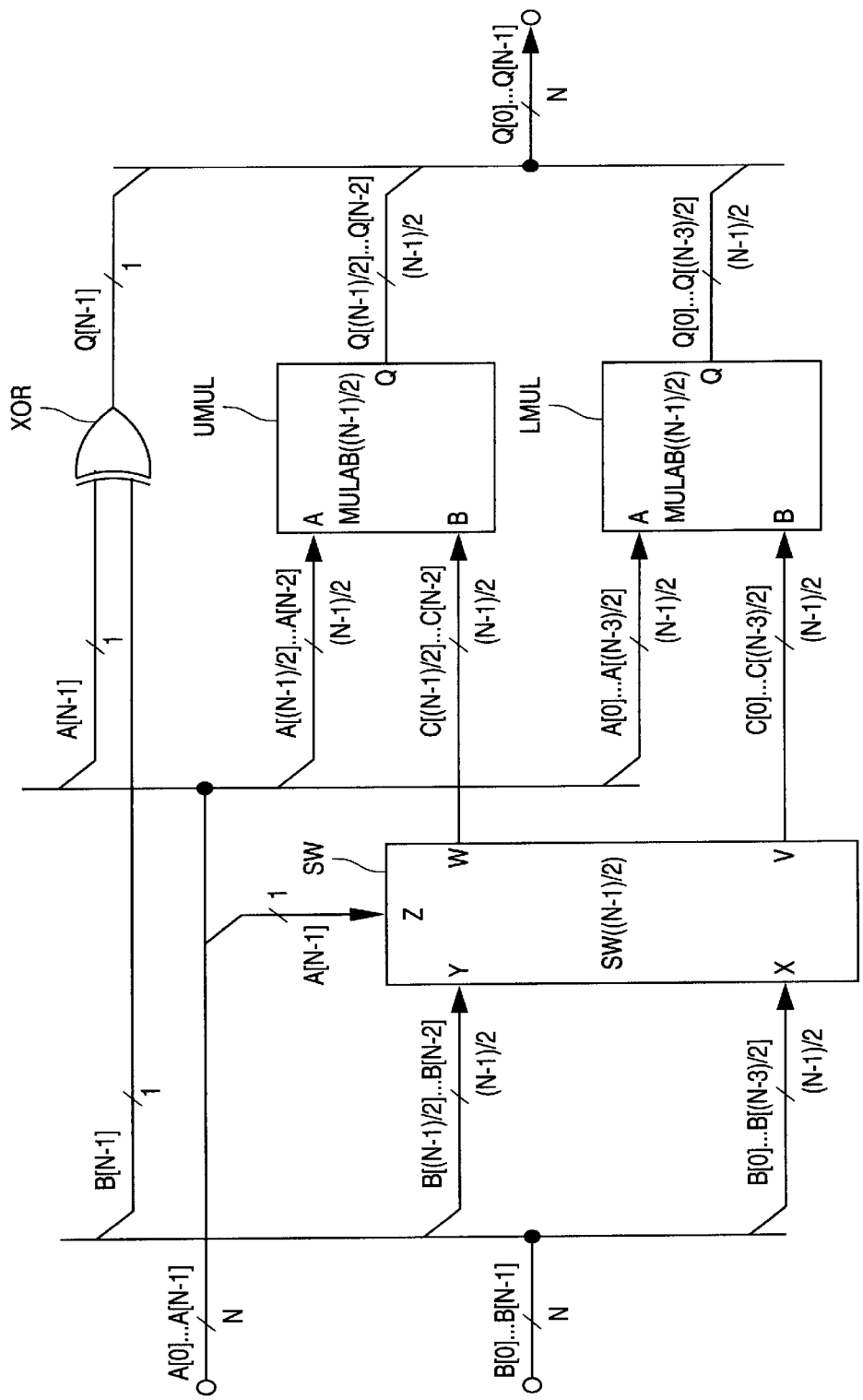
Fig. 6 Multiplier MULAB(N) for computing A.B

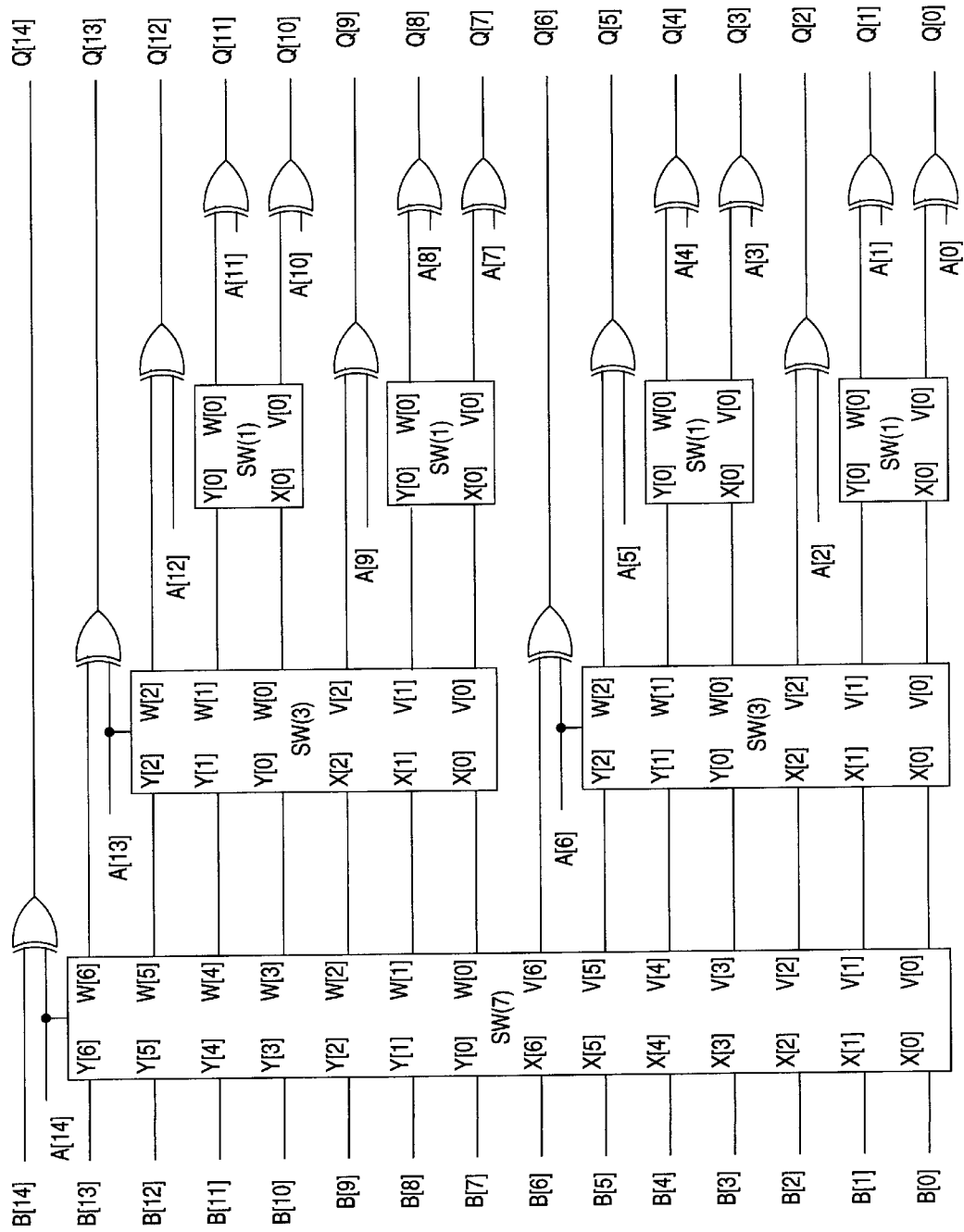
Fig. 7 Multiplier MULAB(15) for A.B(15)

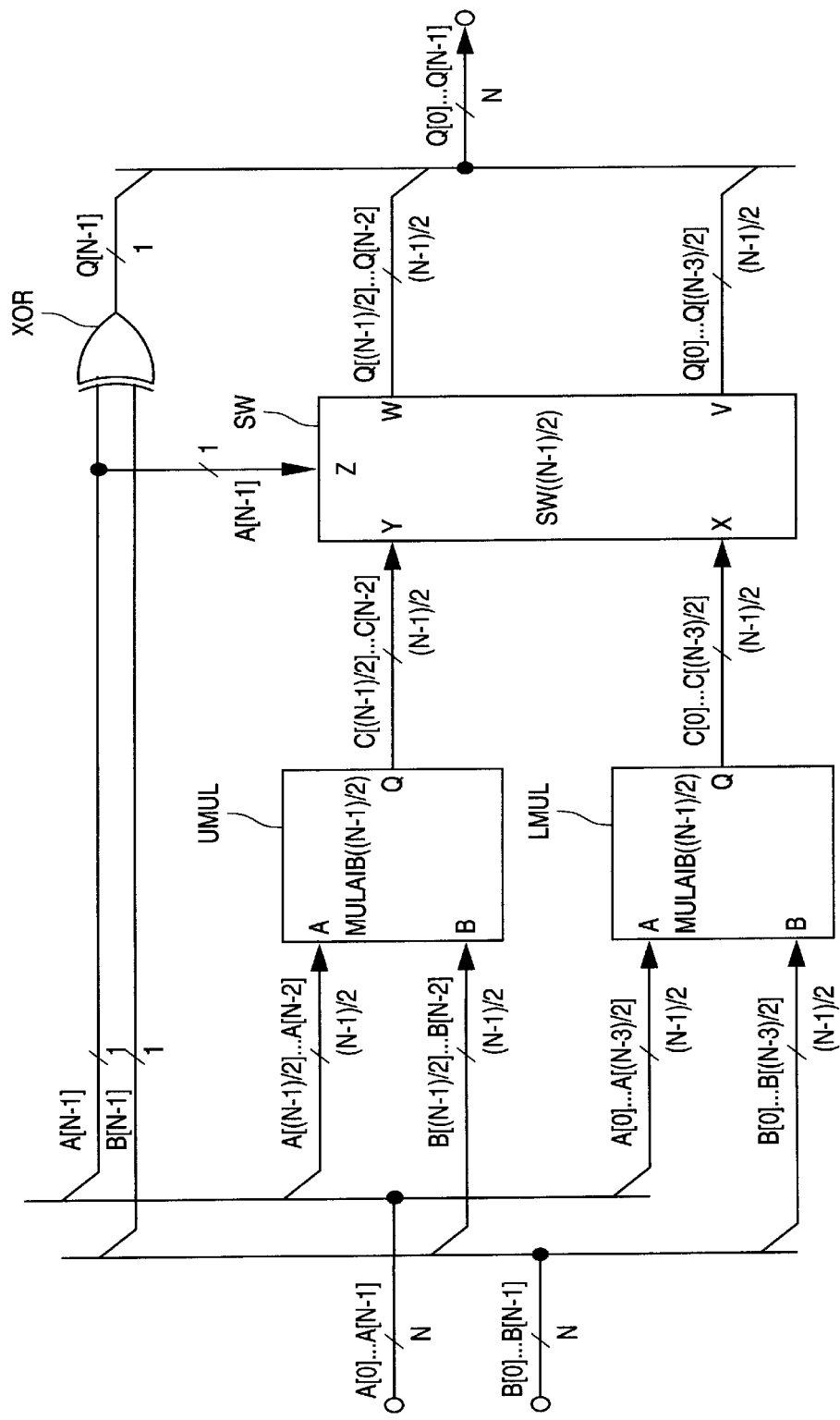
Fig. 8 Multiplier MULAIB(N) for computing $A^{-1} \cdot B$

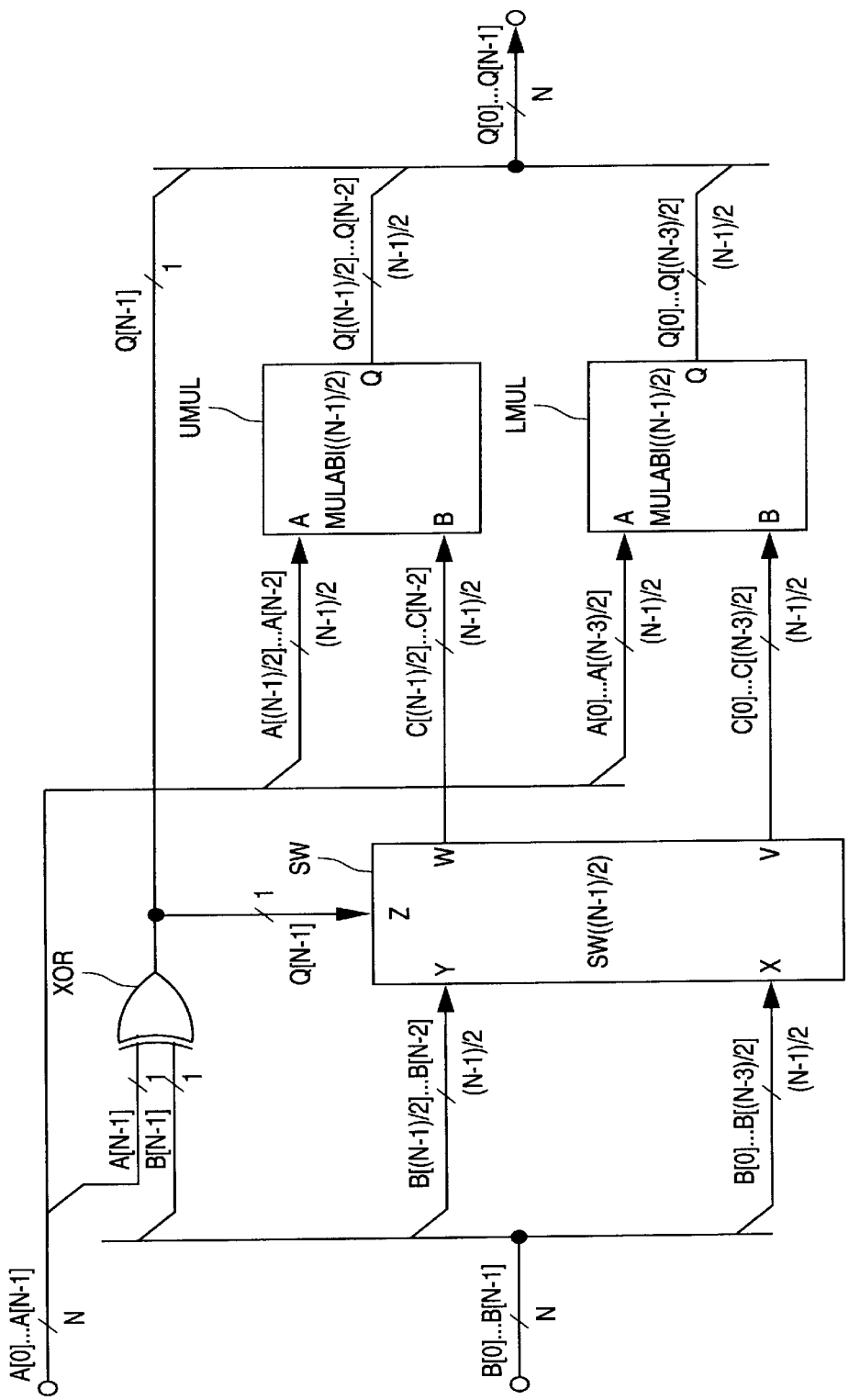
Fig. 9 Multiplier MULABI(N) for computing $A \cdot B^{-1}$

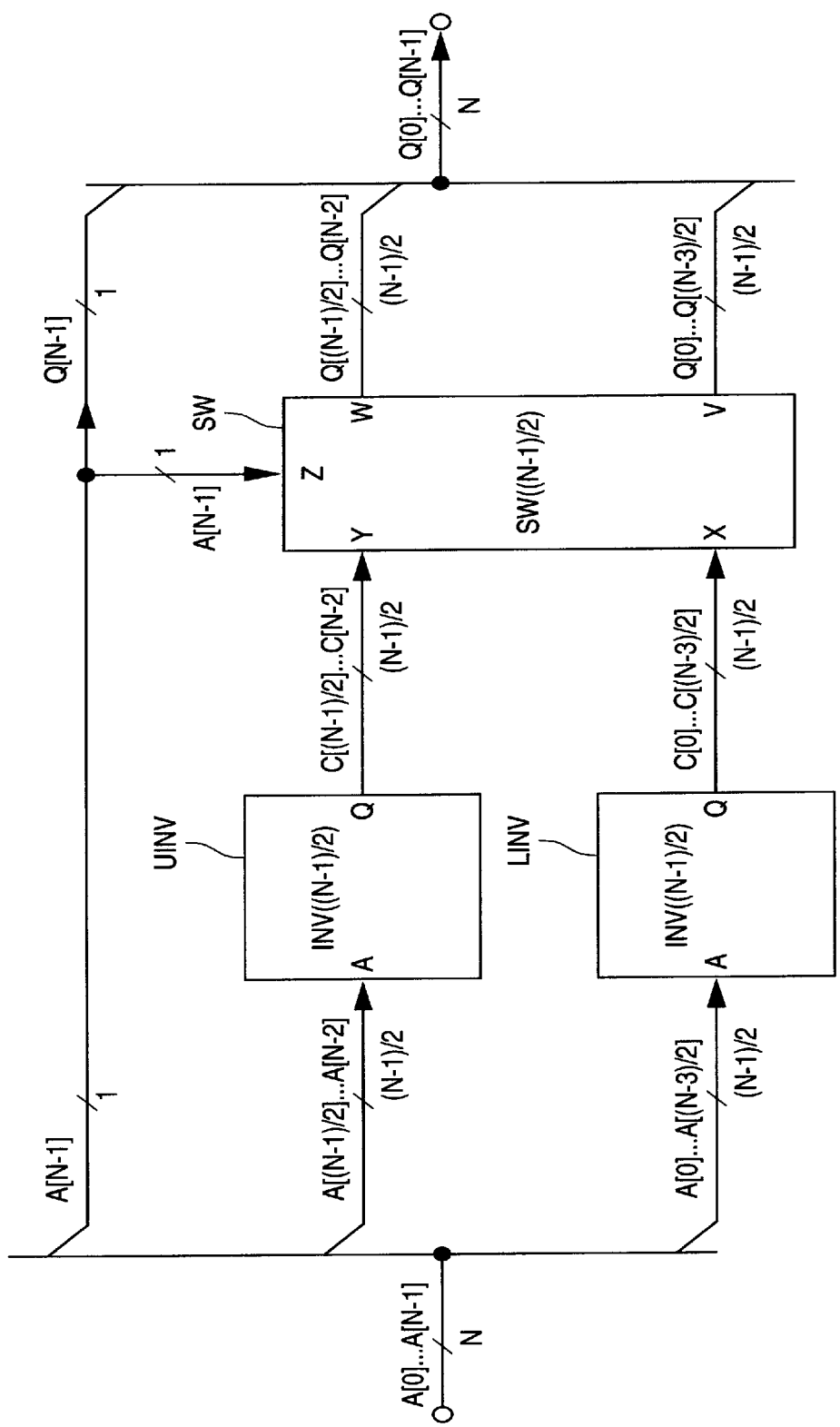
Fig. 10 Inverter INV1(N) for computing $A^{-1}$

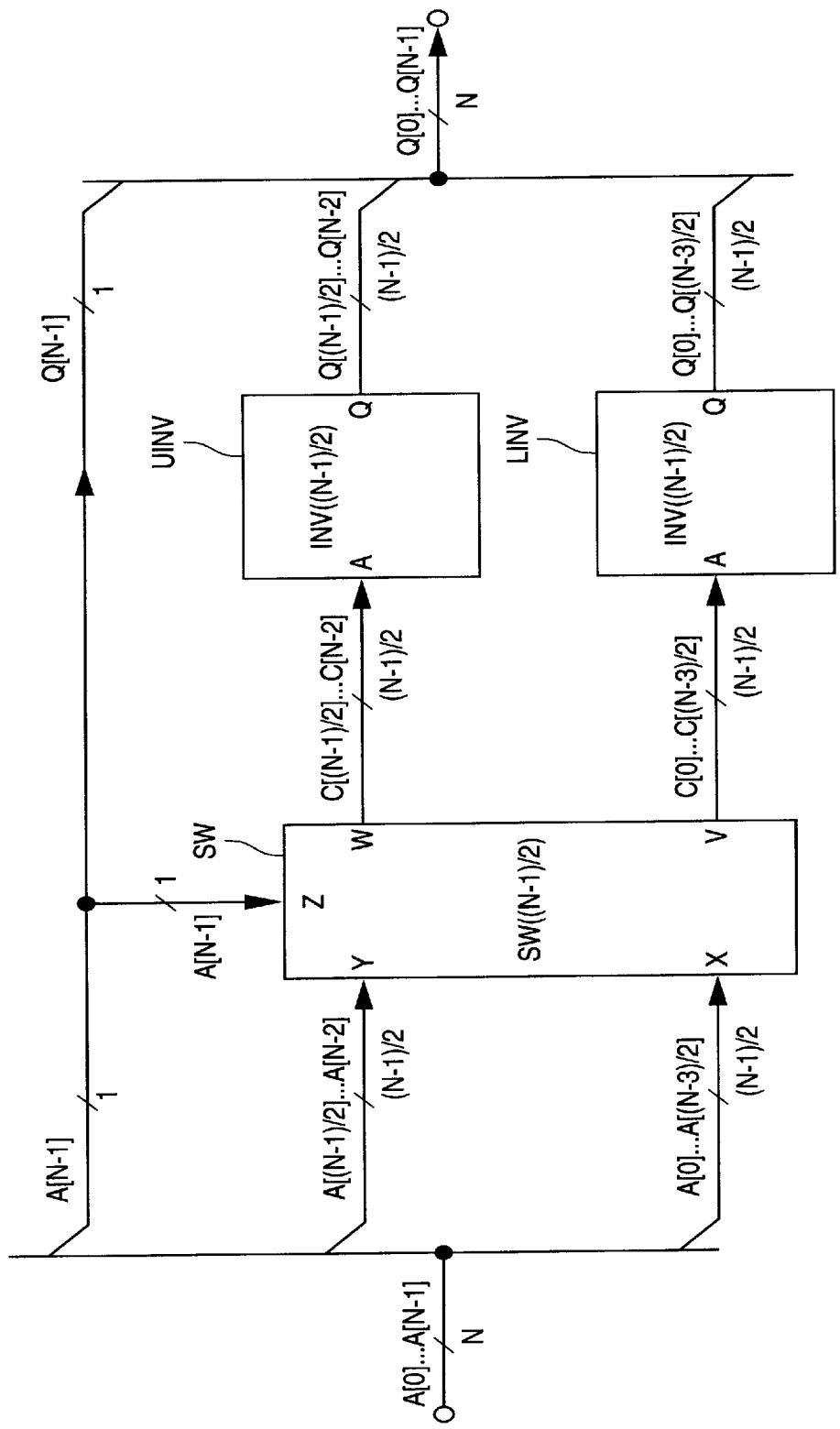
Fig. 11 Inverter INV2(N) for computing $A^{-1}$

SECRET KEY CRYPTOSYSTEM AND METHOD UTILIZING FACTORIZATIONS OF PERMUTATION GROUPS OF ARBITRARY ORDER $2^L$

This application claims the benefit of U.S. Provisional No. 60/068,811 filed Dec. 24, 1997.

TECHNICAL FIELD

The present invention relates to secret key cryptosystems and more particularly is a secret key block cipher utilizing logarithmic signatures of permutation groups of arbitrary order $2^l$, and method of use thereof. The system is scalable to an arbitrary input/ouput block size l, and operates at very high speeds. The present invention is also a new and efficient method of representing and/or multiplying and/or factoring elements of said permutation groups with respect to said logarithmic signatures. Preferred embodiment uses two logarithmic signatures and two encryption stages selected from composition and factorization means. Said two logarithmic signatures, are obtained by a randomization process seeded by a user key. The encryption transformation is performed using a multiplier means operating on input vectors in compact form.

BACKGROUND OF THE INVENTION

Related Work

Our new cryptosystem will be referred to as TST from the initials of the first names of the inventors. TST is theoretically related to, yet dramatically different from cryptosystem PGM which is, to our knowledge, the only cryptosystem based on factorizations of arbitrary non-abelian permutation groups.

Private key cryptosystem PGM was invented by S. Magliveras in the late 1970's. The system was described in his paper titled "A cryptosystem from logarithmic signatures of finite groups", *Proceedings of the 29th Midwest Symposium on Circuits and Systems,* Elsevier Publishing Company (1986), pp 972–975. An earlier paper by S. S. Magliveras, B. A. Oberg and A. J. Surkan, titled "A New Random Number Generator from Permutation Groups", Rend. del Sem. Matemat. e Fis. di Milano, LIV (1984), pp 203–223 also discusses PGM. The statistical and algebraic properties of PGM were studied by S. S. Magliveras and N. D. Memon in their papers "Algebraic Properties of Cryptosystem PGM", *Journal of Cryptology,* 5 (1992), pp 167–183, and "The Linear Complexity Profile of Cryptosystem PGM", *Congressus Numerantium,* Utilitas Mathematica, 72 (1989), pp 51–60. Additional related work appeared in the papers: "Complexity tests for cryptosystem PGM, *Congressus Numerantium,* Utilitas Mathematica, 79 (1990). pp 61–68, by S. S. Magliveras, N. D. Memon and K. C. Tam, and in "Factorizations of elementary Abelian p-groups and their cryptographic significance", J. of Cryptology, 7 (1994), pp 201–212 by M. Qu and S. A. Vanstone. Here we include only a brief description of PGM.

PGM is based on certain fundamental data structures for permutation groups, which are called logarithmic signatures. Let G be a permutation group of degree n. A logarithmic signature for G is an ordered collection $\alpha=(A_0, A_1, \ldots, A_{w-1})$ of ordered subsets $A_i=(a_{i,0}, \ldots, a_{i,r_i-1})$ of G, such that each element $g \in G$ has a unique representation as a product of the form $$g = a_{0,x_0} \cdot a_{1,x_1} \cdots a_{w-1,x_{w-1}}, a_{i,x_i} \in A_i \tag{1}$$

Thus, g corresponds to a unique vector $x=(x_0, \ldots, x_{w-1})$, where $0 \leq x_i \leq r_i = |A_i|$. The property that $(A_0, \ldots, A_{w-1})$ is a logarithmic signature can best be described by means of the equation:

$$G = A_0 \cdots A_{w-2} \cdot A_{w-1} \tag{2}$$

holding in the group ring $\mathbb{Z}G$. It is a necessary condition for cryptographic security that the order of G be exponential in n, while for computational efficiency it is necessary that $$v = \sum_{i=0}^{w-1} r_i$$

be bounded by a polynomial in n.

The $A_i$ are called the blocks of $\alpha$, the vector of block lengths $r=(r_0, \ldots, r_{w-1})$ is called the type of $\alpha$, and $$v = \sum_{i=0}^{w-1} r_i$$

is called the length of $\alpha$. There are tame logarithmic signatures i.e. those for which the factorization for each g can be obtained in time polynomial in n, supertame signatures (the factorization can be obtained in time $O(n^2)$) and there are wild signatures for which the factorization requires time $O(|G|)$. The question of existence of tame logarithmic signatures has been settled. It has been shown that each member of an extremely large class of signatures is tame. This is the class of so called transversal logarithmic signatures. There exist an even larger number of non-transversal logarithmic signatures (see "On Logarithmic Signatures and Applications", M. Sc. Thesis, University of Nebraska—Lincoln, (1989), pp 1–59), but the question of whether the class of non-transversal logarithmic signatures is identical with the class of wild signatures is open and appears to be equivalent to the complexity-theory question P≠NP. Surprisingly, the smallest group which has non-transversal logarithmic signatures is the cyclic group $\mathbb{Z}_8$. Let $\Lambda=\Lambda(G)$ denote the family of all logarithmic signatures of a given group G.

Each signature $\alpha \in \Lambda$ of type $(r_0, \ldots, r_{w-1})$ induces a bijection $\alpha: \mathbb{Z}_{|G|}(\approx \mathbb{Z}_{r_0} \oplus \ldots \oplus \mathbb{Z}_{r_{w-1}}) \to G$, which is efficiently invertible if and only if $\alpha$ is tame.

To understand some of the significant differences between TST and PGM it is important to describe the mapping $\alpha$ mentioned above. If $\alpha=(A_0, \ldots, A_{w-1})$ is a logarithmic signature for G, we denote by $\alpha_{ij}$ the $j^{th}$ element of block $A_i$ of $\alpha$. Let $r=(r_0, \ldots, r_{w-1})$ be the type of $\alpha$. We now define a bijection $\Theta_\alpha: \mathbb{Z}_{r_0} \oplus \ldots \oplus \mathbb{Z}_{r_{w-1}} \to G$ by:

$$\Theta_\alpha(x_0, \ldots, x_{w-1}) = \alpha_{0,x_0} \cdot \alpha_{1,x_1} \cdots \alpha_{w-1,x_{w-1}} \tag{3}$$

Next, define the integers $m_i$, $i=0, 1, \ldots, w-1$ by $$m_0 = 1, m_i = \prod_{j=0}^{i-1} r_j, i = 1, \ldots, w-1, \tag{4}$$

and let $\lambda$ be the bijection from $\mathbb{Z}_{r_0} \oplus \ldots \oplus \mathbb{Z}_{r_{w-1}}$ onto $\mathbb{Z}_{|G|}$, defined by $$\lambda(x_0, \ldots, x_{w-1}) = \sum_{i=0}^{w-1} x_i m_i \text{ for } x_i \in \mathbb{Z}_{r_i} \quad (5)$$

For any $x \in \mathbb{Z}_{|G|}$, $\lambda^{-1}(x)$ is efficiently computable by successive subtractions. This corresponds to obtaining the mixed base representation of x with respect to $(r_0, \ldots, r_{w-1})$. Next, for any $\alpha \in \Lambda$, define a map $\alpha: \mathbb{Z}_{|G|} \rightarrow G$ by composing $\lambda^{-1}$ with $\Theta_\alpha$, thus $\alpha = \lambda^{-1} \Theta_\alpha$. FIG. 5. illustrates the definition of $\alpha$.

The $\lambda^{-1}$ or $\lambda$ portions in computing $\alpha = \lambda^{-1} \Theta_\alpha$, or $\alpha^{-1} = \Theta_\alpha^{-1} \lambda$ are referred to as knapsack segments.

The function $\alpha$ is always efficiently computable, but $\alpha^{-1}$ is not unless $\alpha$ is tame. We denote by $\Lambda$ the collection $\{\alpha : \alpha \in \Lambda\}$.

Basic PGM uses a pair of tame logarithmic signatures $(\alpha, \beta)$ and defines the encryption transformation as the mapping $E_{\alpha,\beta} = \alpha \ \beta^{-1} : \mathbb{Z}_{|G|} \rightarrow \mathbb{Z}_{|G|}$ and the corresponding decryption transformation as $D_{\alpha,\beta} = E_{\beta,\alpha} = \beta \ \alpha^{-1}$.

We illustrate basic PGM by means of a small example. The group used is the alternating group on five points, $A_5$, of order 60. This implies that the message space is the set $\mathbb{Z}_{60} = \{0, 1, \ldots, 59\}$. Consider below a table consisting of two log signatures $\alpha$ and $\beta$ for $A_5$. For simplicity we have selected both $\alpha$ and $\beta$ to be of type (5,4,3). For compatibility reasons with the new TST system we list the blocks of a logarithmic signature $\alpha = (A_0, \ldots, A_{w-1})$ so that the $A_i$ are stacked sequentially one on top of the other with $A_0$ at the bottom and $A_{w-1}$ at the top. The central column of the table displays the common knapsack vector v to be used in the knapsack segments of the encrypting and decrypting functions. The integers $m_i$ are 1, 5 and 20 respectively. Let us now demonstrate the operation of enciphering. If for example, the plaintext message is 56, it can be uniquely decomposed with respect to v as, $56=(1+15+40)=1 \cdot m_0 + 3 \cdot m_1 + 2 \cdot m_2$. This determines uniquely the vector of row-indices $\lambda^{-1}(56)=(1,3,2)$. We next compute $$\pi = \Theta_\alpha(1,3,2) = (1\ 5\ 4\ 3\ 2) \cdot (1)(2\ 4)(3\ 5) \cdot (1)(2)(3\ 5\ 4) = (1\ 5\ 2)(3)(4).$$

We then compute $\Theta_\beta^{-1}(\pi)$, that is the representation of $\pi$ with respect to $\beta$. Because $\beta$ is supertame the factorization can be obtained very efficiently but we will not go into this process here. After the factorization has been achieved we have $$\pi = (1\ 5\ 2)(3)(4) = (1\ 3\ 5\ 4\ 2) \cdot (1)(2\ 3\ 4)(5) \cdot (1)(2)(3\ 4\ 5)$$

This determines the indices for $\beta$ as (3,1,0), i.e.

$$\Theta_\beta^{-1}(\pi) = (3,1,0)$$

Finally, $\lambda(3, 1, 0) = 3+5+0 = 8$. Hence, $E_{\alpha,\beta}(56) = 8$. It can be easily verified now that $D_{\alpha,\beta}(8) = E_{\beta,\alpha}(8) = 56$.

| α | v | β |
|---|---|---|
| (1)(2)(3)(4)(5) | 0 | (1)(2)(3 4 5) |
| (1)(2)(3 4 5) | 20 | (1)(2)(3 5 4) |
| (1)(2)(3 5 4) | 40 | (1)(2)(3)(4)(5) |
| (1)(2)(3)(4)(5) | 0 | (1)(2 5)(3 4) |
| (1)(2 3)(4 5) | 5 | (1)(2 3 4)(5) |
| (1)(2 5)(3 4) | 10 | (1)(2 4 3)(5) |

-continued

| α | v | β |
|---|---|---|
| (1)(2 4)(3 5) | 15 | (1)(2)(3 4 5) |
| (1)(2)(3)(4)(5) | 0 | (1 4 2 3 5) |
| (1 5 4 3 2) | 1 | (1)(2)(3 5 4) |
| (1 3 5 2 4) | 2 | (1 2 5 4 3) |
| (1 2 3 4 5) | 3 | (1 3 5 4 2) |
| (1 4 2 5 3) | 4 | (1 5 4)(2)(3) |

Some of the aforementioned references describe methods for obtaining pseudorandom logarithmic signatures from a very large class of transversal signatures and we will not go into this description either.

A hardware implementation for PGM was proposed by T. Horváth, S. Magliveras and Tran van Trung in "A Parallel Permutation Multiplier for a PGM Cryptochip", *Advances in Cryptology—CRYPTO '94*, Springer-Verlag 1994, pp 108–113. The proposed implementation adheres heavily to the ideas involved in the initial PGM including the knapsack portions at the front and back end of the encryption and decryption transformations.

Salient Features of the New System

Main drawbacks of PGM regarding implementation aspect can be described as follows:

1. In order for PGM to be secure a large carrier group is needed. To accomplish this in a space-efficient way, using cartesian representation of permutations in the given logarithmic signature, we need to use as large a group as possible for the given degree. Hence, use of the symmetric group of a given degree n is indicated. Then, the size of the message space is n! which for n>2 is not a power of 2. As a consequence, the high-order bit is unusable for a block of input plaintext. The corresponding ciphertext however may have the high-order bit on. It follows that the plaintext and ciphertext spaces are not identical, an undesirable property, which, among other, makes superencryption cumbersome.

2. The second problem with PGM when using a group of order not a power of 2, is that the signatures contain blocks of length not a power of 2. Therefore, there is no way to avoid the computationally intensive knapsack transformations $\lambda$ and $\lambda^{-1}$, that is, the conversion of binary words to a mixed radix format, and conversely, prior to and after the essential PGM transformations.

The new system TST differs radically from PGM in a number of significant ways, amongst others the new system overcomes the disvantages of PGM listed above. Several features of TST are briefly described below.

1. TST works with permutation 2-groups, i.e., permutation groups in which the number of elements is a power of 2. The new system is born with the invention of new permutation networks working with elements of G represented in what we call the compact form. As a consequence, the invention makes feasible the utilization of permutation groups of much larger degrees in VLSI realizations.

2. The ability to use permutation 2-groups allows the new system to completely avoid the computationally intensive front- and back-end knapsack portions of PGM. This results in a significant reduction of the hardware complexity.

3. The problem of incompatible cleartext and ciphertext space of PGM is automatically eliminated in the new system.

4. The new permutation multiplier designs have evolved by fusing and simplifying an indirect binary cube interconnection network with the new compact representation for elements of the carrier group. Consequently the multipliers work directly with the compact representation, rather than via the cartesian representations of the input and output permutations. This results in a very significant data-path width reduction by an approximate factor s for the data path, the i/o registers and related buses when using a group of degree $2^s$.

A search of patents was conducted and revealed very little of relevance. However the following patents are disclosed because they discuss systems and methods of encryption.

References Cited

| | | | |
|---|---|---|---|
| 3,962,539 | Jun., 1976 | Ehrsam et al. | 380/29 |
| 4,087,152 | Mar., 1978 | Tuckerman | 178/22 |
| 4,200,770 | Apr., 1980 | Hellman et al. | 380/30 |
| 4,405,829 | Sept., 1983 | Rivest et al. | 380/30 |
| 4,850,019 | Jul., 1989 | Shimizu et al. | 380/29 |
| 5,003,597 | Mar., 1991 | Merkle | 380/37 |
| 5,214,703 | May, 1993 | Massey et al. | 380/37 |
| 5,276,737 | Jan., 1994 | Micali | 380/30 |
| 5,351,299 | Sept., 1994 | Matsuzaki et al. | 380/29 |
| 5,511,123 | Apr., 1996 | Adams | 380/29 |
| 5,515,307 | May, 1996 | Aiello et al. | 364/717 |
| 5,577,123 | Nov., 1996 | Shimada | 380/30 |

OTHER PUBLICATIONS

"A New Random Number Generator from Permutation Groups", S. S. Magliveras, B. A. Oberg and A. J. Surkan, *Rend. del Sem. Matemat. e Fis. di Milano,* LIV (1984), pp 203–223.

"A cryptosystem from logarithmic signatures of finite groups", S. S. Magliveras. *Proceedings of the 29'th Midwest Symposium on Circuits and Systems,* Elsevier Publishing Company (1986), pp 972–975.

"The Linear Complexity Profile of Cryptosystem PGM", S. S. Magliveras and N. D. Memon, *Congressus Numerantium,* Utilitas Mathematica, 72 (1989), pp 51–60.

"On Logarithmic Signatures and Applications", N. D. Memon, *M. Sc. Thesis University of Nebraska—Lincoln,* (1989), pp 1–59.

"Complexity tests for cryptosystem PGM", S. S. Iagliveras, N. D. Memon and K. C. Tam, *Congressus Numerantium,* Utilitas Mathematica, 79 (1990), pp 61–68.

"Algebraic Properties of Cryptosystem PGM", S. S. Magliveras and N. D. Memon, *Journal of Cryptology,* 5 (1992), pp 167–183.

"Factorizations of elementary Abelian p-groups and their cryptographic significance", M. Qu and S. A. Vanstone, J. of Cryptology, 7 (1994), pp 201–212.

"A Parallel Permutation Multiplier for a PGM Crypto-chip", T. Horváth, S. Magliveras, Tran van Trung, *Advances in Cryptology—CRYPTO '94,* Springer-Verlag 1994, pp 108–113.

Disclosure of the Invention

The present invention is a vector encryption system which utilizes a user supplied secret data key and a data key expanding pseudo-random number generator, to provide a sequence of pseudo-random numbers which provide direction for its operation. Said vector encryption system includes a fixed, accessible, first logarithmic signature which is developed and stored in a first logarithmic signature containing means, and from which first logarithmic signature are formed additional logarithmic signatures by operation of a mathematical operations means, which additional logarithmic signatures are then utilized, via factorization or composition procedures, to encrypt an input vector.

To aide with understanding, it is disclosed that logarithmic signatures consist of a plurality of mathematical construct blocks, each of which mathematical construct blocks contains at least two permutations of a sequential plurality of numbers. A property of logarithmic signatures requires that they be a collection of ordered mathematical construct blocks in which each input vector encrypted by utilization thereof can be uniquely represented as one, and only one composition of permutations which are present in said logarithmic signature, one such composed permutation being selected from each of said ordered mathematical construct blocks. Said property is associated with groups of permutations in Symmetric groups of all permutations of a sequence of a plurality of numbers which constitute a "Sylow" 2-subgroup of said symmetric group. The "Sylow" criteria are discussed in the Detailed Description Section of this Disclosure. It is also disclosed that a composition means accepts a sequential plurality of input permutations and provides an output which is the product thereof. For insight, it is disclosed that the term "product" as utilized herein is actually a mapping as exemplified by the following:

$$\begin{pmatrix} 1 & 2 & 3 & 4 & 5 & 6 & 7 & 8 \\ 1 & 2 & 4 & 3 & 6 & 5 & 8 & 7 \end{pmatrix}^{A} \times \begin{pmatrix} 1 & 2 & 3 & 4 & 5 & 6 & 7 & 8 \\ 1 & 2 & 8 & 7 & 6 & 5 & 4 & 3 \end{pmatrix}^{B} =$$

$$\begin{pmatrix} 1 & 2 & 3 & 4 & 5 & 6 & 7 & 8 \\ 1 & 2 & 7 & 8 & 5 & 6 & 3 & 4 \end{pmatrix}^{C}$$

To follow the "multiplication" process which provides a "product" in C, begin in the first row of A and note that, for instance, 4 therein maps to 3 in the second row of A; then said resulting 3 is applied to the first row of B and is seen to map to 8 in the second row of B, such that the "product" of A×B which is shown in C under 4 of the first row in C, is 8. Other entries in A are handled in the same fashion to provide the entire A×B result as shown in C.

It is also disclosed that a factorization means finds the positions of permutations in a logarithmic signature such that when said permutations are composed the result is a vector input to said factorization means. Said permutation positions in said logarithmic signature are each assigned location identifying "pointer" binary digits, which when concatenated provide an output vector. The operational aspects of a factorization means are better illuminated in the Detailed Description Section of this Disclosure, but it is noted that the output in C (ie. 1 2 7 8 5 6 3 4) in the foregoing example would be given at the outset of a factorization process, and the factorization process then yields the permutations in B (ie. 1 2 8 7 6 5 4 3) and A (ie. 1 2 4 3 6 5 8 7) which when multiplied together, provide said output in C is provided.

While a present invention system can provide a single stage of vector encryption based in utilization of either factorization or composition, a preferred embodiment of the present invention vector encryption system is comprised of two stages, each of which stages applies one of the factorization or composition processes, to the end that a doubly encrypted version of an input vector is provided as an output vector. As a result there are four configurations of a preferred present invention two stage vector encryption system:

1. Factorization followed by composition;
2. Factorization followed by factorization;
3. Composition followed by composition; and
4. Composition followed by factorization.

While systems which apply more than two such stages are within the scope of the present invention, only the four identified present invention configurations are described in more detail in the following. It should be clear that adding a third, fourth etc. stage of encryption would simply involve repeated application of described stages which apply factorization or composition as are described in the following.

It is noted that in what follows, functional blocks are identified and labeled as:

primary and secondary mathematical operations means;
primary and secondary factorization means;
primary and secondary composition means;
factorization and composition means;
first, second and third logarithmic signature containing means;
multiplier means and decomposition means;
vector accepting means for receiving input binary digit vectors; and
data key expanding pseudo-random number generator and fourth and fifth logarithmic signature containing means.

It is to be understood that each functional block group can be a physically separate circuit means, or selections from said functional blocks group can be constructed as a circuit means while other selections are combined into separate circuitry, or all identified functional blocks can be physically one circuit means. The listed functional blocks are identified as convenient means to present and distinguish functions performed by the present invention. Any combinations of physical circuit elements into functional blocks which perform multiple functions equivalent to those described herein are also possible and are within the scope of the present invention as Claimed. For instance, physically combined circuitry factorization and decomposition means and combined composition means and multiplier means are possible.

First Stage Factorization

A present invention system for encrypting input vectors of length (l), which input vectors each consist of a sequential plurality of binary digits, can then comprise a first stage which applies factorization and said first stage can be described as functionally comprised of:

a. a vector accepting means for receiving input binary digit vectors; and b. a data key expanding pseudo-random number generator means for accepting a user provided input data key, and for generating and outputting a data key dependent sequence of pseudo-random numbers; and c. a first logarithmic signature containing means which comprises means for containing a first logarithmic signature which consists of plurality of mathematical construct blocks, each of said mathematical construct blocks containing at least two permutations of a sequential plurality of numbers; and d. a second logarithmic signature containing means which comprises means for containing a second logarithmic signature which consists of plurality of mathematical construct blocks, each of said mathematical construct blocks containing at least two permutations of a sequential plurality of numbers; and e. a primary mathematical operations means which comprises means for accepting a sequence of pseudo-random numbers and means for accessing said first logarithmic signature containing means, and means for accessing said second logarithmic signature containing means, and means for applying direction found in a sequence of pseudo-random numbers, to a first logarithmic signature caused to be contained in said first logarithmic signature containing means, to the end that at least a second logarithmic signature is produced by said primary mathematical operations means and caused to be contained in said second logarithmic signature containing means; and f. a primary factorization means for determining, accessing and concatenating into a primary factorization means output vector, binary pointers which identify locations of permutations in a second logarithmic signature caused to be present in said secondary logarithmic signature containing means, which permutations, when sequentially composed, duplicate a vector caused to be input into said primary factorization means.

In use a user defined data key is input to said data key expanding pseudo-random number generator means and said data key expanding pseudo-random number generator means outputs a sequence of pseudo-random numbers in response; and said sequence of pseudo-random numbers is received by said primary mathematical operations means and caused to direct alteration of a first logarithmic signature caused to be contained in said first logarithmic signature containing means, to the end that a second logarithmic signature is produced and caused to be contained in said second logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks.

Also in use, at least one input vector consisting of a sequence of binary digits, is input to said primary factorization means from said vector accepting means for receiving input binary digit vectors and is utilized by said primary factorization means to determine selection of permutations present in said mathematical construct blocks of said second logarithmic signature which when sequentially composed result in said at least one input vector. Said primary factorization means then assigns identified permutations in each of said mathematical construct blocks of said second logarithmic signature present in said second logarithmic signature containing means, a binary digit pointer which identifies the permutation location within said second logarithmic signature. Said primary factorization means then sequentially concatenates said determined binary digit location pointers into a once encrypted vector version of said at least one input vector input to said vector accepting means for receiving input binary digit vectors and makes said once encrypted vector version of said at least one input vector available as output therefrom.

Second Stage Composition

Said present invention system for encrypting input vectors which applies first stage factorization based encryption as just described, can also further comprise a second stage of encryption which applies composition and said second stage can be described as functionally comprised of:

a. a third logarithmic signature containing means which comprises means for containing a third logarithmic signature which consists of plurality of mathematical construct blocks, each of said mathematical construct blocks containing at least two permutations of a sequential plurality of numbers; and b. a composition means which comprises means for identifying, accessing and sequentially multiplying a plurality of permutations in a third logarithmic signature caused to be present in said third logarithmic signature containing means into a composition means output vector, which permutations are each a sequential plurality of binary digits.

In use said sequence of pseudo-random numbers produced by said pseudo-random number generator means is accepted by a selection from said group consisting of: (said primary mathematical operations means and a mathematical operations means other than said primary mathematical operations means which is functionally similar to said primary mathematical operations means). Said selection comprises means for accepting a sequence of pseudo-random numbers and means for accessing said first logarithmic signature containing means, and means for accessing said third logarithmic signature containing means, and means for applying direction found in a sequence of pseudo-random numbers to a first logarithmic signature caused to be contained in said first logarithmic signature containing means, to the end that a third logarithmic signature is produced by said primary mathematical operations means and caused to be contained in said third logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks, said third logarithmic signature being non-identical to said second logarithmic signature.

Also in use, said once encrypted vector version of at least one input vector made available by said primary factorization means is caused to be entered to said composition means which accesses said third logarithmic signature caused to be present in said third logarithmic signature containing means, such that a permutation in each of said mathematical construct blocks of said third logarithmic signature is identified. Said identified permutations in each of said mathematical construct blocks of said third logarithmic signature are then caused to be sequentially multiplied in said composition means, to the end that a twice encrypted version of said at least one input vector entered to said vector accepting means for receiving input binary digit vectors is made available by said composition means as output therefrom.

It is noted that FIG. 1 shows functionally, in block diagram form, a two stage present invention system for encrypting input vectors which comprises a first stage primary factorization means and a second stage composition means as described. The dashed lines encompass groupings of circuit elements which can each be considered as a single unit. For instance, in the Claims a primary factorization means and a second logarithmic signature and a composition means and a third logarithmic signature are identified as functionally separate only to enable description of the present invention vector encryption system operation. It is to be understood, in interpreting the Functionally Focused Claims, that in actual circuitry the functionally identified circuit element blocks might not be quite as independent as shown.

Second Stage Factorization

Said present invention system for encrypting input vectors which applies first stage factorization based encryption as described, can alternatively further comprise a second stage of encryption which also applies factorization, and said second stage can be described as functionally comprised of:

a. a third logarithmic signature containing means which comprises means for containing a third logarithmic signature consisting of plurality of mathematical construct blocks, each of said mathematical construct blocks containing at least two permutations of a sequential plurality of numbers; and b. a secondary factorization means for determining, and concatenating into a secondary factorization means output vector, binary pointers which identify locations of permutations in a third logarithmic signature caused to be present in said third logarithmic signature containing means, which permutations, when sequentially composed, duplicate a vector caused to be input into said secondary factorization means.

In use said sequence of pseudo-random numbers produced by said pseudo-random number generator means is accepted by a selection from the group consisting of: (said primary mathematical operations means and a mathematical operations means other than said primary mathematical operations means which is functionally similar to said primary mathematical operations means). Said selection comprises means for accepting a sequence of pseudo-random numbers and means for accessing said first logarithmic signature containing means, and means for accessing said third logarithmic signature containing means, and means for applying direction found in a sequence of pseudo-random numbers to a first logarithmic signature caused to be contained in said first logarithmic signature containing means, to the end that a third logarithmic signature is produced by said primary mathematical operations means and caused to be contained in said third logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks, said third logarithmic signature being non-identical to said second logarithmic signature.

Also in use said once encrypted vector version of said at least one input vector made available by said primary factorization means is caused to be entered to said secondary factorization means and is utilized thereby to determine selection of permutations present in said mathematical construct blocks of said third logarithmic signature which when sequentially composed result in said at least one once encrypted vector version input thereto. Said secondary factorization means then assigns identified permutations in each of said mathematical construct blocks of said third logarithmic signature present in said third logarithmic signature containing means, a binary digit pointer which identifies the permutation location within said third logarithmic signature. This is followed by said secondary factorization means sequentially concatenating said determined binary digit location pointers into a twice encrypted vector version of said at least one input vector input to said vector accepting means for receiving input binary digit vectors, to the end that said twice encrypted version of said at least one input vector entered to said vector accepting means for receiving input binary digit vectors is made available by said secondary factorization means as output therefrom.

It is noted that FIG. 2 shows functionally, in block diagram form, a two stage present invention system for encrypting input vectors which comprises a first stage primary factorization means and a second stage composition means as described. The dashed lines encompass groupings of circuit elements which can each be considered as a single unit. For instance, in the Claims a primary factorization means and a second logarithmic signature and a secondary factorization means and a third logarithmic signature are identified as functionally separate only to enable description of the present invention vector encryption system operation. It is to be understood, in interpreting the Functionally Focused Claims, that in actual circuitry the functionally identified circuit element blocks might not be quite as independent as shown.

First Stage Composition

A present invention system for encrypting input vectors of length (l), which input vectors each consist of a sequential plurality of binary digits, can alternatively comprise a first stage which applies composition based encryption, which first stage can be described as functionally comprised of:

a. a vector accepting means for receiving input binary digit vectors; and b. a data key expanding pseudo-random number generator means for accepting a user provided input data key, and for generating and outputting a data key dependent sequence of pseudo-random numbers; and c. a first logarithmic signature containing means which comprises means for containing a first logarithmic signature which consists of plurality of mathematical construct blocks, each of said mathematical construct blocks containing at least two permutations of a sequential plurality of numbers; and d. a second logarithmic signature containing means which comprises means for containing a second logarithmic signature which consists of plurality of mathematical construct blocks, each of said mathematical construct blocks containing at least two permutations of a sequential plurality of numbers; and e. a primary mathematical operations means which comprises means for accepting a sequence of pseudo-random numbers and means for accessing said first logarithmic signature containing means, and means for accessing said second logarithmic signature containing means, and means for applying direction found in a sequence of pseudo-random numbers to a first logarithmic signature caused to be contained in said first logarithmic signature containing means, to the end that at least a second logarithmic signature is produced by said primary mathematical operations means and caused to be contained in said second logarithmic signature containing means; and f. a primary composition means which comprises means for identifying, accessing and sequentially multiplying a plurality of permutations in a second logarithmic signature caused to be present in said second logarithmic signature containing means into a primary composition means output vector, which permutations are each a sequential plurality of binary digits.

In use a user defined data key is input to said data key expanding pseudo-random number generator means and said data key expanding pseudo-random number generator means provides a sequence of pseudo-random numbers in response and said sequence of pseudo-random numbers is applied by said primary mathematical operations means to a first logarithmic signature caused to be contained in said first logarithmic signature containing means, to the end that a second logarithmic signature is produced and caused to be contained in said second logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks.

Also in use, at least one input vector is input to said vector accepting means for receiving input binary digit vectors and is caused to be entered to said primary composition means which accesses said second logarithmic signature caused to be present in said second logarithmic signature containing means such that a permutation in each of said mathematical construct blocks of said second logarithmic signature is identified. Said identified permutations in each of said mathematical construct blocks of said second logarithmic signature are then caused to be sequentially multiplied in said primary composition means, to the end that a once encrypted version of said at least one input vector entered to said vector accepting means for receiving input binary digit vectors is made available by said primary composition means as output therefrom.

Second Stage Composition

Said present invention system for encrypting input vectors which applies first stage composition based encryption as just described, can also further comprise a second stage which applies composition based encryption, and said second stage can be described as functionally comprised of:

a. a third logarithmic signature containing means which comprises means for containing a third logarithmic signature which consists of plurality of mathematical construct blocks, each of said mathematical construct blocks containing at least two permutations of a sequential plurality of numbers; and b. a secondary composition means which comprises means for identifying, accessing and sequentially multiplying a plurality of permutations in a third logarithmic signature caused to be present in said third logarithmic signature containing means into a secondary composition means output vector, which permutations are each a sequential plurality of binary digits.

In use said sequence of pseudo-random numbers produced by said pseudo-random number generator means is accepted by a selection from said group consisting of: (said primary mathematical operations means and a mathematical operations means other than said primary mathematical operations means which is functionally similar to said primary mathematical operations means). Said selection comprises means for accepting a sequence of pseudo-random numbers and means for accessing said first logarithmic signature containing means, and means for accessing said third logarithmic signature containing means, and means for applying direction found in a sequence of pseudo-random numbers to a first logarithmic signature caused to be contained in said first logarithmic signature containing means, to the end that a third logarithmic signature is produced by said primary mathematical operations means and caused to be contained in said third logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks, said third logarithmic signature being non-identical to said second logarithmic signature.

Also in use, said once encrypted vector version of at least one input vector made available by said primary composition means is caused to be entered to said secondary composition means which accesses said third logarithmic signature caused to be present in said third logarithmic signature containing means such that a permutation in each of said mathematical construct blocks of said third logarithmic signature is identified. Said identified permutations in each of said mathematical construct blocks of said third logarithmic signature are then caused to be sequentially multiplied in said secondary composition means, to the end that a twice encrypted version of said at least one input vector entered to said vector accepting means for receiving input binary digit vectors is made available by said secondary composition means as output therefrom.

It is noted that FIG. 3 shows functionally, in block diagram form, a two stage present invention system for encrypting input vectors which comprises a first stage primary factorization means and a second stage composition means as described. The dashed lines encompass groupings of circuit elements which can each be considered as a single unit. For instance, in the Claims a primary composition means and a second logarithmic signature and a secondary composition means and a third logarithmic signature are identified as functionally separate only to enable description of the present invention vector encryption system operation. It is to be understood, in interpreting the Functionally Focused Claims, that in actual circuitry the functionally identified circuit element blocks might not be quite as independent as shown.

Second Stage Factorization

Said present invention system for encrypting input vectors which applies first stage composition based encryption as just described, can also further comprise a second stage which applies factorization based encryption, and said second stage can be described as functionally comprised of:

a. a third logarithmic signature containing means which comprises means for containing a third logarithmic signature consisting of plurality of mathematical construct blocks, each of said mathematical construct blocks containing at least two permutations of a sequential plurality of numbers; and b. a factorization means for determining, accessing and concatenating into a factorization means output vector, binary pointers which identify locations of permutations in a third logarithmic signature caused to be present in said third logarithmic signature containing means, which permutations, when sequentially multiplied together, duplicate a vector caused to be input thereinto.

In use said sequence of pseudo-random numbers produced by said pseudo-random number generator means is accepted by a selection from the group consisting of: (said primary mathematical operations means and a mathematical operations means other than said primary mathematical operations means which is functionally similar to said primary mathematical operations means). Said selection comprises means for accepting a sequence of pseudo-random numbers and means for accessing said first logarithmic signature containing means, and means for accessing said third logarithmic signature containing means, and means for applying direction found in a sequence of pseudo-random numbers to a first logarithmic signature caused to be contained in said first logarithmic signature containing means, to the end that a third logarithmic signature is produced by said primary mathematical operations means and caused to be contained in said third logarithmic signature containing means. This is accomplished while preserving a property of logarithmic signatures requiring that they be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks, said third logarithmic signature being non-identical to said second logarithmic signature.

Also in use said once encrypted vector version of said at least one input vector which is output by said primary composition means is input to said factorization means and utilized thereby to determine selection of permutations present in said mathematical construct blocks of said third logarithmic signature which when sequentially composed result in said at least once encrypted vector version input thereto. Said factorization means then assigns identified permutations in each of said mathematical construct blocks of said third logarithmic signature present in said third logarithmic signature containing means, a binary digit pointer which identifies the permutation location within said third logarithmic signature. Said factorization means then sequentially concatenates said determined binary digit location pointers into a twice encrypted vector version of said at least one input vector input to said vector accepting means for receiving input binary digit vectors, to the end that said twice encrypted version of said at least one input vector entered to said vector accepting means for receiving input binary digit vectors is made available by said factorization means as output therefrom.

It is noted that FIG. 4 shows functionally, in block diagram form, a two stage present invention system for encrypting input vectors which comprises a first stage primary factorization means and a second stage composition means as described. The dashed lines encompass groupings of circuit elements which can each be considered as a single unit. For instance, in the Claims a primary composition means and a second logarithmic signature and a factorization means and a third logarithmic signature are identified as functionally separate only to enable description of the present invention vector encryption system operation. It is to be understood, in interpreting the Functionally Focused Claims, that in actual circuitry the functionally identified circuit element blocks might not be quite as independent as shown.

Additional Functional Element Description

With the basic present invention system configurations which provide for two stage combinations of factorization and/or composition to be applied to encrypt input vectors now disclosed, attention is turned to more detailed description of the functional elements identified, namely:

1. The form of the first logarithmic signature; and
2. The data key expanding pseudo-random number generator means; and
3. The mathematical operations means; and
4. The factorization means; and
5. The composition means.

First Logarithmic Signature

The preferred present invention first logarithmic signature which is contained in the logarithmic signature containing means comprises a plurality of mathematical construct blocks, each of which mathematical construct blocks contains two permutations of a sequential plurality of numbers, said first logarithmic signature being developed by a process of:

a. defining a vector $I_s=(1, 2, 3, \ldots, 2^s)$;
b. defining a vector $\hat{I}_s=(2^s+I_s)$;
c. defining an array $$J_1 = \begin{bmatrix} 1 & 2 \\ 1 & 2 \end{bmatrix}$$

d. defining an array $$\hat{J}_1 = \begin{bmatrix} 3 & 4 \\ 3 & 4 \end{bmatrix}$$

e. defining logarithmic signatures $$\alpha_1 = \begin{bmatrix} 1 & 2 \\ 2 & 1 \end{bmatrix} \text{ and } \hat{\alpha}_1 = \begin{bmatrix} 3 & 4 \\ 4 & 3 \end{bmatrix}$$

each of strength 1;

f. utilizing the above defined $I_s$, $\hat{I}_s$, $J_1$, $\hat{J}_1$, $\alpha_1$ and $\hat{\alpha}_1$ in a recursive manner to construct additional first logarithmic signatures of increasing strengths:

$$\alpha_s: \begin{array}{|c|c|} \hline I_{s-1} & \hat{I}_{s-1} \\ \hline \hat{I}_{s-1} & I_{s-1} \\ \hline J_{s-1} & \hat{\alpha}_{s-1} \\ \hline \alpha_{s-1} & \hat{J}_{s-1} \\ \hline \end{array}$$

where the recursively progressing alpha's ($\alpha$'s) of increasing strengths (s) are the first logarithmic signature.

A system for encrypting input vectors as just described comprises a first logarithmic signature of strength (s), where (s) is an integer, in which, in use, an input vector input to said vector accepting means for receiving input binary digit vectors consists of a plurality sequence of binary digits of length $(l=2^s-1)$.

Scalable Present Invention System Where Vector Length Is Not Equal To $(2^s-1)$ Where (s) Is The Strength Of The First Logarithmic Signature A system for encrypting input vectors can also be comprised of (n) systems for encrypting vectors as just described, each of said (n) systems for encrypting vectors having a first logarithmic signature of some strength $(s_i)$, where $(s_i)$ is an integer, in which, in use, an input vector input to an effective vector accepting means for receiving input binary digit vectors consists of a sequential plurality of binary digits of length (l), where $(l \neq 2^s-1)$ for any integer (s);

said system for encrypting input vectors providing a total of (n) first logarithmic signatures, the strengths of which sum to (s'), and in which a first, initial, sequence of binary digits of length $(2^{s_1}-1)$ of said input vector is input to one of said (n) systems for encrypting input vectors having a first logarithmic signature of strength $(s_1)$, and in which a second, following, sequence of binary digits of length $(2^{s_2}-1)$ of said input vector is input to a second of said systems for encrypting input vectors having a first logarithmic signature of strength $(s_2)$, and in which, as necessary, (n) additional, following sequences of binary digits of length $(2^{s_i}-1)$ of said input vector which consists of a plurality sequence of binary digits are input to (n) additional systems for encrypting input vectors each having first logarithmic signatures of strength $(s_i)$;

such that an effective system for encrypting input vectors with an effective first logarithmic signature of strength $(s'=s_1+s_2+ \ldots +s_n)$ is achieved and into which effective system for encrypting input vectors is input said input vector which consists of a plurality sequence of binary digits of length (l), where $(l=2^{s'})$.

Data Key Expanding Pseudo-Random Number Generator

A data key expanding, pseudo-random number generator means comprises a forth logarithmic signature and a fifth logarithmic signature, in a forth logarithmic signature and a fifth logarithmic signature containing means respectively; such that in use a user provided data key is input to said pseudo-random number generator means and applied to said forth logarithmic signature to the end that, by a procedure involving a selection from the group consisting of: (factorization and composition), a first encrypted version of said data key is produced, and such that said first encrypted version of said data key is applied to said fifth logarithmic signature to the end that, by a procedure involving a selection independently selected from the group consisting of: (factorization and composition), a second encrypted version of said data key is produced, said second encrypted version of said data key being an expanded data key dependent sequence of pseudo-random numbers. It is noted that FIGS. 1–4 basically, functionally show said pseudo-random number generator means where the shown pseudo-random number generator means and the primary/secondary mathematical operations means and the first logarithmic signature containing means are considered as deleted so that logarithmic signature in the second interpreted as fourth and third interpreted as fifth, logarithmic signature means are fixed rather than set by action of the primary/secondary mathematical operations means and a first logarithmic signature, and a user provided input data key is considered entered at the vector accepting means for receiving input binary digit vectors.

Mathematical Operations Means

A present mathematical operations means selected from the group consisting of: (said primary mathematical operations means and said secondary mathematical operations means), accesses said first logarithmic signature and produces a logarithmic signature selected from the group consisting of: (said second logarithmic signature and said third logarithmic signature), therefrom; said present mathematical operations means comprising means for performing at least one mathematical operation selection from the group consisting of:

1. commutative shuffle;
2. fusion procedure;
3. randomization procedure; and
4. permutation shuffle;

Commutative Shuffle

Said commutative shuffle, as directed by said expanded data key dependent, expanded sequence of pseudo-random numbers, functionally comprises the steps of:

a. identifying at least one pair of adjacent mathematical construct blocks in said first logarithmic signature, in which permutations in one said mathematical construct block commute with permutations in the adjacent mathematical construct block in that the same product result is achieved when said permutations are multiplied together regardless of an order in which said pair of permutations are multiplied together; and further based upon said data key dependent expanded sequence of pseudo-random numbers proceed to: (interchange the positions of said identified adjacent mathematical construct blocks in said first logarithmic signature or leave the positions of said identified adjacent mathematical construct blocks unchanged in said first logarithmic signature); and b. repeating step a. as directed by said expanded data key dependent, expanded sequence of pseudo-random numbers.

Fusion Procedure

Said fusion procedure functionally comprises the steps of, as directed by said expanded random data key dependent sequence of pseudo-random numbers:

identifying at least one sequential grouping of mathematical construct blocks in said first logarithmic signature, each of which mathematical construct blocks contains two permutations of a sequential plurality of numbers;

from each of said at least one sequential grouping of mathematical construct blocks in said first logarithmic signature forming a separate mathematical construct block which contains more than two permutations of a sequential plurality of numbers.

The resulting logarithmic signature does not then consist entirely of a plurality of mathematical construct blocks each of which contain only two permutations of a sequential plurality of numbers, but rather consists of a number of mathematical construct blocks, some of which have more than two permutations therein.

As an example, consider three mathematical construct blocks, each of which contain two permutations:

$$\begin{bmatrix} z_1 \\ z_0 \\ \hline y_1 \\ y_0 \\ \hline x_1 \\ x_0 \end{bmatrix}$$

are grouped together. Then application of the Fusion Procedure will provide a single mathematical construct block therefrom comprising $2^3$ or eight (8) permutations as follows:

$$\begin{bmatrix} x_1 \cdot y_1 \cdot z_1 \\ x_1 \cdot y_1 \cdot z_0 \\ x_1 \cdot y_0 \cdot z_1 \\ x_1 \cdot y_0 \cdot z_0 \\ x_0 \cdot y_1 \cdot z_1 \\ x_0 \cdot y_1 \cdot z_0 \\ x_0 \cdot y_0 \cdot z_1 \\ x_0 \cdot y_0 \cdot z_0 \end{bmatrix}$$

Randomization Procedure

Said randomization procedure functionally comprises, as directed by said expanded data key dependent sequence of pseudo-random numbers, the steps of:

a. selecting a mathematical construct block in a logarithmic signature which consists of a plurality of mathematical construct blocks, said selected mathematical construct block consisting of at least two permutations of a sequential plurality of numbers, then selecting a permutation therein;

then for said selected permutation selecting permutation (s), one each, from at least one alternative, other, mathematical construct block in said logarithmic signature;

then multiplying said selected permutations in said selected mathematical construct block and in said alternative, other, mathematical construct blocks together and replacing said selected permutation in said selected mathematical construct block with the result of said multiplication, to form a replacement mathematical construct block for said selected mathematical construct block, and b. as directed by said expanded data key dependent sequence of pseudo-random numbers, repeating step a. for other permutations in said selected mathematical construct block in said logarithmic signature; and then replacing said selected mathematical construct block in said logarithmic signature with said replacement mathematical construct block; and c. as directed by said expanded data key dependent sequence of pseudo-random numbers, repeating step a. but selecting an alternative, other, mathematical construct block in said logarithmic signature to be the selected mathematical construct block than was selected in the first application of step a.; and then replacing said selected alternative, other, mathematical construct block in said logarithmic signature with said replacement mathematical construct block.

It is noted that practical application of the Randomization Process requires that only mathematical construct blocks "below" a mathematical construct block in a logarithmic signature being Randomized be accessed as alternative, other, mathematical construct blocks. For instance if mathematical construct blocks A, B, C and D are present in a logarithmic signature as:

$$\begin{bmatrix} A \\ B \\ C \\ D \end{bmatrix}$$

and it is mathematical construct block A which is being subjected to Randomization, then one permutation from each of mathematical construct blocks B, C and D are composed with a selected permutation in mathematical construct block A, and said selected permutation in mathematical construct block A replaced with the result. This procedure can of course be, but is not necessarily, repeated for each permutation in mathematical construct block A to the end that a new mathematical construct block A finally replaces the original mathematical construct block A being Randomized. However, if it is mathematical construct block B which is being subjected to Randomization, then at least one selected permutation therein will be composed with selected permutations, one each, from only mathematical construct blocks C and D. As well, if it is mathematical construct block C which is being Randomized, only a permutation in mathematical construct block D will be selected and composed with a selected permutation in mathematical construct block C. It is possible to perform Randomization involving composition of a selected permutation in a mathematical construct block being Randomized with a permutation selected from a mathematical construct block located "above" the mathematical construct block in said logarithmic signature which is being Randomized, but additional considerations then come into play and the preferred present invention embodiment does not typically tend to such additional considerations as the benefits achieved do not justify the effort required.

Permutation Shuffle

Said permutation shuffle, as directed by said expanded data key dependent sequence of pseudo-random numbers, functionally comprises the step(s) of:

a. identifying at least one pair of permutations in a selected mathematical construct block in said logarithmic signature, and based upon said expanded data key dependent sequence of pseudo-random numbers proceed to reverse the positions of said identified permutations in said selected mathematical construct block; and b. as directed by said expanded data key dependent sequence of pseudo-random numbers, repeating step a. for other permutation pairs in said selected mathematical construct block in said logarithmic signature; and c. as directed by said expanded data key dependent sequence of pseudo-random numbers, repeating step a. but modified by the selection of an alternative, other, mathematical construct block in said logarithmic signature.

Any of said mathematical operations performed is performed only if, and only in a sequence which provides that, the property of logarithmic signatures requiring that they be a collection of ordered mathematical construct blocks in which each input vector encrypted by utilization thereof can be uniquely represented as one, and only one composition of permutations which are present in said logarithmic signature, one such composed permutation being selected from each of said ordered mathematical construct blocks, is preserved.

Factorization Means

A present invention factorization means selected from the group consisting of: (said primary factorization means and said secondary factorization means), functionally comprises a decomposition means with the operational property that an output vector produced thereby and made present at an output means thereof is a product of a first vector input thereto at a first input means thereof and an inverse second vector input thereto at a second input means thereof; an input to said factorization means being capable of accessing, via a feedback means, said output means. In use, repeated application is made thereof in which, at each application after the first, the output of said factorization means produced at said output means thereof by a previous application, is input to said first input means thereof simultaneous with input of an inverted vector to said second input means. As the Factorization procedure is complex, an example of the practice thereof is deferred to the Detailed Description Section of this Disclosure.

Composition Means

A present invention composition means selected from the group consisting of: (said primary composition means and said secondary composition means), functionally comprises a multiplier means with the operational property that an output vector produced thereby and made present at an output means thereof is a product of a first vector input thereto and of a second vector input thereto; an input to said composition means being capable of accessing, via a feedback means, said output means. In use, repeated application is made thereof in which, at each application after the first, the output of said multiplier means produced at said output means thereof by a previous application, is input to said first input means thereof simultaneous with input of a vector to said second input means which is to be multiplied by said vector input to said first input means.

It is important to understand that the preferred embodiment of the present invention operates on compact form binary vectors of length $(l)=(2^n-1)$ which are input to a vector accepting means for receiving input binary digit vectors, which compact form binary vectors represent elements of a carrier group of permutations which is a Sylow 2-subgroup of a full symmetric group of degree $2^n$, said carrier group being of size $2^{(2^n-1)}$. In this light it is noted that a preferred present invention system for encrypting vectors which comprises composition means, utilizes an "N" bit multiplier system for each composition means present, which "N" bit multiplier systems serves to multiply two compact form binary vectors A and B input thereto, each of said two compact form binary vectors A and B being of length $(l)=(2^n-1)$. Again, said compact form binary vectors A and B represent elements of a carrier group of permutations which is a Sylow 2-subgroup of a full symmetric group of degree $2^n$, said carrier group being of size $2^{(2^n-1)}$. Further, as better discussed in the Detailed Description Section of this Disclosure, a utilized N bit multiplier system comprises a means for accepting input of two compact form binary vectors A and B each of length $(N)=(l)=(2^n-1)$; and a swapping means for accepting two binary input vectors each consisting of $(N-1)/2$ binary bits and essentially comprising the upper and lower halves of B; the output of said swapping means consisting of two binary vectors each of length $(N-1)/2$ in an order selected from the group consisting of: (unchanged order and swapped order). And said multiplier system further comprising two $(N-1)/2$ bit "self-similar" sub-multiplier systems therein; where each of said two "self-similar" sub-multiplier systems comprises a sub-input accepting means, sub-swapping means and two sub-sub-multiplier systems. The lower input vectors of length $(N-1)/2$ of each sub-multiplier consisting of the two output vectors of the swapping means; and the upper input vectors of length $(N-1)/2$ of each sub-multiplier consisting essentially of the upper and lower halves of input vector A. Said swapping means in said multiplier system is located with respect to said two sub-multipliers in said multiplier system at a location selected from the group consisting of: (before and after) said two submultipliers, such that compact binary form vectors input thereto are input sequentially first to a selection from the group consisting of: (said swapping means and said two sub-multipliers) and then into a selection from the group consisting of: (said two sub-multipliers and said swapping means respectively). As much better described in the Detailed Description Section of this Disclosure, the sequential order of said swapping means and two sub-multipliers in an N bit multiplier system, (ie. which thereof a binary vector input thereto encounters first), is determinative of the result of multiplication and/or inversion, said result being a member of the group consisting of: $(AB, A^{-1}B, AB^{-1}, \text{and } A^{-1})$.

It is again noted that the term "multiplication" as used herein refers to a composition mapping process as demonstrated infra herein.

Method of Use

Briefly, the method of use of the present invention can be described as a method of encrypting input vectors and/or providing a sequence of pseudo-random numbers comprising the steps of:

a. providing a system for encrypting input vectors which can also be used as a pseudo-random number generator means, comprising a logarithmic signature in a logarithmic signature containing means; such that in use a user provided input vector/data key is input to said system for encrypting input vectors which can also be used as a pseudo-random number generator means, and applied to said logarithmic signature to the end that, by a procedure involving a selection from the group consisting of: (factorization and composition) a once encrypted version of said input vector/data key is produced;

b. causing at least one input vector/data key to be input thereto;

c. monitoring said once encrypted version of said input "vector/data key which is produced.

An expanded method can be described as a method of encrypting input vectors and/or providing a sequence of pseudo-random numbers comprising the steps of a. providing a system for encrypting input vectors which can also be used as a pseudo-random number generator means, comprising a fourth logarithmic signature and a fifth logarithmic signature, in forth logarithmic signature and a fifth logarithmic signature containing means respectively, wherein said fourth logarithmic signature is non-identical to said fifth logarithmic signature; such that in use a user provided input vector/data key is input to said system for encrypting input vectors which can also be used as a pseudo-random number generator means, and applied to said forth logarithmic signature to the end that, by a procedure involving a selection from the group consisting of: (factorization and composition), a once encrypted version of said input vector/data key is produced; and such that said first encrypted version of said input vector/data key is applied to said fifth logarithmic signature to the end that, by a procedure involving a selection independently selected from the group consisting of: (factorization and composition), a twice encrypted version of said input vector/data key is produced;

b. causing at least one input vector/data key to be input thereto;

c. monitoring a selection from the group consisting of a once and a twice encrypted version of said input vector/data key which is produced.

General Discussion

It is generally noted that a present invention system for encrypting input vectors can provide that present said first, second and third logarithmic signature containing means each comprise computer memory, and that present said primary and secondary mathematical operations means and present said primary and secondary factorization means and present said primary and secondary composition means, and said data key expanding pseudo-random number generator means all comprise computer, software driven computer system hardware. It is further noted that a present invention system for encrypting input vectors has been described herein on a functional basis, emphasis added, and that physical circuit realization can, where functionally appropriate, provide that:

a. said primary and secondary mathematical operations means are physically one circuit means and distinguishable only by function performed at a point in time;

b. said primary and secondary factorization means are physically one circuit means and distinguishable only by function performed at a point in time;

c. said primary and secondary composition means are physically one circuit means and distinguishable only by function performed at a point in time;

d. said primary factorization means, decomposition means and said second logarithmic signature containing means are physically one circuit means and distinguishable only by function performed;

e. said primary composition means, multiplier means and said second logarithmic signature containing means are physically one circuit means and distinguishable only by function performed;

f. said secondary composition means, multiplier means and said third logarithmic signature containing means are physically one circuit means and distinguishable only by function performed;

g. said secondary factorization means, decomposition means and said third logarithmic signature containing means are physically one circuit means and distinguishable only by function performed;

h. said composition means, multiplier means and said third logarithmic signature containing means are physically one circuit means and distinguishable only by function performed;

i. said factorization means, decomposition means and said third logarithmic signature containing means are physically one circuit means and distinguishable only by function performed;

j. selections from the group consisting of: (said primary and secondary mathematical operations means, said primary and secondary factorization means, said primary and secondary composition means, said factorization and composition means, said first and second and third logarithmic signature containing means, said multiplier means and decomposition means, said vector accepting means for receiving input binary digit vectors, and said data key expanding pseudo-random number generator and forth and fifth logarithmic signature containing means), are all physically one circuit means and distinguishable only by function performed; Any combinations of physical circuit elements into functional blocks which perform multiple functions equivalent to those described herein are also possible and are within the scope of the present invention as Claimed.

The most preferred embodiment of the present invention, which comprises a first stage factorization encryption means and a second stage composition encryption means for providing a doubly encrypted version of an input vector, along with insight to mathematical operations basis of Sylow 2-subgroups, logarithmic signatures, commutative shuffle, fusion procedure, randomization procedure, and permutation shuffle, is provided in the Detailed Description Section of this Disclosure. For continuity purposes it is further noted that the generic terminology "mathematical operations means" as used in this Disclosure of the Invention Section, is specifically referred to as a "Signature Generator Algorithm" in the Detailed Description Section. Similarly the first, second and third logarithmic signatures are referred to as $(\alpha)$, $(\beta_1)$, $(\beta_2)$, logarithmic signatures, respectively, in the Detailed Description Section, and the data key expanding pseudo-random number generator is referred to as a "cyclic encryption generator" in said Detailed Description Section. Also, input vectors are termed "plaintext" in the Detailed Description and the terminology "compact representation" indicates that any permutation in a carrier group is present in binary digit form of the shortest functional length. It is further noted, and emphasised, that "compact representation" allows the most efficient representation of permutations in selected carrier groups G of order $(2^f)$. This is a very significant point. Further, the present invention allows that any given element of a carrier group G can be factorized with respect to any logarithmic signature within a large well defined family of logarithmic signatures, all in compact representation.

The mathematical basis of the present invention will be better understood, by reference to the Detailed Description Section of this Disclosure, in conjunction with appropriate reference to the accompanying Drawings.

SUMMARY OF THE INVENTION

It is therefore a purpose of the present invention to teach single and multiple stage secret key cryptosystems and more particularly a secret key block cipher utilizing a novel idea of efficient factorizations of permutation groups of arbitrary order $2^l$.

It is another purpose of the present invention to identify four functional configurations of a preferred present invention two stage vector encryption system which apply factorization and composition procedures in the various orders:

1. factorization followed by composition;
2. factorization followed by factorization;
3. composition followed by composition; and
4. composition followed by factorization.

It is yet another purpose of the present invention to identify the present invention functional configuration consisting of factorization followed by composition as the most preferred embodiment.

It is still yet another purpose of the present invention to describe functional elements utilized therein, namely:

1. the form of the first logarithmic signature; and
2. the data key expanding pseudo-random number generator means; and
3. the mathematical operations means; and
4. the factorization means; and
5. the composition means; and
6. the multiplier means for accepting two input vectors, A and B, in compact representation and providing as output a selection from the group consisting of: $(AB, A^{-1}B, AB^{-1})$, as well as the inverting means for accepting an input vector A, in compact representation and providing as output $(A^{-1})$. It is yet still another purpose of the present invention to describe that it is scalable to use with vectors of any length (l), where $(l)=(2^s)$ by combining encryption systems which have logarithmic signatures of strength $(s_i)$ such that $(s'=s_1+s_2+\ldots+s_n)$.

It is another purpose of the present invention to describe the functions performed by a mathematical operations means as being selection from the group consisting of:

1. commutative shuffle;
2. fusion procedure;
3. randomization procedure; and
4. permutation shuffle;

It is yet another purpose of the present invention to describe realization utilizing computer hardware to embody present said first, second, third logarithmic signature containing means, and said primary/secondary mathematical operations means and present said primary/secondary factorization means and present said primary/secondary composition means, and factorization and composition means, and permutation multiplier means and said data key expanding pseudo-random number generator means and fourth and fifth logarithmic signature containing means etc., and to make clear that functionally identifiable separate elements in said present invention need not be physically separately identifiable in realization circuitry.

It is still yet another purpose of the present invention to disclose an encryption system which accepts data key as input and expands it as a sequence of pseudo-random numbers; which sequence of pseudo-random numbers is applied to a first logarithmic signature in a first logarithmic signature containing storage means to develop a second logarithmic signature, which second logarithmic signature is then stored in a second logarithmic signature containing storage means under the control of a primary mathematical operations means which comprises means for accepting a sequence of pseudo-random numbers; means for accessing said first logarithmic signature containing storage means; means for accessing said second logarithmic signature containing storage means; and means for applying a sequence of pseudo-random numbers to a first logarithmic signature, producing at least a second logarithmic signature and storing it in said second logarithmic signature containing storage means, said second logarithmic signature then being used in encrypting input vectors.

BRIEF DESCRIPTION OF THE DRAWINGS

FIG. 1. shows a two stage encryption systems sequentially composing factorization and composition means.

FIG. 2. shows a two stage encryption systems sequentially composing factorization and factorization means.

FIG. 3. shows a two stage encryption systems sequentially composing composition and composition means.

FIG. 4. shows a two stage encryption systems sequentially composing composition and factorization means.

FIG. 5:

FIG. 5. explains the definition of mapping $\alpha$ as used in PGM from the background section.

FIG. 6: Multiplier MULAB(N)

Figure 1:
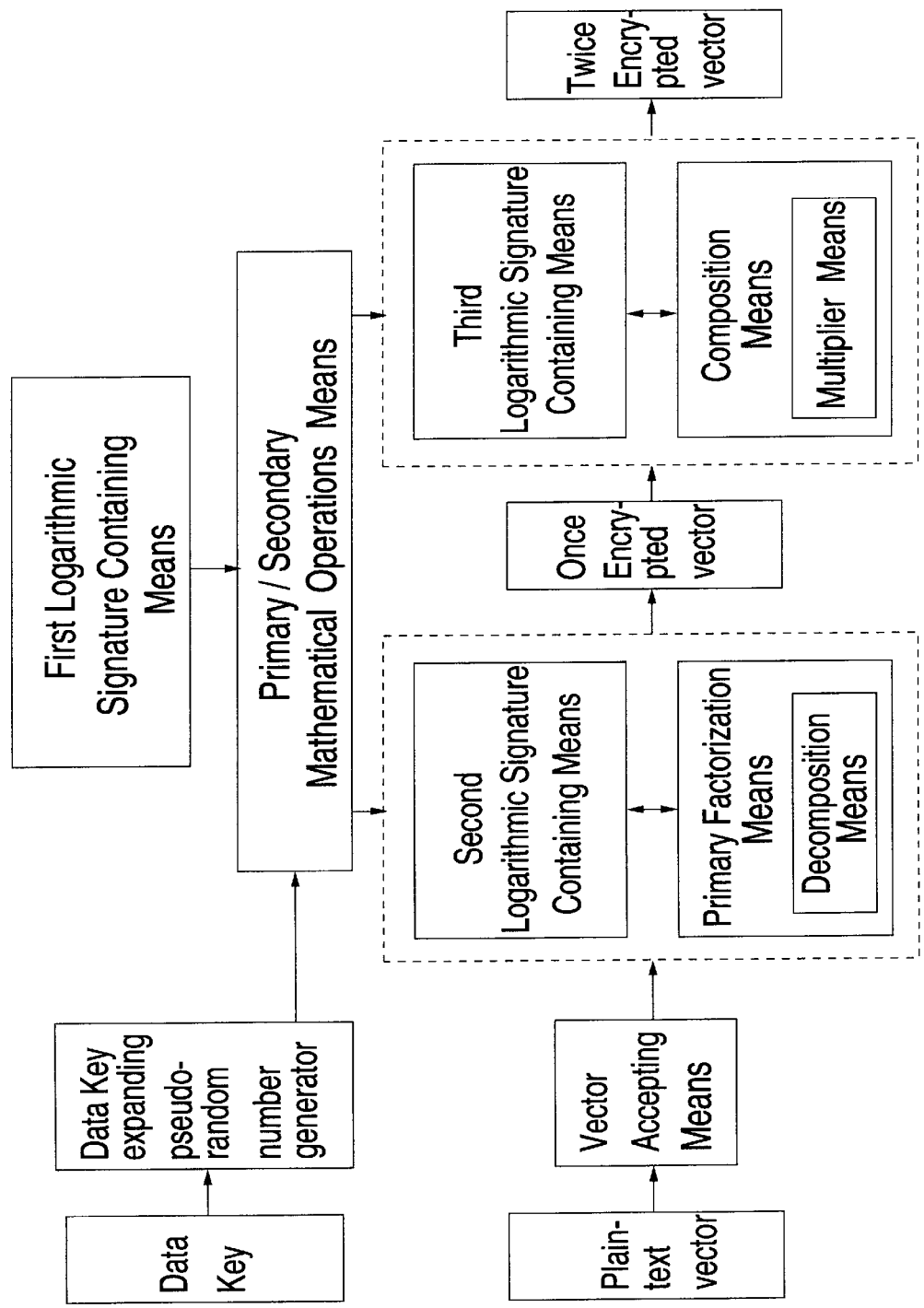
FIG. 1.
Figure 2:
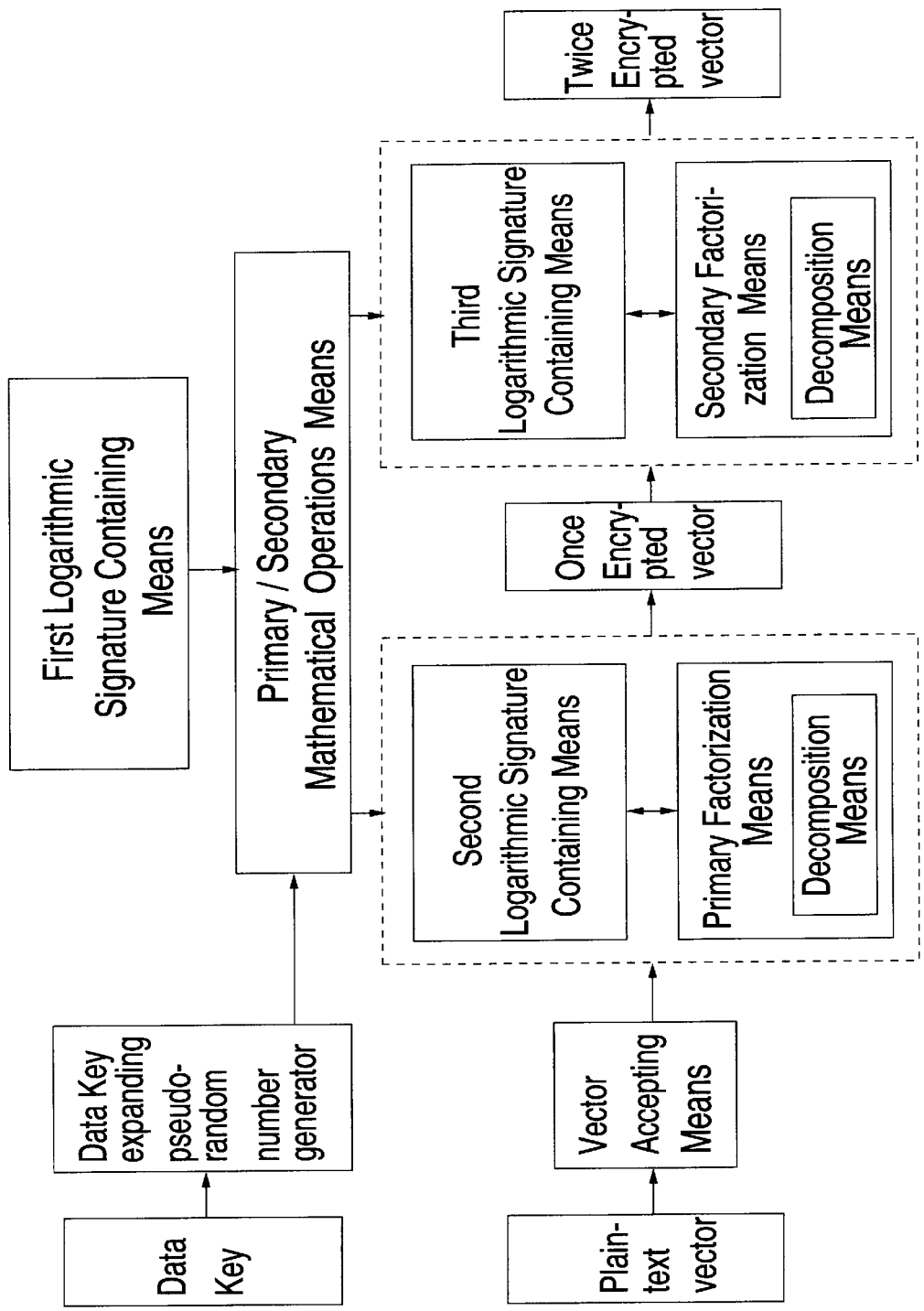
FIG. 2.
Figure 3:
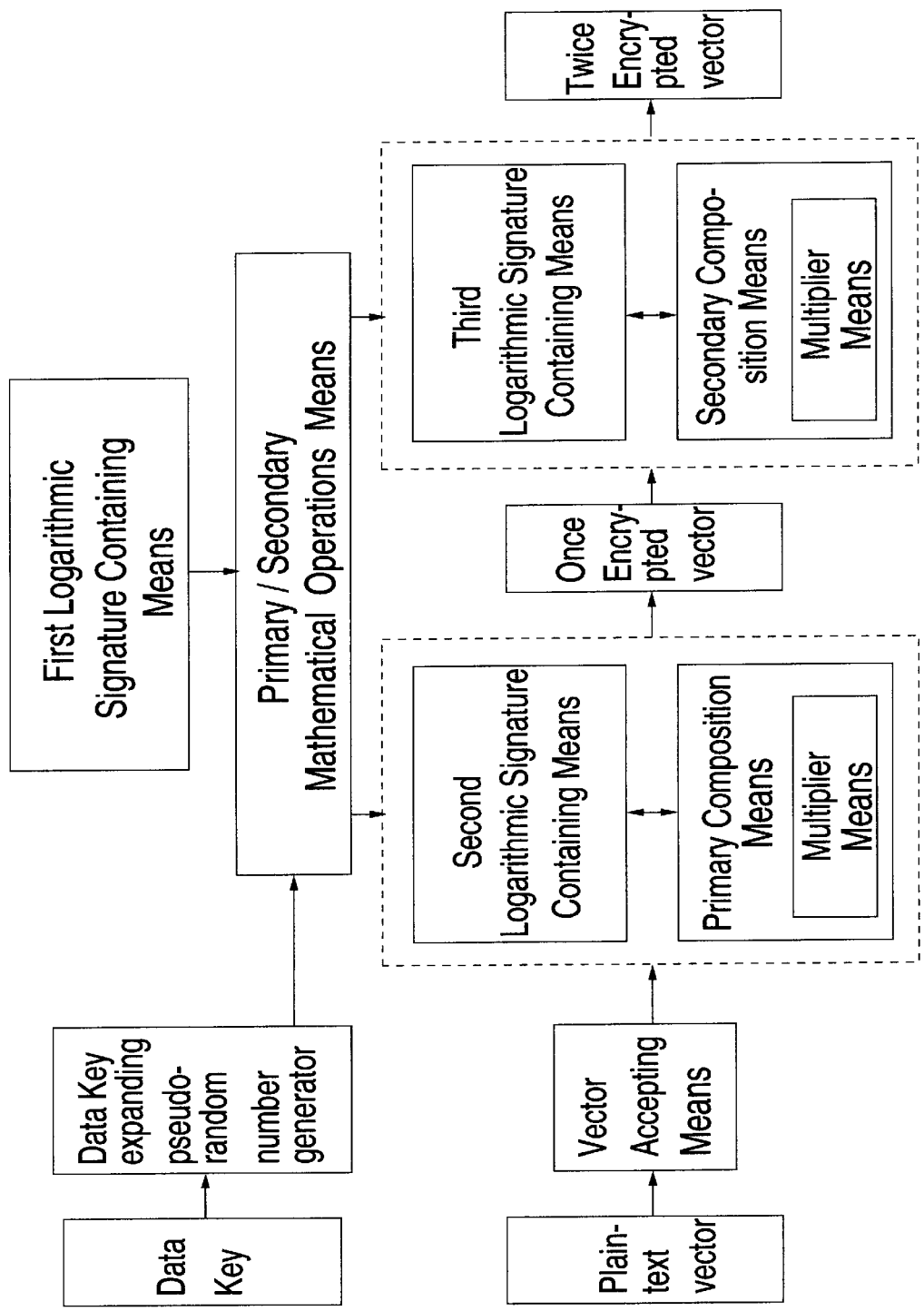
FIG. 3.
Figure 4:
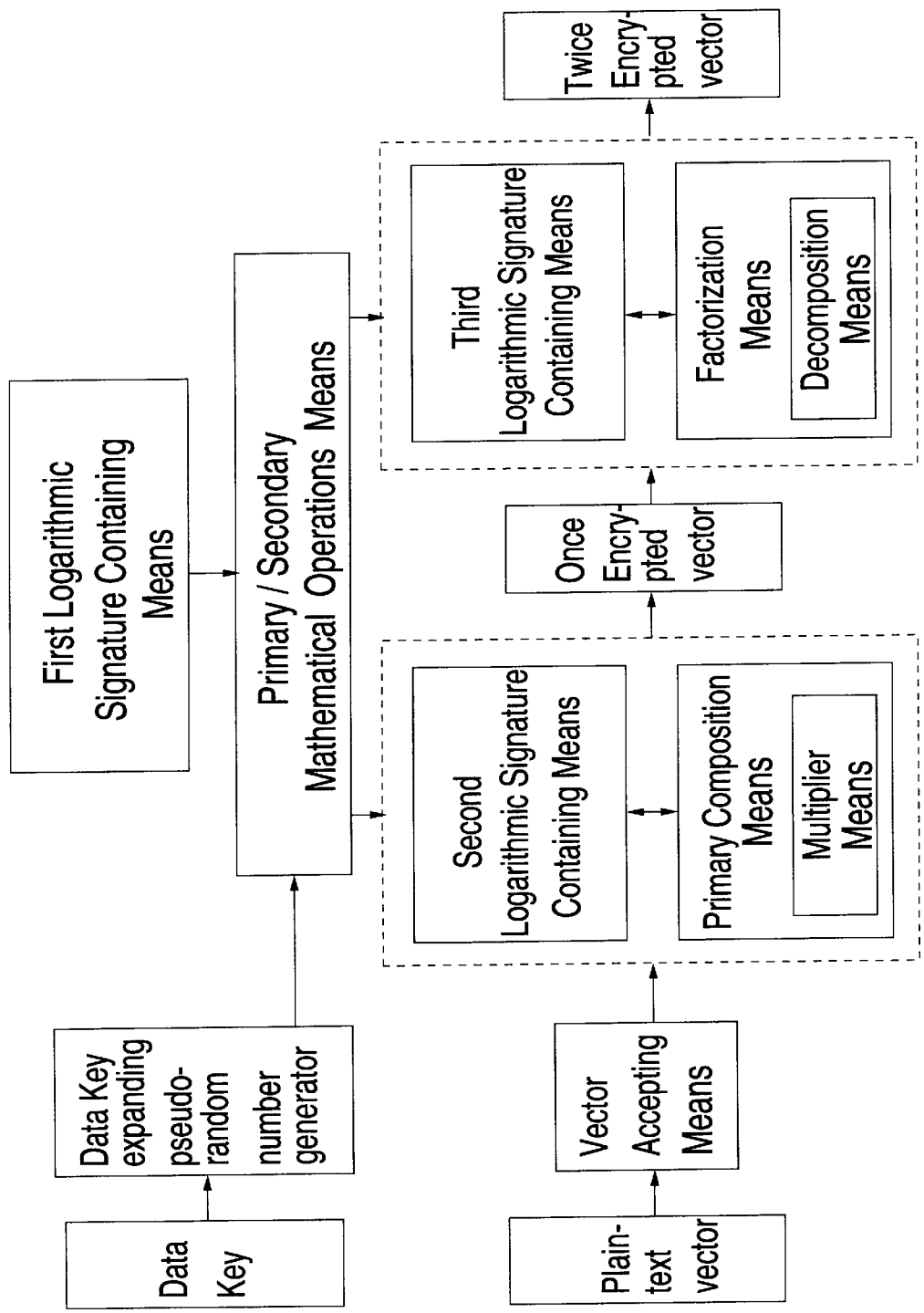
FIG. 4.

This multiplier architecture computes the product $q=a \cdot b$ of two permutations a and b, entered to the circuitry at the input buses A and B in their compact representation. The result q is produced on output bus Q. The width of the input and output buses is defined by the scaling parameter N. The circuitry is purely combinational. It consists of a swapping module SW with input/output buses of width $(N-1)/2$ and controlled by the high order input bit $A[N-1]$; furthermore of a higher and a lower multiplier (UMUL and resp. LMUL) of type MULAB, but of input/output length $(N-1)/2$; and finally of an XOR-gate. The recursive structure is reflected in the fact, that a multiplier scaled to N embeds multipliers scaled to $(N-1)/2$. Whenever the scaling parameter reduces to $N=1$, all the embedded components, but the XOR-gate of course, become scaled to 0, and thus the recursion stops.

FIG. 7: Multiplier MULAB(15)

This is a concrete example of MULAB for scaling parameter $N=15$, i.e. for strength $s=4$. The structure is displayed here on one single hierarchical layer instead of a recursive form. This view is obtained through the expansion of the embedded recursive components. All input/output buses have width 15. The bits of input bus B are fed through a cascade of swapping modules, and finally combined in 15 XOR-gates with bits of bus A. The swapping modules are controlled by bits of A too.

FIG. 8: Multiplier MULAIB(N)

This multiplier architecture computes the product $q=a^{-1} \cdot b$ for two permutations a and b, entered to the circuitry at the input buses A and B in their compact representation. The result q is produced on output bus Q. The width of the input and output buses is given by the scaling parameter N. The circuitry is purely combinational, and is similar to MULAB (N), except that the order of swapping module SW and multipliers UMUL and LMUL is reversed.

FIG. 9: Multiplier MULABI(N)

This multiplier architecture computes the product $q=a \cdot b^{-1}$ for two permutations a and b, entered to the circuitry at the input buses A and B in their compact representation. The result q is produced on output bus Q. The width of the input and output buses is defined by the scaling parameter N. The circuitry is purely combinational, and is similar to MULAB (N), except that swapping module SW is controlled by the high order output bit Q[N−1] instead of input bit A[N−1].

FIG. 10: Inverter INV1(N)

This inverter architecture computes the inverse $q=a^{-1}$ of a permutation a, entered to the circuitry at the input bus A in its compact representation. The result q is produced on output bus Q. The width of input and output buses is defined by the scaling parameter N. The circuitry is purely combinational. It consists of an upper and a lower inverter (UINV and resp. LINV) with input/output buses of width (N−1)/2; and of a swapping module SW with input/output buses of width (N−1)/2, and controlled by the high order input bit A[N−1]. The recursive structure is reflected in the fact that an inverter scaled to N has embedded inverters scaled to (N−1)/2. Whenever the scaling parameter reduces to N=1, all the embedded components become scaled to 0, and thus the recursion stops.

FIG. 11: Another inverter: INV2(N)

This inverter architecture computes the inverse $q=a^{-1}$ of a permutation a, entered to the circuitry at the input buses A in its compact representation. The result q is produced on output bus Q. The width of the input and output buses is defined by the scaling parameter N. The circuitry is purely combinational, and is similar to INV1(N), except that the order of swapping module SW and inverters UINV and LINV is reversed. The two schemes are equivalent with respect to function, speed and complexity.

DETAILED DESCRIPTION OF THE INVENTION

Canonical Logarithmic Signatures of $H_s$

It is well known that all Sylow p-subgroups of a finite group G are conjugate in G and hence isomorphic to each other. Hence, we talk about "the" Sylow p-subgroup of G when we refer to any one of these groups up to isomorphism. It can be seen that the Sylow 2-subgroup $H_s$ of the symmetric group $S_{2^s}$ on $2^s$ symbols (or points) is a group of order $2^{2^s-1}$. $H_s$ can be defined recursively as follows:

For s=1, $H_s=\mathbb{Z}_2$, the cyclic group of order 2, and for s>1, $H_s=H_{s-1}\wr\mathbb{Z}_2=(H_{s-1}\times H_{s-1})\cdot\mathbb{Z}_2$, namely, the wreath product of $H_{s-1}$ with $\mathbb{Z}_2$.

Our cryptosystem relies on a particular instance of $H_s$, which acts on symbol set $X_s=\{1, 2, 3, \ldots, 2^s\}$, and is further described as follows: The two instances of $H_{s-1}$ in the wreath product $H_s=(H_{s-1}\times H_{s-1})\cdot\mathbb{Z}_2$ act on symbol sets $X_{s-1}=\{1, 2, 3, \ldots, 2^{s-}\}$ and $\hat{X}_{s-1}=2^{s-1}+X_{s-1}=\{2^{s-1}+1, 2^{s-1}+2, 2^{s-1}+3, \ldots, 2^s\}$ respectively. In what follows we denote the first instance by $H_{s-1}$ and the second instance by $\hat{H}_{s-1}$. The permutation representation $T_s$ of $\mathbb{Z}_2$ contains exactly two permutations, the identity $\tau$ and an involution $\iota_s$, which exchanges the elements of $X_{s-1}$ with the elements of $\hat{X}_{s-1}$. It is easy to see that $\hat{H}_{s-1}=\tau_s^{-1}H_{s-1}\tau_s=H_{s-1}^{\tau_s}$, and $H_{s-1}=(\hat{H}_{s-1})^{\tau_s-1}=(\hat{H}_{s-1})^{\tau_s}$, i.e. $H_{s-1}$ and $\hat{H}_{s-1}$ are conjugates of each other by means of the element $\tau_s$.

The canonical logarithmic signature (LS) $\alpha_s$ of $H_s$ can be defined recursively in terms of the canonical LS's for $H_{s-1}$, $\hat{H}_{s-1}$ and $T_s$ respectively, as follows:

the first $2^{s-1}-1$ blocks $(A_0, \ldots A_2s-1_{-2})$ contain the canonical $\alpha_{s-1}$, and fix all the elements of $\hat{X}_s$.

the next $2^{s-1}-1$ blocks $(A_2s-1_{-1}, \ldots, A_2s_{-3})$ contain the canonical $\hat{\alpha}_{s-1}$ of $\hat{H}_{s-1}$, obtained by conjugating each element of $\alpha_{s-1}$ by the involution $\tau_s$. Thus, $\hat{\alpha}_{s-1}=\alpha_{s-1}^{\tau_s}=\{x^{\tau_s}|x \in \alpha_{s-1}\}$. Each element in $\hat{\alpha}_{s-1}$ fixes $X_s$ elementwise.

the last block $A_{2^s-2}$ consists of the identity permutation $\iota$ and the involution $\tau_s$, forming the canonical LS for group $T_s$.

We list the blocks $A_0, \ldots, A_{2^s-2}$ in reverse order with $A_0$ occupying the bottom of the table representing the LS, $A_1$ just above $A_0$, $A_2$ just above $A_1$, etc.

We clarify the above description by means of the following constructive definitions: Let $X_s=\{1, 2, 3, \ldots, 2^s\}$ and $\hat{X}_s=2^s+X_s$ be as above. Let $I_s$ be the vector $(1, 2, 3, \ldots, 2^s)$, and $\hat{I}_s=2^s+I_s$. More generally, if A is any n×m array with entries in $X_s$, we define $\hat{A}$ to be $2^s+A$, i.e. the result of adding $2^s$ to each element of A. Let $J_s$ denote the $(2^{s+1}-2)\times 2^s$ array of which each row is equal to $I_s$. Thus, $J_1$ and $\hat{J}_1$ are given by:

$$J_1: \begin{array}{|c|c|} \hline 1 & 2 \\ \hline 1 & 2 \\ \hline \end{array} \quad \hat{J}_1: \begin{array}{|c|c|} \hline 3 & 4 \\ \hline 3 & 4 \\ \hline \end{array}$$

We now define recursively the canonical logarithmic signature $\alpha_s$ of $H_s$ by:

$$\alpha_1: \begin{array}{|c|c|} \hline 1 & 2 \\ \hline 2 & 1 \\ \hline \end{array} \tag{i}$$

(ii) Suppose next that $\alpha_1, \alpha_2, \ldots, \alpha_{s-1}$ have been constructed, then:

$$\alpha_s: \begin{array}{|c|c|} \hline I_{s-1} & \hat{I}_{s-1} \\ \hline \hat{I}_{s-1} & I_{s-1} \\ \hline J_{s-1} & \hat{\alpha}_{s-1} \\ \hline \alpha_{s-1} & \hat{J}_{s-1} \\ \hline \end{array}$$

We note here that the above recursive definition for $\alpha_s$ could have been started with s=0, and $\alpha_0=[1]$.

We display, for example, the canonical logarithmic signatures for $H_1$, $H_2$, and $H_3$:

$$\alpha_1: \begin{array}{|c|c|} \hline 1 & 2 \\ \hline 2 & 1 \\ \hline \end{array} \quad \alpha_2: \begin{array}{|c|c|c|c|} \hline 1 & 2 & 3 & 4 \\ \hline 3 & 4 & 1 & 2 \\ \hline 1 & 2 & 3 & 4 \\ \hline 1 & 2 & 4 & 3 \\ \hline 1 & 2 & 3 & 4 \\ \hline 2 & 1 & 3 & 4 \\ \hline \end{array} \quad \alpha_3: \begin{array}{|c|c|c|c|c|c|c|c|} \hline 1 & 2 & 3 & 4 & 5 & 6 & 7 & 8 \\ \hline 5 & 6 & 7 & 8 & 1 & 2 & 3 & 4 \\ \hline 1 & 2 & 3 & 4 & 5 & 6 & 7 & 8 \\ \hline 1 & 2 & 3 & 4 & 7 & 8 & 5 & 6 \\ \hline 1 & 2 & 3 & 4 & 5 & 6 & 7 & 8 \\ \hline 1 & 2 & 3 & 4 & 5 & 6 & 8 & 7 \\ \hline 1 & 2 & 3 & 4 & 5 & 6 & 7 & 8 \\ \hline 1 & 2 & 3 & 4 & 6 & 5 & 7 & 8 \\ \hline 1 & 2 & 3 & 4 & 5 & 6 & 7 & 8 \\ \hline 3 & 4 & 1 & 2 & 5 & 6 & 7 & 8 \\ \hline 1 & 2 & 3 & 4 & 5 & 6 & 7 & 8 \\ \hline 1 & 2 & 4 & 3 & 5 & 6 & 7 & 8 \\ \hline 1 & 2 & 3 & 4 & 5 & 6 & 7 & 8 \\ \hline 2 & 1 & 3 & 4 & 5 & 6 & 7 & 8 \\ \hline \end{array}$$

This process continues inductively to define the canonical logarithmic signature $\alpha_s$, for $H_s$ in terms of that of $H_{s-1}$. We note that the rows of each $\alpha_s$ are permutations of the symbols of $X_s$ (in cartesian form.) Moreover, there are $2^s-1$ consecutive blocks of such permutations, each block containing exactly two permutations, i.e. the canonical logarithmic signature has type $(2, 2, \ldots, 2)$. It is clear that each block is a subgroup of $H_s$.

Representation Of Elements In $H_s$ With Respect To Any Logarithmic Signature If $\beta=(B_0, B_1, \ldots, B_{w-1})$ is a general logarithmic signature of $H_s$, then, $|B_i|=\tau_i=2^{m_i}$, and $|H_s|=\Pi_{i=0}^{w-1}\tau_i=2^{2^s-1}$. If $h \in H_s$, then $h$ has a unique representation as a product of the form $$h = x_{0,j_0} \cdot x_{1,j_1} \cdots x_{w-1,j_{w-1}}$$

where, $x_{i,j_i}$ is the $j_i^{th}$ element of block $B_i$, $0 \leq j_i < \tau_i$. Let $u_i$ be the binary vector of length $m_i$ representing the integer $j_i$ in its binary representation. Then by the representation of $h$ with respect to $\beta$ we mean the binary vector of length $l=2^s-1$ obtained by catenating the $u_i$, that is:

$$\beta(h) = u_0 || u_1 || \cdots || u_{w-1}$$

Conversely, given any binary vector $\upsilon=(\upsilon_0, \ldots, \upsilon_{l-1})$, separate $\upsilon$ into successive segments $\upsilon_i$ of length $m_i$, $0<i<w-1$. Let $j_i$ be the integer whose binary representation is $\upsilon_i$, $0<j_i<\tau_i$, $0<i<w-1$. Now, form the permutation $$h = x_{0,j_0} \cdot x_{1,j_1} \cdots x_{w-1,j_{w-1}}$$

where $x_{i,j_i}$ is as before. Then, $h = \beta^{-1}(\upsilon)$.

In the case where the logarithmic signature $\beta$ is in fact the canonical logarithmic signature $\alpha$ as described earlier, we obtain the compact representation of the elements of $H_s$ by binary vectors. In this case, we have $\alpha=(A_0, \ldots, A_{l-1})$, where $|A_i|=2$, and $l=2^s-1$. The binary vector $\alpha(h)=(j_0, j_1, \ldots, j_{l-1})$ is called the compact representation of $h$ with respect to the canonical logarithmic signature $\alpha$.

On the other hand, for any given binary vector $\upsilon=(j_0, j_1, \ldots, j_{l-1})$ there is a unique permutation $h$ which has $\upsilon$ as its compact representation, namely $h = x_{0,j_0} \cdot x_{1,j_1} \cdots x_{l-1,j_{l-1}}$. Thus the mappings $\alpha$ and $\alpha^{-1}$ are used to identify a permutation in the carrier group $H_s$ with a binary vector of length $l$.

The compact representation is therefore optimal, because $l$ is the minimum number of bits needed to represent a set with $2^l$ elements. On the other hand, direct hardware implementation of permutations in their cartesian form requires $(l+1) \log_2 (l+1)$ bits per permutation. Thus, our compact representation results in a significant storage reduction by a factor of $\log_2 (l+1)$. For example, in the case of message-block length $l=127$, the RAM needed for storing permutations in compact form is 7 times smaller than what is required by the cartesian form. Finally, the reduction in circuit complexity when using the compact representation, together with the fact that the knapsack circuit segments of the PGM algorithm can now be deleted, results in very significant speedups over circuits using cartesian hardware representation.

The Signature Generation Algorithm

We present an algorithm for generating a very large class $L$ of random logarithmic signatures of $G=H_s$, starting from the canonical signature $\alpha$ which is the basis for the compact representation. For short, we refer to this signature generation algorithm as SGA. The four main steps of SGA perform different types of operations and result in a sequence $\beta_0, \beta_1, \ldots, \beta_t$ of LS's for G, where $\beta_0=\alpha$, and $\beta=\beta_t$ is the desired randomized LS of G. Each step consists of a sequence of elementary operations. Each elementary operation transforms a logarithmic signature $\beta_i$ in the sequence to a logarithmic signature $\beta_{i+1}$ for G. Each LS $\beta$ in the class L produced by SGA has the property that factorization of any group element $g \in G$ with respect to $\beta$ can be carried out efficiently.

Step 1. Commutative shuffle

If $\beta=(B_0, B_1, \ldots, B_{w-1})$ is an LS for G, then two contiguous blocks $B_i$ and $B_{i+1}$ are said to commute if $xy=yx$ for any $x \in B_i$ and $y \in B_{i+1}$, i.e. if they commute elementwise. An elementary operation in Step 1 consists of transforming an LS $\beta$ by exhanging two neighboring commuting blocks. Step 1 generates a sequence of LS's $\beta_0, \beta_1, \ldots, \beta_m$ where $\beta_0=\alpha$, the canonical LS, and each $\beta_i$ is obtained from $\beta_{i-1}$ by the exchange of two contiguous commuting blocks. Such exchanges of commuting blocks are not applied beyond Step 1.

Step 2. Block fusion

After carrying out a random number of commutative shuffle operations in Step 1, a sequence of elementary operations, called block fusions, are performed in Step 2. Each operation replaces a randomly chosen collection of contiguous blocks, say $B_i, B_{i+1}, \ldots, B_{i+d-1}$, by a new block $C$ of size $2^d$, comprised of all elements of the form $x = x_i \cdot x_{i+1} \cdots x_{i+d-1}$, where $x_{i+j} \in B_{i+j}$, $j=0, \ldots, d-1$. It can be shown that any LS $\beta=(C_0, C_1, \ldots, C_{w-1})$, obtained from $\alpha$ by means of Steps 1. and 2., has the property that $(C_0, C_1, \ldots, C_i)$ is an LS for the group $G_i$ generated by $C_0, C_1, \ldots, C_i$ so that $G_i = C_0 \cdot C_1 \cdots C_i$, and $|G_i|=|C_0| \cdot |C_1| \cdots |C_i|$. These facts are crucial in making the following randomization step possible.

Step 3. Randomization

Let $\beta=(C_0, \ldots, C_{w-1})$ be the LS obtained by means of Steps 1. and 2. Then, $C_i$ is a complete set of coset representatives of the subgroup $G_{i-1}=C_0 \cdot C_1 \cdots C_{i-1}$ in the subgroup $G_i=C_0 \cdot C_1 \cdots C_{i-1} \cdot C_i$. Step 3. proceeds as follows: For each block $C_i$ and each element $x_{i,j} \in C_i$, $x_{i,j}$ is replaced by $z_{i,j} \cdot x_{i,j}$ where $z_{i,j}$ is a random element of the subgroup $G_{i-1}=C_0 \cdots C_{i-1}$. The operations of Step 3. in effect accomplish a change of the coset representatives $C_i$ by a different transversal $C'_i$.

Step 4. Permutation shuffle of blocks

Suppose that logarithmic signature $\beta=(C_0, \ldots, C_{w-1})$ has resulted from Steps 1., 2., and 3. In this final step 4., each block $C_i$ is reordered by applying a random permutation on the positions of the elements of $C_i$. The effect of this action is to simply rearrange the elements within each block.

We display an example of this algorithm for the canonical signature $\alpha$ for $H_3$.

We display an example of this algorithm for the canonical group basis $\alpha$ for $H_3$. The seven blocks of canonical group basis $\alpha$ for $H_3$:

| | | $\alpha$ | |
|---|---|---|---|
| | | Cartesian repr. | Compact repr. |
| $A_8$ | | 5 6 7 6 1 2 3 4 | 0 0 0 0 0 0 1 |
| | | 1 2 3 4 5 6 7 8 | 0 0 0 0 0 0 0 |
| $A_5$ | | 1 2 3 4 6 7 4 5 | 0 0 0 0 0 1 0 |
| | | 1 2 3 4 5 6 7 8 | 0 0 0 0 0 0 0 |
| $A_4$ | | 1 2 3 4 5 6 8 7 | 0 0 0 0 1 0 0 |
| | | 1 2 3 4 5 6 7 8 | 0 0 0 0 0 0 0 |
| $A_3$ | | 1 2 3 4 6 5 7 8 | 0 0 0 1 0 0 0 |
| | | 1 2 3 4 5 6 7 8 | 0 0 0 0 0 0 0 |
| $A_2$ | | 3 4 1 2 5 6 7 8 | 0 0 1 0 0 0 0 |
| | | 1 2 3 4 5 6 7 8 | 0 0 0 0 0 0 0 |
| $A_1$ | | 1 2 4 3 5 6 7 8 | 0 1 0 0 0 0 0 |
| | | 1 2 3 4 5 6 7 8 | 0 0 0 0 0 0 0 |
| $A_0$ | | 2 1 3 4 5 6 7 8 | 1 0 0 0 0 0 0 |
| | | 1 2 3 4 5 6 7 8 | 0 0 0 0 0 0 0 |

Step 1. Commutative shuffle yields:

| | | $\beta$ | |
|---|---|---|---|
| | | Cartesian repr. | Compact repr. |
| $B_6 = A_6$ | | 5 6 7 8 1 2 3 4 | 0 0 0 0 0 0 1 |
| | | 1 2 3 4 5 6 7 8 | 0 0 0 0 0 0 0 |
| $B_5 = A_5$ | | 1 2 3 4 7 8 5 6 | 0 0 0 0 0 1 0 |
| | | 1 2 3 4 5 6 7 8 | 0 0 0 0 0 0 0 |
| $B_4 = A_3$ | | 1 2 3 4 6 5 7 8 | 0 0 0 1 0 0 0 |
| | | 1 2 3 4 5 6 7 8 | 0 0 0 0 0 0 0 |
| $B_3 = A_2$ | | 3 4 1 2 5 6 7 8 | 0 0 1 0 0 0 0 |
| | | 1 2 3 4 5 6 7 8 | 0 0 0 0 0 0 0 |
| $B_2 = A_0$ | | 2 1 3 4 5 6 7 8 | 1 0 0 0 0 0 0 |
| | | 1 2 3 4 5 6 7 8 | 0 0 0 0 0 0 0 |
| $B_1 = A_1$ | | 1 2 4 3 5 6 7 8 | 0 1 0 0 0 0 0 |
| | | 1 2 3 4 5 6 7 8 | 0 0 0 0 0 0 0 |
| $B_0 = A_4$ | | 1 2 3 4 5 6 8 7 | 0 0 0 0 1 0 0 |
| | | 1 2 3 4 5 6 7 8 | 0 0 0 0 0 0 0 |

Step 2. Fusion of the blocks between double lines above yields:

| | $\gamma$ | | |
|---|---|---|---|
| | Cartesian repr. | Compact repr. | Product wrt. $\beta$ |
| $C_2$ | 5 6 7 8 4 3 0 2 | 0 0 0 1 0 1 1 | $b_{4,1} \cdot b_{5,1} \cdot b_{6,1}$ |
| | 5 6 7 8 3 4 0 2 | 0 0 0 0 0 1 1 | $b_{4,0} \cdot b_{5,1} \cdot b_{6,1}$ |
| | 5 6 7 8 2 0 3 4 | 0 0 0 1 0 0 1 | $b_{4,1} \cdot b_{5,0} \cdot b_{6,1}$ |
| | 5 6 7 8 0 2 3 4 | 0 0 0 0 0 0 1 | $b_{4,0} \cdot b_{5,0} \cdot b_{6,1}$ |
| | 1 2 3 4 8 7 5 6 | 0 0 0 1 0 1 0 | $b_{4,1} \cdot b_{5,1} \cdot b_{6,0}$ |
| | 1 2 3 4 7 8 5 6 | 0 0 0 0 0 1 0 | $b_{4,0} \cdot b_{5,1} \cdot b_{6,0}$ |
| | 1 2 3 4 6 5 7 8 | 0 0 0 1 0 0 0 | $b_{4,1} \cdot b_{5,0} \cdot b_{6,0}$ |
| | 1 2 3 4 5 6 7 8 | 0 0 0 0 0 0 0 | $b_{4,0} \cdot b_{5,0} \cdot b_{6,0}$ |
| $C_1$ | 4 3 1 2 5 6 7 8 | 1 0 1 0 0 0 0 | $b_{2,1} \cdot b_{3,1}$ |
| | 3 4 1 2 5 6 7 8 | 0 0 1 0 0 0 0 | $b_{2,0} \cdot b_{3,1}$ |
| | 2 1 3 4 5 6 7 8 | 1 0 0 0 0 0 0 | $b_{2,1} \cdot b_{3,0}$ |
| | 1 2 3 4 5 6 7 8 | 0 0 0 0 0 0 0 | $b_{2,0} \cdot b_{3,0}$ |
| $C_0$ | 1 2 4 3 5 6 8 7 | 0 1 0 0 1 0 0 | $b_{0,1} \cdot b_{1,1}$ |

| | $\gamma$ | | |
|---|---|---|---|
| | Cartesian repr. | Compact repr. | Product wrt. $\beta$ |
| | 1 2 4 3 5 6 7 8 | 0 1 0 0 0 0 0 | $b_{0,0} \cdot b_{1,1}$ |
| | 1 2 3 4 5 6 8 7 | 0 0 0 0 1 0 0 | $b_{0,1} \cdot b_{1,0}$ |
| | 1 2 3 4 5 6 7 8 | 0 0 0 0 0 0 0 | $b_{0,0} \cdot b_{1,0}$ |

Step 3. Randomization yields:

| | $\delta$ | | |
|---|---|---|---|
| | Cartesian repr. | Compact repr. | Product wrt. $\gamma$ |
| $D_2$ | 8 7 5 6 4 3 1 2 | 1 0 1 1 0 1 1 | $c_{0,0} \cdot c_{1,3} \cdot c_{2,7}$ |
| | 7 8 5 6 3 4 2 1 | 0 0 1 0 1 1 1 | $c_{0,1} \cdot c_{1,2} \cdot c_{2,6}$ |
| | 6 5 8 7 2 1 3 4 | 1 1 0 1 0 0 1 | $c_{0,2} \cdot c_{1,1} \cdot c_{2,5}$ |
| | 5 6 8 7 1 2 4 3 | 0 1 0 0 1 0 1 | $c_{0,3} \cdot c_{1,0} \cdot c_{2,4}$ |
| | 1 2 3 4 8 7 5 6 | 0 0 0 1 0 1 0 | $c_{0,0} \cdot c_{1,0} \cdot c_{2,3}$ |
| | 2 1 3 4 7 8 6 5 | 1 0 0 0 1 1 0 | $c_{0,1} \cdot c_{1,1} \cdot c_{2,2}$ |
| | 3 4 2 1 6 5 7 8 | 0 1 1 1 0 0 0 | $c_{0,2} \cdot c_{1,2} \cdot c_{2,1}$ |
| $D_1$ | 4 3 2 1 5 6 7 8 | 1 1 1 0 0 0 0 | $c_{0,3} \cdot c_{1,3} \cdot c_{2,0}$ |
| | 4 3 1 2 5 6 8 7 | 1 0 1 0 1 0 0 | $c_{0,1} \cdot c_{1,3}$ |
| | 3 4 2 1 5 6 7 8 | 0 1 1 0 0 0 0 | $c_{0,2} \cdot c_{1,2}$ |
| | 2 1 3 4 5 6 8 7 | 1 0 0 0 1 0 0 | $c_{0,1} \cdot c_{1,1}$ |
| $D_0$ | 1 2 4 3 5 6 8 7 | 0 1 0 0 1 0 0 | $c_{0,3} \cdot c_{1,0}$ |
| | 1 2 4 3 5 6 8 7 | 0 1 0 0 1 0 0 | $c_{0,3}$ |
| | 1 2 4 3 5 6 7 8 | 0 1 0 0 0 0 0 | $c_{0,2}$ |
| | 1 2 3 4 5 6 8 7 | 0 0 0 0 1 0 0 | $c_{0,1}$ |
| | 1 2 3 4 5 6 7 8 | 0 0 0 0 0 0 0 | $c_{0,0}$ |

Step 4. Permutation shuffle yields:

| | $\epsilon$ | | |
|---|---|---|---|
| | Cartesian repr. | Compact repr. | Element wrt. $\delta$ |
| $E_2$ | 1 2 3 4 8 7 5 6 | 0 0 0 1 0 1 0 | $d_{2,3}$ |
| | 4 3 2 1 5 6 7 8 | 1 1 1 0 0 0 0 | $d_{2,0}$ |
| | 6 5 8 7 2 1 3 4 | 1 1 0 1 0 0 1 | $d_{2,5}$ |
| | 5 6 8 7 1 2 4 3 | 0 1 0 0 1 0 1 | $d_{2,4}$ |
| | 2 1 3 4 7 8 6 5 | 1 0 0 0 1 1 0 | $d_{2,2}$ |
| | 8 7 5 6 4 3 1 2 | 1 0 1 1 0 1 1 | $d_{2,7}$ |
| | 7 8 5 6 3 4 2 1 | 0 0 1 0 1 1 1 | $d_{2,6}$ |
| | 3 4 2 1 6 5 7 8 | 0 1 1 1 0 0 0 | $d_{2,1}$ |
| $E_1$ | 2 1 3 4 5 6 8 7 | 1 0 0 0 1 0 0 | $d_{1,1}$ |
| | 4 3 1 2 5 6 8 7 | 1 0 1 0 1 0 0 | $d_{1,3}$ |
| | 1 2 4 3 5 6 8 7 | 0 1 0 0 1 0 0 | $d_{1,0}$ |
| | 3 4 2 1 5 6 7 8 | 0 1 1 0 0 0 0 | $d_{1,2}$ |
| $E_0$ | 1 2 3 4 5 6 8 7 | 0 0 0 0 1 0 0 | $d_{0,1}$ |
| | 1 2 3 4 5 6 7 8 | 0 0 0 0 0 0 0 | $d_{0,0}$ |
| | 1 2 4 3 5 6 7 8 | 0 1 0 0 0 0 0 | $d_{0,2}$ |
| | 1 2 4 3 5 6 8 7 | 0 1 0 0 1 0 0 | $d_{0,3}$ |

Factorization With Respect To Signatures Generated By SGA

We describe a methodology for factoring any element in the carrier group $G=H_s$ with respect to a given logarithmic signature generated by algorithm SGA. Let $\beta=(B_0, B_1, \ldots, B_{w-1})$ be a logarithmic signature of $H_s$ obtained from SGA, where $|B_i|=r_i=2^{m_i}$, and $|H_s|=2^{2^{s-1}}=\Pi_{i=0}^{w-1} r_i$. Again, let $\alpha=(A_0, A_1, \ldots, A_{v-1})$ be the canonical signature used for the compact representation of the elements of $H_s$, where $v=2^s-1$ and $|B_i|=2$ for all $0 \leq i \leq w-1$. Let $$h = x_{0,j_0} x_{1,j_1} \ldots x_{v-1,j_{v-1}}$$

be the unique representation of an element $h \in H_s$ with respect to $\alpha$ of an element $h \in H_s$, where $x_{i,j_i}$ is the $j_i^{th}$ element of block $A_i$, $0 \leq j_i \leq 1$. Then the compact representation of h is the binary vector $\alpha(h)=(j_0, j_1, \ldots, j_{v-1})$. In this form, factoring an element h, given its compact representation $\alpha(h)$, becomes trivial: each bit $j_i$ of the vector $\alpha(h)$ refers to the unique factor $x_{i,j_i}$ in block $A_i$, i.e. if $j_i=0$ then $x_{i,0}$ is the identity permutation, whereas if $j_i=1$ then $x_{i,1}$ is the non-identity element of $A_i$. When talking about the bits of a permutation $h \in G$ we always mean the bits of $\alpha(h)$.

In general, factoring an element $h \in H_s$ with respect to a logarithmic signature $\beta=(B_0, B_1, \ldots, B_{w-1})$ is the process of finding the factors $y_{i,j_i} \in B_i$, $i=0, \ldots, w-1$, and $0 \leq j_i \leq r_i-1$ in the unique representation of h as a product of the form $$h = y_{0,j_0} y_{1,j_1} \cdots y_{w-1,j_{w-1}}$$

Actually, the factoring procedure will find the factors in reverse order, i.e. first the factor $y_{w-1,j_{w-1}}$, then $y_{w-2,j_{w-2}}$, and so forth, with $y_{0,j_0}$ last to be determined.

To simplify our description of the factorization process we adopt the notation:

$$h_{w-t} = y_{0,j_0} y_{1,j_1} \cdots y_{w-t,j_{w-t}}, \quad 0 < t \leq w$$

Thus, we have $h = h_{w-1}$, and $$h_{w-t} = h_{w-t-1} \cdot y_{w-t,j_{w-t}}$$

Given $h \in H_s$, the factoring algorithm first finds $y_{w-1,j_{w-1}} \in B_{w-1}$ and computes $h_{w-2}=h \cdot (y_{w-1,j_{w-1}})^{-1}$. The permutation $h_{w-2}$ is an element of the group $G_{w-2}=B_0 \cdots B_{w-2}$ having $(B_0, \ldots, B_{w-2})$ as a logarithmic signature. The factoring algorithm then finds the factor $y_{w-2,j_{w-2}} \in B_{w-2}$ and computes $h_{w-3}=h_{w-2} \cdot (y_{w-2,j_{w-2}})^{-1}$. Again $h_{w-3}$ is an element of the group $G_{w-3}=B_0 \cdots B_{w-3}$ having $(B_0, \ldots, B_{w-3})$ as a logarithmic signature. The factoring algorithm is then repeated to find factor $y_{w-3,j_{w-3}} \in B_{w-3}$ and so forth until factor $y_{0,j_0} \in B_0$ is finally found. Thus, the factoring process is iterative and completes after $w-1$ iterations.

For the sake of clarity in describing the iteration step of the factoring algorithm, some terminology needs to be introduced.

Suppose that $\gamma=(C_0, \ldots C_{w-1})$ is an LS obtained by means of SGA. Then, there are several bit positions at which all elements of $C_i$ have value 0. For short, we say that $C_i$ fixes those bits at 0. Note also that blocks $C_0, C_1, \ldots, C_{i-1}$ fix the same bits at 0 as $C_i$, plus exactly $m_i$ more bits, where $r_i=2^{m_i}$ is the length of block $C_i$. These $m_i$ bits, i.e. bits fixed by $C_0, C_1, \ldots, C_{i-1}$ but not by $C_i$ are called the key bits of $C_i$. It follows from the construction of $\gamma$ that the $2^{m_i}$ elements of $C_i$ exhibit all $2^{m_i}$ different binary patterns at the key bits.

Now, at each iteration step i, finding factor $y_{i,j_i} \in C_i$ proceeds as follows:

Let $h_i$ be an element of the group $G_i$ having $(C_0, \ldots, C_i)$ as a logarithmic signature. The factoring algorithm searches for the unique element $y_{i,j_i} \in C_i$ having exactly the same bit pattern as $h_i$ on the key bits of $C_i$.

To prove the correctness of the factoring algorithm, we follow the 4 steps of SGA while generating the signature $\gamma$.

Commutative shuffle

Each operation in this step is an exchange of two neighboring commutative blocks, say $A_i$ and $A_{i+1}$, of the canonical signature $\alpha$, and thus produces a logarithmic signature $\alpha_1=(A_0, \ldots, A_{i-1}, A_{i+1}, A_i, A_{i+2}, \ldots, A_{v-1})$. Factoring an element $h \in H_s$ with respect to $\alpha_1$ is just the same as with respect to $\alpha$, because the two factors $x_{i,j_i}$ and $x_{i+1,j_{i+1}}$ are commutative, i.e. $x_{i,j_i} x_{i+1,j_{i+1}} = x_{i+1,j_{i+1}} x_{i,j_i}$.

Any further exchange of neighboring commutative blocks of $\alpha_a$ gives a further logarithmic signature $\alpha_2$, for which the factorization remains the same as for $\alpha_1$. This shows that any sequence of commutative block exchanges produces a logarithmic signature, for which the factorization remains in essence the same as for $\alpha$.

Fusion

The fusion of $m_i$ neighboring blocks $B_{M_i}, \ldots, B_{M_i+m_i-1}$, where $M_0=0$ and $M_j=m_0+\ldots+m_{j-1}$ for $j>0$, forms block $C_i$. Block $C_i$ has $2^{m_i}$ binary vectors having all $2^{m_i}$ possible bit patterns at bits $M_i, M_i+1, \ldots, M_i+m_i-1$, the so called key bits of $C_i$, and all other bits are 0.

In order to find a factor in $C_i$ for a permutation h with respect to a logarithmic signature containing the fused block $C_i$, the factoring algorithm will select the unique element in $C_i$ having the same bit pattern as h at the key bits.

Randomization

Suppose a fused signature with w blocks $(C_0, \ldots, C_{w-1})$ is obtained after the fusion step, where $C_i$ is the fusion of $B_{M_i}, \ldots, B_{M_i+m_i-1}$, where $M_0=0$, and for $j>0$, $M_j=m_0+\ldots+m_{j-1}$. Then the type of the signature is $r=(r_0, \ldots, r_{w-})$, where $r_i=2^{m_i}$. Each step of the randomization process effects a replacement of an element $c_{i,j} \in C_i$ by an element $z_{i,j} c_{i,j}$, where $z_{i,j} \in G_{i-1}=C_0 \cdot C_1 \ldots C_{i-1}=<B_0, \ldots, B_{m_0-1}, B_{M_1}, \ldots, B_{M_1+m_1-1}, \ldots, B_{M_{i-1}}, \ldots, B_{M_{i-1}+m_{i-1}-1}>$. It follows that $z_{i,j}$ contains random bits at positions $\{0, \ldots, m_0-1, M_1, \ldots, M_1+m_1-1, \ldots, M_{i-1}, \ldots, M_{i-1}+m_{i-1}-1\}=\{0, \ldots, M_{i-1}+m_{i-1}-1\}=\{0, \ldots, M_i-1\}$, and 0 elsewhere. On the other hand, the non-zero bits of $c_{i,j}$ can occur only at key positions $\{M_i, \ldots, M_i+m_i-1\}$. In other words, $z_{i,j}$ and $c_{i,j}$ factor with respect to $\alpha$ as $z_{i,j}=x_0 \ldots x_{M_i-1}$ and $c_{i,j}=x_{M_i} \ldots x_{M_i+m_i-1}$, where $x_t \in B_t$. It follows that their product $z_{i,j} \cdot c_{i,j}=x_0 \ldots x_{M_i-1} x_{M_i} \ldots x_{M_i+m_i-1}$ can be formed by simply taking the bitwise OR of the compact representations of $z_{i,j}$ and $c_{i,j}$.

Consequently, the compact representation of $z_{i,j} \cdot c_{i,j}$ contains the same bit pattern at key bits $M_i, \ldots, M_i+m_i-1$ as $c_{i,j}$ does. In other words, the key bits of $C_i$ remain unchanged during the randomization.

With the same argumentation it can be seen that the compact representation of a permutation $h_i=(h_{i-1}z_{i,j})c_{i,j} \in G_i$, since $(h_{i-1}z_{i,j}) \in G_{i-1}$ contains the same bit pattern at the key bits as $c_i$.

To recapitulate, factorization of a permutation h with respect to the randomized signature proceeds in w steps: in step i the algorithm selects the unique element $y_{i,j}=z_{i,j}c_{i,j} \in C_i$ having the same bit pattern as $h_i$ at the key bits of $C_i$. The procedure is then repeated for $h_{i-1}=h_i \cdot (z_{i,j}c_{i,j})^{-1}$ and so on.

Permutation shuffle

Shuffling coset representatives within a block does not change the actual factors of a permutation h with respect to the signature, it only changes the assignment of indices to factors. It has therefore no impact on the selection process for finding factors within each block, except for possibly finding the appropriate elements $y_{i,j}$ in a different position inside the $i^{th}$ block.

An example of factorization

In this section we provide an example which demonstrates the factorization procedure for some random element of the carrier group $H_3$ with respect to LS $\epsilon$ as produced by the Signature Generation Algorithm of this Detailed Description of the invention. For easy reference logarithmic signature $\epsilon$ is displayed again below:

| | ε | |
|---|---|---|
| | Cartesian repr. | Compact repr. |
| $E_2$ | 1 2 3 4 8 7 5 6 | 0 0 0 1 0 1 0 |
| | 4 3 2 1 5 6 7 8 | 1 1 1 0 0 0 0 |
| | 6 5 8 7 2 1 3 4 | 1 1 0 1 0 0 1 |
| | 5 6 8 7 1 2 4 3 | 0 1 0 0 1 0 1 |
| | 2 1 3 4 7 8 6 5 | 1 0 0 0 1 1 0 |
| | 8 7 5 6 4 3 1 2 | 1 0 1 1 0 1 1 |
| | 7 8 5 6 3 4 2 1 | 0 0 1 0 1 1 1 |
| | 3 4 2 1 6 5 7 8 | 0 1 1 1 0 0 0 |
| $E_1$ | 2 1 3 4 5 6 8 7 | 1 0 0 0 1 0 0 |
| | 4 3 1 2 5 6 8 7 | 1 0 1 0 1 0 0 |
| | 1 2 4 3 5 6 8 7 | 0 1 0 0 1 0 0 |
| | 3 4 2 1 5 6 7 8 | 0 1 1 0 0 0 0 |
| $E_0$ | 1 2 3 4 5 6 8 7 | 0 0 0 0 1 0 0 |
| | 1 2 3 4 5 6 7 8 | 0 0 0 0 0 0 0 |
| | 1 2 4 3 5 6 7 8 | 0 1 0 0 0 0 0 |
| | 1 2 4 3 5 6 8 7 | 0 1 0 0 1 0 0 |

Consider the element x=1 1 0 0 1 0 1 which is the compact representation of permutation X=6 5 8 7 1 2 3 4 in cartesian form. The key bits for block $E_2$ are $\{4, 6, 7\}$, the key bits for $E_1$ are $\{1, 3\}$ and the key bits for $E_0$ are $\{2, 5\}$.

1. The bits of x on $\{4, 6, 7\}$ are 0 0 1 matching the element c=0 1 0 0 1 0 1 of block $E_2$, corresponding to cartesian form C=5 6 8 7 1 2 4 3.

2. We now compute $y = x \cdot c^{-1} = 1\ 0\ 0\ 0\ 0\ 0\ 0$ with cartesian form Y=2 1 3 4 5 6 7 8. The bits of y on $\{1,3\}$ match those of element b=1 0 0 0 1 0 0 of block $E_1$, corresponding to cartesian form B=2 1 3 4 5 6 8 7.

3. We next compute $z = x \cdot c^{-1} \cdot b^{-1} = y \cdot b^{-1} = 0\ 0\ 0\ 1\ 1\ 0\ 1$, with cartesian form Z=5 6 7 8 2 1 4 3.

4. The bits of z on $\{2,5\}$ match those of element a=0 0 0 0 1 0 0 with cartesian form A=1 2 3 4 5 6 8 7.

5. This completes the factoring process for x.

We can now check that $x = a \cdot b \cdot c$, as well the counterpart equality of permutations in cartesian form $X = A \cdot B \cdot C$.

Multiplication In Compact Representation

In what follows we describe a series of algorithms and corresponding circuitry, the hardware implementations of those algorithms, for performing multiplication and inversion of elements of our carrier group $G = H_s$. In particular, we introduce 3 algorithms and corresponding designs for the computation of products $q = a \cdot b$, $q = a^{-1} \cdot b$ and $q = a \cdot b^{-1}$, as well as 2 algorithms and designs for computing the inverse $q = a^{-1}$. The algorithms and circuitry operate directly with the compact representations of the elements of $H_s$. We presently consider only the fundamental case. The extension of the schemes to 2-groups of order other than $2^{2^s-1}$ will be handled at a later stage.

Multiplication $a \cdot b$

As described in the previous subsections, group $H_s$ has a recursive structure: $H_s = (H_{s-1} \times \hat{H}_{s-1}) \cdot T_s$. The canonical LS $\alpha_s$ reflects the structure of $H_s$: $\alpha_s$ consists of a canonical LS $\alpha_{s-1}$ of $H_{s-1}$, of another canonical LS $\hat{\alpha}_{s-1}$ of $\hat{H}_{s-1}$ and of the last block, which is a canonical LS of $T_s$. The compact representation with respect to $\alpha_s$ inherits the same kind of recursive structure. If binary vector $(j_0, \ldots, j_{l-1})$ is the compact representation of a permutation $h = (m \cdot \hat{n}) \cdot t$, where h $\in H_s$, m $\in H_{s-1}$, $\hat{n} = n^{\tau_s} \in \hat{H}_{s-1}$ (i.e., n $\in H_{s-1}$) and t $\in T_s$, then bits $(j_0, \ldots, jl-1/2_{-1})$ form the compact representation of m with respect to $\alpha_{s-1}$, bits $(jl-1/2, \ldots, j_{l-2})$ form the compact representation of $\hat{n}$ with respect to $\hat{\alpha}_{s-1}$ (i.e. of n wrt. $\alpha_{s-1}$), and finally bit $j_{l-1}$ indicates factor t.

Now, the multiplication method takes operands $\alpha = r_a \cdot t_a = (m_a \cdot \hat{n}_a) \cdot t_a$ and $b = r_b \cdot t_b = (m_b \cdot \hat{n}_b) \cdot t_b$ in their compact representations $a = (a_0, \ldots, a_{l-1})$ and resp. $b = (b_0, \ldots, b_{l-1})$. The product $q = r_q \cdot t_q = (m_q \cdot \hat{n}_q) \cdot t_q$ can be formed as follows: $a \cdot b = r_a \cdot t_a \cdot r_b \cdot t_b = r_a \cdot (t_a \cdot r_b \cdot t_a^{-1}) \cdot t_a \cdot t_b = r_a \cdot r_b^{t_a} \cdot t_a \cdot t_b$. Since $r_b \in (H_{s-1} \times \hat{H}_{s-1}) \triangledown H_s$, the conjugate $r_b^{t_a}$ lies also in $(H_{s-1} \times \hat{H}_{s-1})$. Therefore it is readily shown that $t_q = t_a \cdot t_b$ and $r_q = r_a \cdot r_b^{t_a}$.

In the following we first consider how to compute $t_q$, and then we show how to compute $r_q$. Since $t_a$, $t_b \in T_s \cong \mathbb{Z}_2$, and $t_a$ and $t_b$ are indicated solely by bits $a_{l-1}$ and $b_{l-1}$ respectively, the multiplication in $T_s$ can be effected by an elementary binary exclusive-OR ($\oplus$) operation: $q_{l-1} = a_{l-1} \oplus b_{l-1}$.

The "normal" part $r_q = r_a \cdot r_b^{t_a}$ will be computed in two steps:

Step 1. the conjugate $r'_b = r_b^{t_a}$ is formed, and then
Step 2. the multiplication $r_a \cdot r'_b$ is performed.

Step 1. Conjugation of $r_b = m_b \cdot \hat{n}_b \in (H_{s-1} \times \hat{H}_{s-1})$ by $t_a \in T_s$ involves two cases:

— if $t_a = \iota$ then trivially $m'_b = m_b$ and $\hat{n}'_b = \hat{n}_b$ (i.e. $n'_b = n_b$);
— if, on the other hand, $t_a = \tau_s$ then, since $\tau_s$ transforms elements of $H_{s-1}$ to corresponding elements of $\hat{H}_{s-1}$, and vice versa, $m'_b = \hat{n}_b^{\tau_s} = n_b$ and $\hat{n}'_b = m_b^{\tau_s}$ (i.e. $n_b = m'_b$).

When representing operands in compact form, conjugating $r_b$ by $\iota$ (induced by $a_{l-1} = 0$) does not change $r_b$, whereas conjugating by $\tau_s$ (induced by $a_{l-1} = 1$) can be implemented as a swap of the subsequences $(b_0, \ldots, bl-1/2_{-1})$ and $(bl-1/2, \ldots, b_{l-2})$, corresponding to $m_b$ and respectively to $\hat{n}_b$, within the compact representation of b.

Step 2. Next, $r_a = m_a \cdot \hat{n}_a$ is multiplied by the the conjugate $r'_b = m'_b \cdot \hat{n}'_b$. Multiplication can be effected "componentwise" in the direct product group $(H_{s-1} \times \hat{H}_{s-1})$, i.e. $r_a \cdot r'_b = m_a \cdot \hat{n}_a \cdot m'_b \cdot \hat{n}'_b = (m_a \cdot m'_b) \cdot (\hat{n}_a \cdot \hat{n}'_b)$. Components of the product $r_q = m_q \cdot \hat{n}_q$ are therefore computed separately and independently: $m_q = m_a \cdot m'_b$ and $\hat{n}_q = \hat{n}_a \cdot \hat{n}'_b$. From $\hat{n}_q = \hat{n}_a \cdot \hat{n}'_b$ follows that $n_q = n_a \cdot n_b$, showing that the latter multiplication can also be performed in $H_{s-1}$.

So far, it has been shown that the product q is obtained from the compact representation of input operand a and b applying a single XOR-operation, a conditional swapping operation and, recursively two independent calls of the algorithm forming products in $H_{s-1}$, and thus of reduced complexity s−1. In what follows we describe a hardware multiplier that implements this method at very high speeds.

Swapping Module

We first describe a swapping module SW(M) with scaling parameter M which has two input vectors (X[0], ..., X[M−1]), (Y[0], ..., Y[M−1]), and two output vectors (V[0], ..., V[M−1]), (W[0], ..., W[M−1]), as well as a control input bit Z. If control signal Z is set to 0, each X[i] is directly connected to V[i], and each Y[i] is connected to W[i], whereas if Z=1, then each X[i] is connected to W[i], and each Y[i] is connected to V[i], for $0 \leq i \leq M-1$. This circuit is used throughout, in the hardware implementation of the various permutation multipliers and inverters.

Multiplier circuit for $a \cdot b$

We present a recursive description of the multiplier which computes $Q = A \cdot B$. Let MULAB(N) denote such a multiplier of strength s with two input vectors A, B, and one output vector Q, each of length $N = l = 2^s - 1$. The architecture of the multiplier is depicted in FIG. 6.

The inputs to MULAB(N) are binary vectors (A[0], A[1], ..., A[N−1]) and (B[0], B[1], ..., B[N−1]). Bits B[0], ..., B[(N−3)/2] are connected to the X-bus, while bits B[(N−1)/2], ..., B[N−2] to the Y-bus of a swapping module SW of type SW((N−1)/2). Bit A[N−1] is connected to the control input bit Z of SW. Moreover, bits A[N−1] and B[N−1] are XOR'ed and the result is output as bit Q[N−1]. The V-bus of SW is connected to the B-bus of a lower multiplier LMUL, and the W-bus of SW is connected to the B-bus of an upper multiplier UMUL. Moreover, bits A[0], . . . , A[(N−3)/2] are connected to the A-bus of LMUL, while bits A[(N−1)/2], . . . , A[N−2] are connected to the A-bus of UMUL. Both LMUL and UMUL are of type MULAB((N−1)/2) and perform multiplication of the form Q=A·B.

The Q-bus of LMUL forms output bits Q[0], . . . , Q[(N−3)/2], and the Q-bus of UMUL forms output bits Q[(N−1)/2], . . . , Q[N−2].

Due to the recursive structure apparent in the design, the multiplier can be scaled easily for any length $N=l=2^s−1$. The depth of the circuitry is proportional to $\log_2(N+1)=s$, promising a very high speed at reasonably low costs. For illustration, a concrete realization for strength s=4 and input/output length N=l=15 is displayed with a flattened hierarchy in FIG. 7.

Multiplication $a^{-1} \cdot b$

A simple derivation yields: $q=a^{-1} \cdot b=(r_a \cdot t_a)^{-1} \cdot (r_b \cdot t_b)=t_a^{-1} \cdot r_a^{-1} \cdot r_b \cdot t_b=(r_a^{-1} \cdot r_b)^{t_a} \cdot t_a \cdot t_b$. Since $(r_a^{-1} \cdot r_b)^{t_a} \in (H_{s-1} \times \hat{H}_{s-1})$, it is readily seen that $t_q = t_a \cdot t_b$ and $r_q = (r_a^{-1} \cdot r_b)^{t_a}$.

Computing $t_q$ requires a single binary XOR-operation in $\mathbb{Z}_2$. The "normal" part $r_q$ is computed in two steps. At first, the product $r'_q = r_a^{-1} \cdot r_b$ is computed, and then the conjugation $(r'_q)^{t_a}$ is performed. Since multiplication and inversion can be performed component-wise in the direct product group $(H_{s-1} \times \hat{H}_{s-1})$, the product $r'_q$ has components $m'_q = m_a^{-1} \cdot m_b$ and $\hat{n}'_q = \hat{n}_a^{-1} \cdot \hat{n}_b$. From $\hat{n}'_q = \hat{n}_a^{-1} \cdot \hat{n}_b$ follows $n'_q = n_a^{-1} \cdot n_b$, showing that the latter multiplication can be performed in $H_{s-1}$. Conjugation of $r'_q$ falls into two cases:

if $t_a = \iota$ then trivially $m_q = m'_q$ an $n_q = n'_q$;

if $t_a \tau_s$ then $m_q = n'_q$ and $n_q = m'_q$.

When the operands are represented in compact form, the multiplication requires a single binary XOR-operation, two multiplications of type $a^{-1} \cdot b$ of reduced complexity (strength), as a recursive step, and finally a conditional swapping operation. The corresponding hardware multiplier MULAIB(N) of strength s, with two input vectors A, B, and one output vector Q, each of length $N=l=2^s−1$, is shown in FIG. 8.

Multiplier circuit for $a^{-1} \cdot b$

The inputs to MULAIB(N) are binary vectors (A[0], A[1], . . . , A[N−1]) and (B[0], B[1], . . . , B[N−1]). Bits A[0], . . . , A[(N−3)/2] are connected to the A-bus of a lower multiplier LMUL, while bits A[(N−1)/2], . . . , A[N−2] are connected to the A-bus of an upper multiplier UMUL. Moreover, bits B[0], . . . , B[(N−3)/2] are connected to the B-bus of LMUL, while bits B[(N−1)/2], . . . , B[N−2] are connected to the B-bus of UMUL. Both LMUL and UMUL are of type MULAIB((N−1)/2).

Bits A[N−1] and B[N−1] are XOR'ed and the result is output as bit Q[N−1]. The Q-bus of LMUL is connected to the X-bus, while the Q-bus of UMUL is connected to the Y-bus of a swapping module SW of type SW((N−1)/2). Bit A[N−1] is connected to the control input bit Z of SW.

The V-bus of SW forms output bits Q[0], . . . , Q[(N−3)/2], and the W-bus of SW forms output bits Q[(N−1)/2], . . . , Q[N−2].

Multiplication $a \cdot b^{-1}$

A simple derivation yields : $q=a \cdot b^{-1} = (r_a \cdot t_a) \cdot (r_b \cdot t_b)^{-1} = r_a \cdot t_a \cdot t_b^{-1} \cdot r_b^{-1} = r_a \cdot (t_a \cdot t_b) \cdot r_b^{-1} = r_a \cdot (r_b^{-1})^{(t_a \cdot t_b)} \cdot (t_a \cdot t_b) = r_a \cdot (r_b^{(t_a \cdot t_b)})^{-1} \cdot (t_a \cdot t_b)$. Since $r_a \cdot (r_b^{(t_a \cdot t_b)})^{-1} \in (H_{s-1} \times \hat{H}_{s-1})$ it is readily seen that $t_q = t_a \cdot t_b$ and $r_q = r_a \cdot (r_b^{(t_a \cdot t_b)})^{-1}$.

Computing $t_q$ requires a single binary XOR-operation in $\mathbb{Z}_2$. The "normal" part $r_q$ is computed in two steps. As a first step, the conjugation $r'_b = r_b^{(t_a \cdot t_b)}$ is carried out, and then the product $r_q = r_a \cdot (r'_b)^{-1}$ is computed. Conjugating $r_b$ by $t_a \cdot t_b$ falls into two cases:

if $t_a \cdot t_b = \iota$ then trivially $m'_b = m_b$ and $n'_b = n_b$;

if $t_a \cdot t_b = \tau_s$ then $m'_b = n_b$ and $n'_b = m_b$.

Since multiplication and inversion can be performed component-wise in the direct product group $(H_{s-1} \times \hat{H}_{s-1})$, the product $r_q$ has components $m_q = m_a \cdot (m'_b)^{-1}$ and $\hat{n}_q = \hat{n}_a \cdot (\hat{n}'_b)^{-1}$. From $\hat{n}_q = \hat{n}_a \cdot (\hat{n}'_b)^{-1}$ follows that $n_q = n_a \cdot (n'_b)^{-1}$, showing that the latter multiplication can be performed in $H_{s-1}$.

When operands are represented in compact form, the multiplication requires a single binary XOR-operation, a conditional swapping operation and finally two multiplications of type $a \cdot b^{-1}$ and of reduced complexity (strength), as a recursive step. The corresponding hardware multiplier MULABI(N) of strength s, with two input vectors A, B, and one output vector Q, each of length $N=l=2^s−1$, is shown in FIG. 9.

Multiplier circuit for $a \cdot b^{-1}$

The inputs to MULABI(N) are binary vectors (A[0], A[1], . . . , A[N−1]) and (B[0], B[1], . . . , B[N−1]). Bits B[0], . . . , B[(N−3)/2] are connected to the X-bus, while bits B[(N−1)/2], . . . , B[N−2] to the Y-bus of a swapping module SW of type SW((N−1)/2).

Moreover, bits A[N−1] and B[N−1] are XOR'ed and the result is, on one hand, output as bit Q[N−1], and is further connected to the control input bit Z of SW. The V-bus of SW is connected to the B-bus of a lower multiplier LMUL, and the W-bus of SW is connected to the B-bus of an upper multiplier UMUL. Moreover, bits A[0], A[(N−3)/2] are connected to the A-bus of LMUL, while bits A[(N−1)/2], . . . , A[N−2] are connected to the A-bus of UMUL. Both LMUL and UMUL are of type MULABI((N−1)/2). The Q-bus of LMUL forms output bits Q[0], . . . , Q[(N−3)/2], and the Q-bus of UMUL forms output bits Q[(N−1)/2], . . . , Q[N−2].

Inversion

In this subsection we present two algorithms and corresponding designs that compute $q=a^{-1}$. In the derivations, we continue to use the previously used notation.

A simple derivation yields : $q=a^{-1}=(r_a \cdot t_a)^{-1}=t_a^{-1} \cdot r_a^{-1} = (t_a^{-1} \cdot r_a^{-1} \cdot t_a) \cdot t_a^{-1} = (r_a^{-1})^{t_a} \cdot t_a$. Since $(r_a^{-1})^{t_a} \in (H_{s-1} \times \hat{H}_{s-1})$, it is readily seen that $t_q = t_a$ and $r_q = (r_a^{-1})^{t_a}$.

The "normal" part $r_q$ is computed in two steps. Initially, the inverse $r'_a = r_a^{-1}$ is computed, and then the conjugation $(r'_a)^{t_a}$ is performed. The inverse $r'_a = r_a^{-1} = (m_a \cdot \hat{n}_a)^{-1}$ can be obtained component-wise in the direct product group $(H_{s-1} \times \hat{H}_{s-1})$, therefore $m'_a = m_a^{-1}$ and $\hat{n}'_a = \hat{n}_a^{-1}$. From nñ'hd $a=\hat{n}_a^{-1}$ follows that $n'_a = n_a^{-1}$ showing that the latter inversion can be performed in $H_{s-1}$. Conjugation of $r'_a$ falls into two cases:

if $t_a = \kappa$ then trivially $m_q = m'_a$ and $n_q = n'_a$;

if $t_a = r_s$ then $m_q = n'_a$ and $n_q = m'_a$.

When a is represented in compact form, inversion requires a conditional swapping operation and, as a recursive step, two inversions of reduced complexity (strength). The corresponding hardware inverter INV(N) of strength s, with an input vector A and an output vector Q, each of length $N=l=2^s−1$, is shown in FIG. 10.

Inversion Circuit

Input to INV(N) is the binary vector (A[0], A[1], . . . , A[N−1]). Bits A[0], . . . , A[(N−3)/2] are connected to the A-bus of a lower inverter LINV, while bits A[(N−1)/2], . . . , A[N−2] to the A-bus of an upper inverter UINV. Both LINV and UINV are of type INV((N−1)/2). Moreover, bit A[N−1] is, on one hand, output as bit Q[N−1], and is also connected to the control input bit Z of a swapping module SW of type SW((N−1)/2).

The Q-bus of LINV is connected the X-bus, and the Q-bus of UINV is connected to the Y-bus of SW.

The V-bus lines of SW form output bits Q[0], ..., Q[(N−3)/2], and the W-bus lines of SW form output bits Q[(N−1)/2], ..., Q[N−2].

Note that since $r_q = (r_a^{-1})^{t_a} = (m_a^{-1} \cdot \hat{n}_a^{-1})^{t_a} = (m_a^{-1})^{t_a} \cdot (\hat{n}_a^{-1})^{t_a} = (m_a^{t_a})^{-1} \cdot (\hat{n}_a^{t_a})^{-1} = (m_a^{t_a} \cdot \hat{n}_a^{t_a})^{-1} = (r_a^{t_a})^{-1}$, it is possible to reverse the order of inversion and conjugation, that yields another variant of inversion algorithms. The corresponding hardware inverter INV(N) is shown in FIG. 11.

The input to INV(N) is binary vector (A[0], A[1], ..., A[N−1]). Bits A[0], ..., A[(N−3)/2] are connected to the X-bus, while bits A[(N−1)/2], ..., A[N−2] to the Y-bus of a swapping module SW of type SW((N−1)/2). Moreover, bit A[N−1] is, on one hand, output as bit Q[N−1], and second, is connected to the control input bit Z of SW.

The V-bus of SW is connected to the A-bus of a lower inverter LINV, and the W-bus of SW is connected to the A-bus of an upper inverter UINV. Both LINV and UINV are of type INV((N−1)/2).

The Q-bus of LINV forms output bits Q[0], ..., Q[(N−3)/2], and the Q-bus of UINV forms output bits Q[(N−1)/2], ..., Q[N−2].

Description Of The New Secret Key Cryptosystem

Our new cryptosystem has a distinguishing feature, scalability, which differentiates it from presently known, secret-key encryption systems, such as DES, FEAL, IDEA etc. For these widely used systems, input and output blocks have a predetermined fixed length, which cannot be modified. Our system's scalability allows it to be adopted to any i/o length l, while using the same algorithms for the various operations. Consequently, the new system covers a whole class of cryptosystems of arbitrary block lengths. This particular feature makes the new cryptosystem suitable for applications in standard as well as non conventional IT systems.

In summary, the components we described earlier are:
- the compact representation of permutations
- the signature generation algorithm SGA
- the method of factorization of permutations with respect to any signature generated by SGA
- the permutation multiplier and inverter circuits The new cryptosystem can be efficiently implemented on a chip with a simple and homogeneous structure using these components. So far we have only described methods and circuits for the fundamental case, i.e. for the case where the carrier group is isomorphic to the Sylow 2-subgroup of a symmetric group of degree $2^s$. Accordingly, we will describe the new encryption system for the fundamental case. A generalization of the methods to 2-groups of arbitrary order will be described in a separated section.

The setup for the encryption system is as follows:

The cleartext space M and the ciphertext space C are the set of all binary vectors of length l, i.e. $M=C=\{0,1\}^l$.

The secret key K is a pair of logarithmic signatures $\beta_1$ and $\beta_2$ generated by SGA using a sequence of pseudorandom numbers $x_0, x_1, \ldots, x_k, \ldots$, where $x_i \in M$. The sequence is generated by an internal random number generator seeded by means of the user password. The internal random number generator is itself based on a particular instance of the cryptosystem.

Let R: $\{0,1\}^l \rightarrow \{0,1\}^l$ denote the bit order reversing mapping defined by $$R(y_0, y_1, \ldots, y_{l-1}) = (y_{l-1}, y_{l-2}, \ldots, y_0),$$

i.e. R reverses the order of the input sequence bits.

The encryption/decryption functions of the system are described as follows.

ENCRYPTION:

Encrypting a cleartext $m \in M$, using a key $K=(\beta_1, \beta_2)$, is defined by $$c = E_K(m) = [\alpha^{-1} \beta_1 R \beta_2^{-1} \alpha](m).$$

DECRYPTION:

Decrypting ciphertext $c \in C$ is carried out by the inverse mapping $D_K$ of $E_K$:

$$m = D_K(c) = [\alpha^{-1} \beta R \tilde{\beta}_1^{-1} \alpha](c).$$

Note that the decryption works algorithmically in the same way as the encryption, with reversed roles for $\beta_1$ and $\beta_2$.

Because of the compact representation and the special form of the multiplier circuits, which work directly with permutations in compact form, the expressions of the form $\alpha(.)$ and $\alpha^{-1}(.)$ are always implicit, automatic, and never need to be separately computed. To clarify the functionality of the mappings used in the encryption/decryption algorithm we explain in words the encryption process:

The binary input vector m is viewed as the compact representation of a permutation $h = \alpha^{-1}(m)$. The permutation h is then factorized with respect to signature $\beta_1$.

$$h = x_{0,v_0} x_{1,v_1} \cdots x_{w_1-1, v_{w_1-1}},$$

where $x_{i,v_i}$ is the unique factor of h in the $i^{th}$ block of $\beta_1$. The result of this step is a binary vector $y = \beta_1(h) = v_0 \| v_1 \| \cdots \| v_{w_1-1}$, obtained by catenating the binary bits of the $w_1$ numbers $v_i$. The bits of y are then reversed by the mapping R to produce an intermediate binary vector $R(y)$. Next, the bits of $R(y)$ are separated into successive segments $u_i$ of length $m_i$, $0 \leq i \leq w_2-1$ where $r=(r_0, r_1, \ldots, r_{w_2-1})$ is the type of signature $\beta_2$, and $r_i = 2^{m_i}$. The integer $u_i$ is then used as a pointer index in the composition process with respect to $\beta_2$. The result is a permutation $$h' = y_{0,u_0} y_{1,u_1} \cdots y_{w_2-1, u_{w_2-1}},$$

whose compact representation is the output of the encryption process.

It is worth mentioning that our system differs from other known secret key systems such DES, FEAL, or IDEA, in the following way. In the known systems, a key is a certain binary sequence of small length, for example 56, 64, or 128 bits, used as a parameter for an independent encryption function, whereas in our system, the key is a pair of logarithmic signatures which embody the encryption function itself. Thus, the memory required for storing logarithmic signatures in essence corresponds to the memory for implementing encryption functions in the known cryptosystems.

Generalization Of The System To Arbitrary Input Length l

So far we have described the new system for the fundamental case, where the carrier group G is the Sylow 2-subgroup $H_s$ of the symmetric group of degree $2^s$. In this case the order of G is $2^{2^s-1}$ and therefore the i/o length $l = 2^s-1$ of the system is always a power of 2 minus 1. As an illustration the following table shows the i/o lengths l for different strengths s in the case $G = H_s$.

| s: | 1 | 2 | 3 | 4 | 5 | 6 | 7 | 8 | ... |
|---|---|---|---|---|---|---|---|---|---|
| l: | 1 | 3 | 7 | 15 | 31 | 63 | 127 | 255 | ... |

To overcome the above limitation on l, we present a method for generalizing the system to groups of order $2^l$, where l is an arbitrary natural number. This results in a system that is freely scalable to arbitrary i/o lengths l. In particular, most communication and computer systems require a block length that is a power of two. For the generalized case, just as for the fundamental case, we discuss the following aspects:

Choice of group G,
Compact representation of elements of G,
Signature generation algorithm,
Factorization algorithm,
Permutation multipliers/inverters,
System description.

Choice of group G

Given an arbitrary i/o length l, the generalized system will rely on a group $G_l$ of order $2^l$. For each l there is at least one possible choice for a group $G_l$ and as l grows, so does the number of non-isomorphic choices for $G_l$. The 2-group $G_l$ is always a subgroup of some larger (fundamental case) $H_s$, i.e. $G_l \leq H_s$. Clearly, if $G_l \leq H_s$, then $G_l < H_t$ for all t>s, and thus there are many possible embeddings of $G_l$ in an $H_s$. In what follows, we describe a method for constructing possible groups $G_l$. In parallel to the construction of $G_l$, the method constructs a particular, small, but not necessarily the theoretically smallest possible $H_s$ in which $G_l$ is embeddable. We will call this $H_s$ obtainable from our algorithm, the supergroup of $G_l$.

As already described, the Sylow 2-subgroup $H_s$ used in the fundamental system has a recursive structure:
$H_1 = T_1$ and
$H_s = (H_{s-1} \times \hat{H}_{s-1}) \cdot T_s$ for s>1.

The recursive composition rules of a $G_l \leq H_s$ are similar. The algorithm below offers alternatives at different steps of the construction, where different choices lead to different carrier groups:

$G_1 = T_1$ and
$G_k$ for k>1 is choosably

1. Either the wreath product $G_k = G_{2e+1} = (G_e \times \hat{G}_e) \cdot T_{e'+1}$, in which case:
   $G_e$ is a 2-group generated by this algorithm, and
   $H_{e'}$ is the supergroup of $G_e$.
   Then $\hat{G}_e = G_e^{T_{e'+1}}$, and the supergroup of $G_k$ is $H_{e'+1}$.

2. or the direct product $G_k = G_e \times \hat{G}_f$, in which case:
   $G_e$ and $G_f$ are two, possibly different 2-groups, generated by this algorithm, having the same degree and satisfying k=e+f, and
   $H_{e'} = H_{f'}$ is the supergroup of both $G_e$ and $G_f$.
   Then $\hat{G}_f = G_f^{T_{e'+1}}$, and the supergroup of $G_k$ $H_{e'+1}$.

3. or the extension $G_k = G^*_2$ of $G_e$, in which case:
   $G_e$ is a 2-group generated by this algorithm, and of degree $2^{e'}$, and
   $H_{e'}$ is the supergroup of $G_e$.
   The extension is defined as follows: if $G_e$ acts on symbol set $X_e = \{1, \ldots, 2^{e'}\}$ then the extension $G^*_e$ of $G_e$ acts on $X^*_e = \{1, \ldots, 2^{e'+1}\}$, $|G^*_e| = |G_e|$, and each permutation $p = (p(1), \ldots, p(2^{e'})) \in G_e$ corresponds to a permutation $p^* = (p(1), \ldots, p(e'), e'+1, \ldots, 2e') \in G^*_e$.

Then the supergroup of $G_k = G^*_e$ is $H_{e'+1}$.

Note that any of the alternative steps constructs a subgroup $G_k$ of $H_{e'+1}$. As a result, carrier group $G_l$ is a subgroup of some $H_s$, independent of the options taken at particular steps. In particular, if alternative 1. is always taken, then the algorithm generates $H_s$ itself, otherwise it generates some proper subgroup of $H_s$. In general, $G_l$ may also be seen as a subgroup of $H_s$ obtained by removing some atomic subgroups $T_a$ from $H_s$. In particular:

when choosing alternative 2. in the composition of $G_k$, then the atomic subgroup $T_{e'+1}$ is omitted from the supergroup $H_{e'+1}$.

when choosing alternative 3. in the composition of $G_k$, then the atomic subgroup $T_{e'+1}$ and all atomic subgroups of $\hat{H}_{e'}$ are omitted from $H_{e'+1}$ Compact Representation Since $G_l \leq H_s$, elements of $G_l$ can be represented in compact form with respect to the canonical LS $\alpha_{H_s}$ of $H_s$. However, since $G_l$ misses some atomic subgroups $T_a$ of $H_s$, the corresponding factors $x_{a,j_a} \in T_a$ will all be the identity ι in the factorization $h = x_{0,j_0} \cdots x_{2s-2,j_{2s-2}}$ for the elements h ∈ $G_l$ with respect to $\alpha_{H_s}$. Accordingly, all bits $j_a$ will be zeros in the representation with respect to $\alpha_{H_s}$. This observation leads to two different, but equivalent definitions of the compact representation in $G_l$:

On one hand, there is clearly no need to store bits $b_a = 0$ in the representation of h with respect to $\alpha_{H_s}$. By omitting the superfluous bits, a non-redundant representation, the compact representation of elements h ∈ $G_l$ is obtained.

On the other hand, blocks $B_a$, contributing only with ι in the factorization of any element h ∈ $G_l$, may themselves be removed from $\alpha_{H_s}$ without failing to generate the entire carrier group $G_l$. The signature $\alpha_{G_l}$ obtained by removing blocks $B_a$ from $\alpha_{H_s}$ is called the canonical logarithmic signature of $G_l$, and the representation of elements h ∈ $G_l$ wrt. $\alpha_{G_l}$ is called the compact representation in $G_l$.

An illustrative example for a group $G_8 = G_5 \times G^*_3 = (((T_0 \times T_1) \times (T_2 \times T_3)) \cdot T_4) \times ((T_5 \times T_6) \cdot T_7)^*$ is listed below:

| $B_7$ | 1 2 3 4 5 6 7 8 11 12  9 10 13 14 15 16 |
|---|---|
|   | 1 2 3 4 5 6 7 8  9 10 11 12 13 14 15 16 |
| $B_6$ | 1 2 3 4 5 6 7 8  9 10 12 11 13 14 15 16 |
|   | 1 2 3 4 5 6 7 8  9 10 11 12 13 14 15 16 |
| $B_5$ | 1 2 3 4 5 6 7 8 10  9 11 12 13 14 15 16 |
|   | 1 2 3 4 5 6 7 8  9 10 11 12 13 14 15 16 |
| $B_4$ | 5 6 7 8 1 2 3 4  9 10 11 12 13 14 15 16 |
|   | 1 2 3 4 5 6 7 8  9 10 11 12 13 14 15 16 |
| $B_3$ | 1 2 3 4 5 6 8 7  9 10 11 12 13 14 15 16 |
|   | 1 2 3 4 5 6 7 8  9 10 11 12 13 14 15 16 |
| $B_2$ | 1 2 3 4 6 5 7 8  9 10 11 12 13 14 15 16 |
|   | 1 2 3 4 5 6 7 8  9 10 11 12 13 14 15 16 |
| $B_1$ | 1 2 4 3 5 6 7 8  9 10 11 12 13 14 15 16 |
|   | 1 2 3 4 5 6 7 8  9 10 11 12 13 14 15 16 |
| $B_0$ | 2 1 3 4 5 6 7 8  9 10 11 12 13 14 15 16 |
|   | 1 2 3 4 5 6 7 8  9 10 11 12 13 14 15 16 |

Note that $B_0, \ldots, B_4$ form a canonical LS for $G_5$ and blocks $B_5, \ldots, B_7$ for $G^*_3$. Note also that $G_3$ acts on $\{9, \ldots, 12\}$, whereas its extension $G^*_3$ on $\{9, \ldots, 16\}$. Furthermore, $H_3$ is the supergroups of $G_5$, $\hat{H}_3$ is that of $G^*_3$, and $H_4$ is that of $G_8$.

Signature Generation Algorithm

In the fundamental version of the system, the signature generation algorithm starts out from the canonical LS $\alpha_{H_s}$, and relies only on such properties of $\alpha_{H_s}$ that are inherited by canonical LS $\alpha_{G_l}$ too. Therefore the signature generation algorithm in the generalized version is just the same as in the fundamental case.

Factorization Algorithm

In the fundamental version of the system, the factorization algorithm utilizes only such properties of the compact representation and of the employed LSs that are present in the generalized representation and LS too. Therefore the factorization algorithm remains the same in the generalized version too.

Permutation Multipliers/Inverters

Since $G_l \leq H_s$, the multipliers and inverters used to compute in $H_s$ can also be employed to compute in $G_l$. The multipliers and inverters need to be provided with operands in the representation with respect to $\alpha H_s$, that can be obtained from the representation with respect to $\alpha_{G_l}$ by inserting zero bits for all blocks $B_a$ removed from $\alpha_{H_s}$. In a practical implementation, however, the multiplier and inverter designs should be optimized by removing inputs that hold the inserted zeros and by simplifying the logic driven by those inputs. Such an optimization results in multipliers and inverters that work directly with the compact representation of the carrier group $G_l$. The optimization is straightforward and can be performed automatically by most CAE tools, therefore is not further discussed here.

System Description

Finally, since all components (representation, signature generation, factorization, multipliers) remain essentially the same, the generalized cryptosystem employs the same algorithm as used in the fundamental version.

Pseudorandom Number Generators from the New System

For cryptographic applications, the new system may be used as a means for producing pseudorandom numbers. Among several techniques of using block ciphers to build pseudo-random number generators we intend to use TST in the following two methods: Cyclic Encryption Generator and ANSI X9.17 Pseudorandom Number Generator.

Cyclic Encryption Generator (CEG)

The CEG is based on said cryptosystem with i/o length l. From an initial binary vector $IV=(\upsilon_1, \ldots, \upsilon_l)$ used as seed, CEG produces a sequence of $2^l$ distinct binary vectors $z_1, z_2, \ldots, z_{2^l}$ each of length l. Thus, the pseudorandom number generator has a full period. The CEG is described as follows: Let $E_K$ be the encryption function of the new system, i.e. encryption using a key K. Let $x_0=IV=(\upsilon_1, \ldots, \upsilon_l)$ be a random initial vector, for each $i=1, 2, \ldots, 2^l$, output $z_i$ is computed by $$z_i = E_K(x_i),$$

where $x_i = x_{i-1} + 1$, $1 = (0, \ldots, 0, 1)$ and + is ordinary addition of integers when $x_i$ is viewed as an integer in its binary representation.

ANSI X9.17 Pseudorandom Number Generator (ANSI X9.17)

The ANSI X9.17 is known to be one of the strongest pseudorandom number generators, which is proposed for use with block ciphers. Again, let $E_K$ be the TST encryption function using key K. Two inputs of length l drive ANSI X9.17: One is an l-bit representation of the current date and time and is updated each time the generator is used. The other is an f-bit seed value, which is initialized to some random value and is updated during the generation process. The output of ANSI X9.17 consists of an f-bit pseudorandom number and an l-bit seed value.

ANSI X.9.17 works as follows:

Let:

$DT_i$ be the date and time value at the beginning of the $i^{th}$ generation stage, $S_i$ the seed value at the beginning of the $i^{th}$ generation stage, $R_i$ the pseudorandom number output of the $i^{th}$ generation stage, Then, $$R_i = E_K(E_K(DT_i) \oplus S_i)$$

$$S_{i+1} = E_K(E_K(DT_i) \oplus R_i)$$

Having hereby disclosed the subject matter of this invention, it should be obvious that many modifications, substitutions, and variations of the present invention are possible in light of the above teachings. It is therefore to be understood that the invention may be practised other than as specifically described, and should be limited in breadth and scope only by the appended claims.

We claim:

1. A system for receiving input vectors, of length L, and outputting encrypted vector, versions of said input vectors, of length L, each of said input and output vectors consisting of a sequential plurality of binary digits, said system comprising, in functional combination:

a) a vector accepting means for receiving input binary digit vectors; and b) a data key expanding pseudo-random number generator means for accepting a user provided input data key, and generating and outputting a data key dependent sequence of pseudo-random numbers; and c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;

wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and e) a primary mathematical operations means which comprises:

means for accepting a sequence of pseudo-random numbers;

means for accessing said first logarithmic signature containing storage means;

means for accessing said second logarithmic signature containing storage means; and means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and f) a primary factorization means for identifying, accessing and concatenating into a primary factorization means output vector, binary pointers which identify locations of permutations in a second logarithmic signature stored in said second logarithmic signature containing storage means, which permutations, when sequentially composed, duplicate a vector input into said primary factorization means;

said system being functionally structured such that inputting a user defined data key to said data key expanding pseudo-random number generator means, results in said data key expanding pseudo-random number generator means outputting a sequence of pseudo-random numbers in response; and said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature, which second logarithmic signature is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary factorization means from said vector accepting means for receiving input binary digit vectors, said primary factorization means identifies permutations present in said mathematical construct blocks of said second logarithmic signature, stored in said second logarithmic signature storage means, which when sequentially composed result in said at least one input vector; and said system being further functionally structured such that said primary factorization means further assigns identified permutations in each of said mathematical construct blocks of a second logarithmic signature, stored in said second logarithmic signature containing storage means, a binary digit pointer which identifies the permutation location within said second logarithmic signature, and said system being further functionally structured such that said primary factorization means further sequentially concatenates identified binary digit location pointers into a once encrypted vector, of length L, of said at least one input vector, of length L, which is input to said vector accepting means for receiving input binary digit vectors, and makes said once encrypted vector, of length L, of said at least one input vector of length L, available as output therefrom, at an output means thereof.

2. A system as in claim 1, which further functionally comprises:

g) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and h) a composition means which comprises means for identifying, accessing and sequentially multiplying a plurality of permutations, of a sequential plurality of binary digits, in a third logarithmic signature stored in said third logarithmic signature containing storage means, to provide a composition means output vector;

said system being functionally structured such that after inputting a sequence of pseudo-random numbers produced by said pseudo-random number generator means, to a selection from the group consisting of:

said primary mathematical operations means; and a mathematical operations means other than said primary mathematical operations means which is functionally equivalent to said primary mathematical operations means;

which selection comprises:

means for accepting a sequence of pseudo-random numbers;

means for accessing said first logarithmic signature containing storage means;

means for accessing said third logarithmic signature containing storage means; and means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;

said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of, said once encrypted vector version of said at least one input vector output by said primary factorization means, to said composition means, said once encrypted vector version of at least one input vector output by said primary factorization means is applied to said third logarithmic signature stored in said third logarithmic signature containing storage means, such that a permutation in each of said mathematical construct blocks of said third logarithmic signature is identified; and said system being further functionally structured such that said identified permutations in each of said mathematical construct blocks of said third logarithmic signature are then sequentially multiplied in said composition means, and said system being further functionally structured such that said composition means makes the results of said sequential multiplication available as a twice encrypted vector version of said at least one input vector, of length L, entered to said vector accepting means for receiving input binary digit vectors, as output therefrom, at an output means thereof.

3. A system as in claim 2, in which said composition means is an "N" bit multiplier system for multiplying two compact form binary vectors A and B input thereto, each of said two compact form binary vectors A and B being of length $L=2^n-1$, which compact form binary vectors A and B represent elements of a carrier group of permutations which is a Sylow-2 subgroup of a full symmetric group of degree $2^n$, said carrier group being of size $_2(2^n-1)$; said multiplier system comprising a swapping means for accepting input of two compact form binary vectors A and B of length $L=2^n-1$ at an input thereof and providing output of two compact form binary vectors of length $L=2^n-2$ at an output thereof in an order selected from the group consisting of:
  unchanged order; and
  swapped order;
and said multiplier system further comprising two "N/2" bit "self-similar" sub-multiplier systems therein, wherein each of said two "self-similar" sub-multiplier systems comprises a sub-swapping means and two sub-sub-multiplier systems; said swapping means in said multiplier system being located with respect to said two sub-multipliers in said multiplier system at a location selected such that compact binary form vectors input thereto are input sequentially first to a selection from the group consisting of:
  said swapping means; and
  said two sub-multipliers;
and then into a selection from the group consisting of:
  said two sub-multipliers; and
  said swapping means respectively;
said order of said swapping means and two sub-multipliers being determinative of the result of multiplication, said result being a member of the group consisting of:
  $AB$; $A^{-1}B$; $AB^{-1}$; $B^{-1}A$ and $BA^{-1}$.

4. A system as in claim 1, which further functionally comprises:
g) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;
  wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and h) a secondary factorization means for identifying, accessing and concatenating into a secondary factorization means output vector, binary pointers which identify locations of permutations in a third logarithmic signature stored in said third logarithmic signature containing storage means, which permutations, when sequentially composed, duplicate a vector input into said secondary factorization means;

said system being functionally structured such that after inputting a sequence of pseudo-random numbers produced by said pseudo-random number generator means to a selection from the group consisting of:
  said primary mathematical operations means; and
  a mathematical operations means other than said primary mathematical operations means which is functionally equivalent to said primary mathematical operations means;
which selection comprises:
  means for accepting a sequence of pseudo-random numbers;
  means for accessing said first logarithmic signature containing storage means;
  means for accessing said third logarithmic signature containing storage means; and
  means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;

said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of,
  said once encrypted vector version of said at least one input vector output by said primary factorization means, to said secondary factorization means, said once encrypted vector version of at least one input vector output be said primary factorization means is applied to said third logarithmic signature stored in said third logarithmic signature containing storage means, and permutations present in said mathematical construct blocks of said third logarithmic signature are identified which when sequentially composed result in said at least one once encrypted vector, of version input thereto; and said system being further functionally structured such that said secondary factorization means further assigns identified permutations in each of said mathematical construct blocks of said third logarithmic signature stored in said third logarithmic signature containing storage means, a binary digit pointer which identifies the permutation location within said third logarithmic signature, and said system being further functionally structured such that said secondary factorization means further sequentially concatenates said identified binary digit location pointers into a twice encrypted vector version of said at least one input vector, of length L, input to said vector accepting means for receiving input binary digit vectors, and makes said twice encrypted vector version of said at least one input vector, of length L, entered to said vector accepting means for receiving input binary digit vectors, available as output therefrom, at an output means thereof.

5. A system for receiving input vectors, of length L, and outputting encrypted vector versions of said input vectors, of length L, each of said input and output vectors consisting of a sequential plurality of binary digits, said system comprising, in functional combination:

a) a vector accepting means for receiving input binary digit vectors; and b) a data key expanding pseudo-random number generator means for accepting a user provided input data key, and generating and outputting a data key dependent sequence of pseudo-random numbers; and c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;

wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and e) a primary mathematical operations means which comprises:

means for accepting a sequence of pseudo-random numbers;

means for accessing said first logarithmic signature containing storage means;

means for accessing said second logarithmic signature containing storage means; and means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and f) a primary composition means which comprises means for identifying, accessing and sequentially multiplying a plurality of permutations, of a sequential plurality of binary digits, in a second logarithmic signature stored in said second logarithmic signature containing storage means, to provide a primary composition means output vector;

said system being functionally structured such that inputting a user defined data key to said data key expanding pseudo-random number generator means, results in said data key expanding pseudo-random number generator means outputting a sequence of pseudo-random numbers in response; and said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature which is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary composition means from said vector accepting means for receiving input binary digit vectors, said primary composition means identifies a permutation in each of said mathematical construct blocks of said second logarithmic signature, stored in said second logarithmic signature containing storage means; and said system being further functionally structured such that said identified permutations in each of said mathematical construct blocks of said second logarithmic signature, stored in said second logarithmic signature containing storage means, are then caused to be sequentially multiplied in said primary composition means; and said system being further functionally structured such that said primary composition means makes the results of said sequential multiplication available, as a once encrypted vector, version of said at least one input vector, of length L, entered to said vector accepting means for receiving input binary digit vectors, as output therefrom, at an output means thereof.

6. A system as in claim 5, which further functionally comprises:

g.) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and h.) a factorization means for identifying, accessing and concatenating into a factorization means output vector, binary pointers which identify locations of permutations in a third logarithmic signature stored in said third logarithmic signature containing storage means, which permutations, when sequentially composed, duplicate a vector caused to be input into, said factorization means;

said system being functionally structured such that after inputting a sequence of pseudo-random numbers produced by said pseudo-random number generator means to a selection from the group consisting of:

said primary mathematical operations means; and a mathematical operations means other than said primary mathematical operations means which is functionally equivalent to said primary mathematical operations means;

which selection comprises:

means for accepting a sequence of pseudo-random numbers;

means for accessing said first logarithmic signature containing storage means;

means for accessing said third logarithmic signature containing storage means; and means for applying a sequence of pseudo-random numbers to a first logarithmic signature, said first logarithmic signature being stored in said first logarithmic signature containing storage means, and producing a third logarithmic signature, and storing it in said third logarithmic signature containing storage means; and said selection performs mathematical manipulation of a first logarithmic signature stored in said first logarithmic signature containing storage means to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of, said once encrypted vector version of at least one input vector output by said primary composition means, to said factorization means, said once encrypted vector version of at least one input vector output by said primary composition means is applied to said third logarithmic signature stored in said third logarithmic signature containing storage means, and permutations present in said mathematical construct blocks of said third logarithmic signature are identified which when sequentially composed result in said at least one once encrypted vector version input thereto from said primary composition means; and said system being further functionally structured such that said factorization means further assigns identified permutations in each of said mathematical construct blocks of said third logarithmic signature stored in said third logarithmic signature containing storage means, a binary digit pointer which identifies the permutation location within said third logarithmic signature, and said system being further functionally structured such that said factorization means further sequentially concatenates said identified binary digit location pointers into a twice encrypted vector version of said at least one input vector, input to said vector accepting means for receiving input binary digit vectors, and makes said twice encrypted vector version of said at least one input vector, of length L, entered to said vector accepting means for receiving input binary digit vectors, available as output therefrom, at an output means thereof.

7. A system as in claim 5, which further functionally comprises:

g.) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and h.) a secondary composition means which comprises means for identifying, accessing and sequentially multiplying a plurality of permutations, of a sequential plurality of binary digits, in a third logarithmic signature stored in said third logarithmic signature containing storage means, to provide a secondary composition means output vector;

said system being functionally structured such that after inputting a sequence of pseudo-random numbers produced by said pseudo-random number generator means to a selection from said group consisting of:

said primary mathematical operations means; and a mathematical operations means other than said primary mathematical operations means which is functionally equivalent to said primary mathematical operations means which selection comprises:

means for accepting a sequence of pseudo-random numbers;

means for accessing said first logarithmic signature containing storage means;

means for accessing said third logarithmic signature containing storage means; and means for applying a sequence of pseudo-random numbers to a first logarithmic signature, said first logarithmic signature being stored in said first logarithmic signature containing storage means, and producing a third logarithmic signature, and storing it in said third logarithmic signature containing storage means; and said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of, said once encrypted vector version of at least one input vector output by said primary composition means, to said secondary composition means, said once encrypted vector version of at least one input vector output by said primary composition means is applied to said third logarithmic signature stored in said third logarithmic signature containing storage means, such that a permutation in each of said mathematical construct blocks of said third logarithmic signature is identified; and said system being further functionally structured such that said identified permutations in each of said mathematical construct blocks of said third logarithmic signature are then caused to be sequentially multiplied in said composition means, and said system being further functionally structured such that said secondary composition means makes the results of said sequential multiplication available as a twice encrypted vector, of length L, version of said at least one input vector, of length L, entered to said vector accepting means for receiving input binary digit vectors, as output therefrom, at an output means thereof.

8. A system as in claim 7, in which said secondary composition means is an "N" bit multiplier system for multiplying two compact form binary vectors A and B input thereto, each of said two compact form binary vectors A and B being of length $L=2^n-1$, which compact form binary vectors A and B represent elements of a carrier group of permutations which is a Sylow-2 subgroup of a full symmetric group of degree $2^n$, said carrier group being of size $_2(2^n-1)$; said multiplier system comprising a swapping means for accepting input of two compact form binary vectors A and B of length $L=2^n-1$ at an input thereof and providing output of two compact form binary vectors of length $L=2^n-2$ at an output thereof in an order selected from the group consisting of:

unchanged order; and swapped order;

and said multiplier system further comprising two "N/2" bit "self-similar" sub-multiplier systems therein, wherein each of said two "self-similar" sub-multiplier systems comprises a sub-swapping means and two sub-sub-multiplier systems; said swapping means in said multiplier system being located with respect to said two sub-multipliers in said multiplier system at a location selected such that compact binary form vectors input thereto are input sequentially first to a selection from the group consisting of:

said swapping means; and said two sub-multipliers;

and then into a selection from the group consisting of:

said two sub-multipliers; and said swapping means respectively;

said order of said swapping means and two sub-multipliers being determinative of the result of multiplication, said result being a member of the group consisting of:

$AB$; $A^{-1}B$; $AB^{-1}$; $B^{-1}A$ and $BA^{-1}$.

9. A system as in claim 5, in which said primary composition means is an "N" bit multiplier system for multiplying two compact form binary vectors A and B input thereto, each of said two compact form binary vectors A and B being of length $L=2^n-1$, which compact form binary vectors A and B represent elements of a carrier group of permutations which is a Sylow-2 subgroup of a full symmetric group of degree $2^n$, said carrier group being of size $_2(2^n-1)$; said multiplier system comprising a swapping means for accepting input of two compact form binary vectors A and B of length $L=2^n-1$ at an input thereof and providing output of two compact form binary vectors of length $L=2^n-2$ at an output thereof in an order selected from the group consisting of:

unchanged order; and swapped order;

and said multiplier system further comprising two "N/2" bit "self-similar" sub-multiplier systems therein, wherein each of said two "self-similar" sub-multiplier systems comprises a sub-swapping means and two sub-sub-multiplier systems; said swaping means in said multiplier system being located with respect to said two sub-multipliers in said multiplier system at a location selected such that compact binary form vectors input thereto are input sequentially first to a selection from the group consisting of:

said swapping means; and said two sub-multipliers;

and then into a selection from the group consisting of:

said two sub-multipliers; and said swapping means respectively;

said order of said swaping means and two sub-multipliers being determinative of the result of multiplication, said result being a member of the group consisting of:

$AB$; $A^{-1}B$; $AB^{-1}$; $B^{-1}A$ and $BA^{-1}$.

10. A method of receiving input vectors of length L, and outputting encrypted vectors, of length L, each of which input and output vectors consists of a sequential plurality of binary digits, said method comprising the steps of:

A) providing an electronic system for receiving input vectors, of length L, and outputting encrypted vector, of length L, versions of said input vectors, each of said input and output vectors consisting of a sequential plurality of binary digits, said electronic system comprising, in functional combination:

A1) a system for receiving input vectors, of length L, and outputting encrypted vector, of length L, versions of said input vectors, each of said input and output vectors consisting of a sequential plurality of binary digits, said system comprising, in functional combination:

a) a vector accepting means for receiving input binary digit vectors; and b) a data key expanding pseudo-random number generator means for accepting a user provided input data key, and generating and outputting a data key dependent sequence of pseudo-random numbers; and c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;

wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and e) a primary mathematical operations means which comprises:

means for accepting a sequence of pseudo-random numbers;

means for accessing said first logarithmic signature containing storage means;

means for accessing said second logarithmic signature containing storage means; and means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and f) a primary factorization means for identifying, accessing and concatenating in to a primary factorization means output vector, binary pointers which identify locations of permutations in a second logarithmic signature stored in said second logarithmic signature containing storage means, which permutations, when sequentially composed, duplicate a vector input into said primary factorization means;

said system being functionally structured such that inputting a user defined data key to said data key expanding pseudo-random number generator means, results in said data key expanding pseudo-random number generator means outputting a sequence of pseudo-random numbers in response; and said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature, which second logarithmic signature is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary factorization means from said vector accepting means for receiving input binary digit vectors, said primary factorization means identifies permutations present in said mathematical construct blocks of said second logarithmic signature, stored in said second logarithmic signature storage means, which when sequentially composed result in said at least one input vector; and said system being further functionally structured such that said primary factorization means further assigns identified permutations in each of said mathematical construct blocks of a second logarithmic signature, stored in said second logarithmic signature containing storage means, a binary digit pointer which identifies the permutation location within said second logarithmic signature, and said system being further functionally structured such that said primary factorization means further sequentially concatenates identified binary digit location pointers into a once encrypted vector, of length L, of said at least one input vector, of length L, which is input to said vector accepting means for receiving input binary digit vectors, and makes said once encrypted vector, of length L, of said at least one input vector of length L, available as output therefrom, at an output means thereof;

B) entering a first logarithmic signature to said first logarithmic containing storage means, and entering a data key to said data key expanding pseudo-random number generator means for accepting a user provided input data key;

C) entering at least one input vector to said primary factorization means from said vector accepting means for receiving input binary digit vectors; and D) outputting a once encrypted vector, of length L, version of the input vector, of length L, of said at least one input vector, of length L, input to said vector accepting means for receiving input binary digit vectors, at the output means of said primary factorization means.

11. A method of receiving input vectors of length L, and outputting encrypted vectors of length L, each of which input and output vectors consists of a sequential plurality of binary digits, said method comprising the steps of:

A) providing an electronic system for receiving input vectors, of length L, and outputting encrypted vector, of length L, versions of said input vectors, each of said input and output vectors consisting of a sequential plurality of binary digits, said electronic system comprising, in functional combination:

A1) a system for receiving input vectors, of length L, and outputting encrypted vector, of length L, versions of said input vectors, each of said input and output vectors consisting of a sequential plurality of binary digits, said system comprising, in functional combination:
- a) a vector accepting means for receiving input binary digit vectors; and
- b) a data key expanding pseudo-random number generator means for accepting a user provided input data key, and generating and outputting a data key dependent sequence of pseudo-random numbers; and
- c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and
- d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;

wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and
- e) a primary mathematical operations means which comprises:
    means for accepting a sequence of pseudo-random numbers;
    means for accessing said first logarithmic signature containing storage means;
    means for accessing said second logarithmic signature containing storage means; and
    means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and
- f) a primary composition means which comprises means for identifying, accessing and sequentially multiplying a plurality of permutations, of a sequential plurality of binary digits, in a second logarithmic signature stored in said second logarithmic signature containing storage means, to provide a primary composition means output vector;

said system being functionally structured such that inputting a user defined data key to said data key expanding pseudo-random number generator means, results in said data key expanding pseudo-random number generator means outputting a sequence of pseudo-random numbers in response; and said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature which is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary composition means from said vector accepting means for receiving input binary digit vectors, said primary composition means identifies a permutation in each of said mathematical construct blocks of said second logarithmic signature, stored in said second logarithmic signature containing storage means; and said system being further functionally structured such that said identified permutations in each of said mathematical construct blocks of said second logarithmic signature, stored in said second logarithmic signature containing storage means, are then caused to be sequentially multiplied in said primary composition means; and said system being further functionally structured such that said primary composition means makes the results of said sequential multiplication available, as a once encrypted vector, version of said at least one input vector, of length L, entered to said vector accepting means for receiving input binary digit vectors, as output therefrom, at an output means thereof;

- B) entering a first logarithmic signature to said first logarithmic signature containing storage means, and entering a data key to said data key expanding pseudo-random number generator means for accepting a user provided input data key;
- C) entering at least one input vector to said primary factorization means from said vector accepting means for receiving input binary digit vectors; and
- D) outputting a once encrypted vector, of length L, version of the input vector, of length L, of said at least one input vector, input to said vector accepting means for receiving input binary digit vectors, at the output means of said primary composition means.

12. A method of encrypting input vectors of length L, and outputting encrypted vectors of length L, each of which input and output vectors consists of a sequential plurality of binary digits, said method comprising the steps of:

A) providing an electronic system for receiving input vectors of length L, and outputting encrypted vectors of length L, each of which input and output vectors consists of a sequential plurality of binary digits, said system comprising:

A1) a system for receiving input vectors, of length L, and outputting encrypted vector, of length L, versions of said input vectors, each of said input and output vectors consisting of a sequential plurality of binary digits, said system comprising, in functional combination:

a) a vector accepting means for receiving input binary digit vectors; and b) a data key expanding pseudo-random number generator means for accepting a user provided input data key, and generating and outputting a data key dependent sequence of pseudo-random numbers; and c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;

wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and e) a primary mathematical operations means which comprises:

means for accepting a sequence of pseudo-random numbers;

means for accessing said first logarithmic signature containing storage means;

means for accessing said second logarithmic signature containing storage means; and means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and f) a primary factorization means for identifying, accessing and concatenating into, a primary factorization means output vector, binary pointers which identify locations of permutations in a second logarithmic signature stored in said second logarithmic signature containing storage means, which permutations, when sequentially composed, duplicate a vector input into said primary factorization means;

said system being functionally structured such that inputting a user defined data key to said data key expanding pseudo-random number generator means, results in said data key expanding pseudo-random number generator means outputting a sequence of pseudo-random numbers in response; and said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature, which second logarithmic signature is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary factorization means from said vector accepting means for receiving input binary digit vectors, said primary factorization means identifies permutations present in said mathematical construct blocks of said second logarithmic signature, stored in said second logarithmic signature storage means, which when sequentially composed result in said at least one input vector; and said system being further functionally structured such that said primary factorization means further assigns identified permutations in each of said mathematical construct blocks of a second logarithmic signature, stored in said second logarithmic signature containing storage means, a binary digit pointer which identifies the permutation location within said second logarithmic signature, and said system being further functionally structured such that said primary factorization means further sequentially concatenates identified binary digit location pointers into a once encrypted vector, of length L, of said at least one input vector, of length L, which is input to said vector accepting means for receiving input binary digit vectors, and makes said once encrypted vector, of length L, of said at least one input vector of length L, available as output therefrom, at an output means thereof;

said electronic system for receiving input vectors of length L, and outputting encrypted vectors of length L, each of which input and output vectors consists of a sequential plurality of binary digits, further comprising additional structure selected from the group consisting of A2 and A3, in which said A2 and A3 are:

A2) said system for receiving input vectors of length L, and outputting encrypted vectors of length L, as described supra in A1, which further functionally comprises:

g) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to, composition being selected from each of said ordered mathematical construct blocks; and h.) a composition means which comprises means for identifying, accessing and sequentially multiplying a plurality of permutations, of a sequential plurality of binary digits, in a third logarithmic signature stored in said third logarithmic signature containing storage means, to provide a composition means output vector;

said system being functionally structured such that after inputting a sequence of pseudo-random numbers produced by said pseudo-random number generator means, to a selection from the group consisting of:
said primary mathematical operations means; and
a mathematical operations means other than said primary mathematical operations means which is functionally equivalent to said primary mathematical operations means;
which selection comprises:
means for accepting a sequence of pseudo-random numbers;
means for accessing said first logarithmic signature containing storage means;
means for accessing said third logarithmic signature containing storage means; and
means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;
said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of,
said once encrypted vector version of said at least one input vector output by said primary factorization means,
to said composition means, said once encrypted vector version of at least one input vector output by said primary factorization means is applied to said third logarithmic signature stored in said third logarithmic signature containing storage means, such that a permutation in each of said mathematical construct blocks of said third logarithmic signature is identified; and said system being further functionally structured such that said identified permutations in each of said mathematical construct blocks of said third logarithmic signature are then sequentially multiplied in said composition means, and said system being further functionally structured such that said composition means makes the results of said sequential multiplication available as a twice encrypted vector, of length L, version of said at least one input vector, of length L, entered to said vector accepting means for receiving input binary digit vectors, as output therefrom, at a second stage output means thereof; and A3) said system for receiving input vectors of length L, and outputting encrypted vectors of length L, as described supra in A1, which further functionally comprises:
g.) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;
wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and
h.) a secondary factorization means for identifying, accessing and concatenating into a secondary factorization means output vector, binary pointers which identify locations of permutations in a third logarithmic signature stored in said third logarithmic signature containing storage means, which permutations, when sequentially composed, duplicate a vector input into said secondary factorization means;

said system being functionally structured such that after inputting a sequence of pseudo-random numbers produced by said pseudo-random number generator means to a selection from the group consisting of:
said primary mathematical operations means; and
a mathematical operations means other than said primary mathematical operations means which is functionally equivalent to said primary mathematical operations means;
which selection comprises:
means for accepting a sequence of pseudo-random numbers;
means for accessing said first logarithmic signature containing storage means;
means for accessing said third logarithmic signature containing storage means; and
means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;
said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of,
said once encrypted vector version of said at least one input vector output by said primary factorization means,
to said secondary factorization means, said once encrypted vector version of at least one input vector output be said primary factorization means is applied to said third logarithmic signature stored in said third logarithmic signature containing storage means, and permutations present in said mathematical construct blocks of said third logarithmic signature are identified which when sequentially composed result in said at least one once encrypted vector version input thereto; and said system being further functionally structured such that said secondary factorization means further assigns identified permutations in each of said mathematical construct blocks of said third logarithmic signature stored in said third logarithmic signature containing storage means, a binary digit pointer which identifies the permutation location within said third logarithmic signature, and said system being further functionally structured such that said secondary factorization means further sequentially concatenates said identified binary digit location pointers into a twice encrypted vector, of length L, version of said at least one input vector, of length L, input to said vector accepting means for receiving input binary digit vectors, and makes said twice encrypted vector, of length L, version of said at least one input vector, of length L, entered to said vector accepting means for receiving input binary digit vectors, available as output therefrom, at a second stage output means thereof; and said method further comprising the steps of:
B) entering a first logarithmic signature to said first logarithmic signature containing storage means, and entering a data key to said data key expanding pseudo-random number generator means for accepting a user provided input data key;
C) entering at least one input vector into said primary factorization means, via said means for receiving input binary digit vectors; and
D) outputting a twice encrypted vector, of length L, version of said at least one input vector, of length L, input to said vector accepting means for receiving input binary digit vectors, at said second stage output means.

13. A method of encrypting input vectors of length L, and outputting encrypted vectors of length L, each of which input and output vectors consists of a sequential plurality of binary digits, said method comprising the steps of:
A) providing an electronic system for receiving input vectors of length L, and outputting encrypted vectors of length L, each of which input and output vectors consists of a sequential plurality of binary digits, said system comprising:
A1) a system for receiving input vectors, of length L, and outputting encrypted vector, of length L, versions of said input vectors, each of said input and output vectors consisting of a sequential plurality of binary digits, said system comprising, in functional combination:
a) a vector accepting means for receiving input binary digit vectors; and
b) a data key expanding pseudo-random number generator means for accepting a user provided input data key, and generating and outputting a data key dependent sequence of pseudo-random numbers; and
c) a first logarithmic signature containing storage means which comprises memory for containing a first logarithmic signature, said first logarithmic signature consisting of a plurality of mathematical construct blocks, each of said mathematical construct blocks containing at least two permutations of a sequential plurality of numbers; and
d) a second logarithmic signature containing storage means which comprises memory for containing a second logarithmic signature, said second logarithmic signature consisting of a plurality of mathematical construct blocks, each of said mathematical construct blocks containing at least two permutations of a sequential plurality of numbers;
wherein said first and second logarithmic signatures are characterized by a requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and
e) a primary mathematical operations means which comprises:
means for accepting a sequence of pseudo-random numbers;
means for accessing said first logarithmic signature containing storage means;
means for accessing said second logarithmic signature containing storage means; and
means for applying a sequence of pseudo-random numbers to a first logarithmic signature, said first logarithmic signature being stored in said first logarithmic signature containing storage means, and producing at least a second logarithmic signature, and storing it in said second logarithmic signature containing storage means; and
f) a primary composition means which comprises means for identifying, accessing and sequentially multiplying a plurality of permutations, of a sequential plurality of binary digits, in a second logarithmic signature stored in said second logarithmic signature containing storage means, to provide a primary composition means out put vector;
said system being functionally structured such that inputting a user defined data key to said data key expanding pseudo-random number generator means, results in said data key expanding pseudo-random number generator means outputting a sequence of pseudo-random numbers in response; and
said system being further functionally structured such that after receipt of a sequence of pseudo-random numbers by said primary mathematical operations means, mathematical manipulation of a first logarithmic signature stored in said first logarithmic signature containing storage means is performed to form a second logarithmic signature which is then stored in said second logarithmic signature containing storage means, while preserving the requirement that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after entering at least one input vector to said primary composition means from said vector accepting means for receiving input binary digit vectors, said primary composition means identifies a permutation in each of said mathematical construct blocks of said second logarithmic signature, stored in said second logarithmic signature containing storage means; and said system being further functionally structured such that said identified permutations in each of said mathematical construct blocks of said second logarithmic signature, stored in said second logarithmic signature containing storage means, are then caused to be sequentially multiplied in said primary composition means; and said system being further functionally structured such that said primary composition means makes the results of said sequential multiplication available, as a once encrypted vector, of length L, version of said at least one input vector, of length L, entered to said vector accepting means for receiving input binary digit vectors, as output therefrom, at an output means thereof; and said electronic system for receiving input vectors of length L, and outputting encrypted vectors of length L, each of which input and output vectors consists of a sequential plurality of binary digits, further comprising additional structure selected from the group consisting of A2 and A3 in which said A2 and A3 are:

A2) said system for receiving input vectors of length L, and outputting encrypted vectors of length L, as described supra in A1, which further functionally comprises:

g.) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and h.) a factorization means for identifying, accessing and concatenating into a factorization means output vector, binary pointers which identify locations of permutations in a third logarithmic signature stored in said third logarithmic signature containing storage means, which permutations, when sequentially composed, duplicate a vector caused to be input into said factorization means;

said system being functionally structured such that after inputting a sequence of pseudo-random numbers produced by said pseudo--random number generator means to a selection from the group consisting of:
  said primary mathematical operations means; and
  a mathematical operations means other than said primary mathematical operations means which is functionally equivalent to said primary mathematical operations means;

which selection comprises:
  means for accepting a sequence of pseudo-random numbers;
  means for accessing said first logarithmic signature containing storage means;
  means for accessing said third logarithmic signature containing storage means; and
  means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;

said selection performs mathematical manipulation of a first logarithmic signature stored in said first logarithmic signature containing storage means to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of,
  said once encrypted vector version of at least one input vector output by said primary composition means,
to said factorization means, said once encrypted vector version of at least one input vector output by said primary composition means is applied to said third logarithmic signature stored in said third logarithmic signature containing storage means, and permutations present in said mathematical construct blocks of said third logarithmic signature are identified which when sequentially composed result in said at least one once encrypted vector, of length L, version input thereto from said primary composition means; and said system being further functionally structured such that said factorization means further assigns identified permutations in each of said mathematical construct blocks of said third logarithmic signature stored in said third logarithmic signature containing storage means, a binary digit pointer which identifies the permutation location within said third logarithmic signature, and said system being further functionally structured such that said factorization means further sequentially concatenates said identified binary digit location pointers into a twice encrypted vector, of length L, version of said at least one input vector, of length L, input to said vector accepting means for receiving input binary digit vectors, and makes said twice encrypted vector, of length L, version of said at least one input vector, of length L, entered to said vector accepting means for receiving input binary digit vectors, available as output therefrom, at a second stage output means thereof; and A3) said system for receiving input vectors of length L, and outputting encrypted vectors of length L, as described supra in A1, which further functionally comprises:

a) a third logarithmic signature containing storage means which comprises memory for containing a third logarithmic signature, said third logarithmic signature consisting of a plurality of mathematical construct blocks, each of said mathematical construct blocks containing at least two permutations of a sequential plurality of numbers;

wherein said third logarithmic signature is characterized by the requirement that logarithmic signatures be a collection of ordered mathematical construct blocks in which each input vector encrypted by utilization thereof can be uniquely represented as one, and only one, composition of permutations which are present in said logarithmic signature, one such permutation subjected to composition being selected from each of said ordered mathematical construct blocks; and b) a secondary composition means which comprises means for identifying, accessing and sequentially multiplying a plurality of permutations, of a sequential plurality of binary digits, in a third logarithmic signature stored in said third logarithmic signature containing storage means, to provide a secondary composition means output vector;

said system being functionally structured such that after inputting a sequence of pseudo-random numbers produced by said pseudo-random number generator means to a selection from said group consisting of:
  said primary mathematical operations means; and
  a mathematical operations means other than said primary mathematical operations means which is functionally equivalent to said primary mathematical operations means which selection comprises:
  means for accepting a sequence of pseudo-random numbers;
  means for accessing said first logarithmic signature containing storage means;
  means for accessing said third logarithmic signature containing storage means; and
  means for applying a sequence of pseudo-random numbers to a first logarithmic signature, said first logarithmic signature being stored in said first logarithmic signature containing storage means, and producing a third logarithmic signature, and storing it in said third logarithmic signature containing storage means;

said selection performs mathematical manipulation of a first logarithmic signature stored in said first logarithmic signature containing storage means, to form a third logarithmic signature, said third logarithmic signature being non-identical to said second logarithmic signature, and which third logarithmic signature is then stored in said third logarithmic signature containing storage means, while preserving the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation subjected to composition being selected from each of said ordered mathematical construct blocks; and said system being further functionally structured such that after the entering of,
  said once encrypted vector, of length L, version of at least one input vector, of length L, output by said primary composition means,
to said secondary composition means, said once encrypted vector version of at least one input vector output by said primary composition means is applied to said third logarithmic signature stored in said third logarithmic signature containing storage means, such that a permutation in each of said mathematical construct blocks of said third logarithmic signature is identified; and said system being further functionally structured such that said identified permutations in each of said mathematical construct blocks of said third logarithmic signature are then caused to be sequentially multiplied in said composition means, and said system being further functionally structured such that said secondary composition means makes the results of said sequential multiplication available as a twice encrypted vector, of length L, version of said at least one input vector, of length L, entered to said vector accepting means for receiving input binary digit vectors, as output therefrom, at a second stage output means thereof; and said method further comprising the steps of:

B) entering a first logarithmic signature to said first logarithmic signature containing storage means, and entering a data key to said data key expanding pseudo-random number generator means for accepting a user provided input data key;

C) entering at least one input vector into said primary composition means, via said means for receiving input binary digit vectors; and D) outputting a twice encrypted vector, of length L, version of said at least one input vector, of length L, input to said vector accepting means for receiving input binary digit vectors, at said second stage output means.

14. A method as in claim 12 in which the step of providing an electronic system for receiving input vectors of length L, and outputting encrypted vectors of length L, each of which input and output vectors consists of a sequential plurality of binary digits, includes providing:

first, second and third logarithmic signature containing storage means which each physically comprise computer memory, and primary mathematical operations means and primary factorization means and data key expanding pseudo-random number generator means which all physically comprise computer software driven computer system hardware.

15. A method as in claim 13 in which the step of providing an electronic system for receiving input vectors of length L, and outputting encrypted vectors of length L, each of which input and output vectors consists of a sequential plurality of binary digits, includes providing:

first, second and third logarithmic signature containing storage means which each physically comprise computer memory, and primary mathematical operations means and primary composition means, and said data key expanding pseudo-random number generator means all physically comprise computer software driven computer system hardware.

16. A method as in claim 10 or 12, in which the step of providing an electronic system for receiving input vectors of length L, and outputting encrypted vectors of length L, each of which input and output vectors consists of a sequential plurality of binary digits, includes providing:

a primary factorization means which functionally comprises a decomposition means with the operational property that an output vector produced thereby and made present at an output means thereof is a product of a first vector input thereto at a first input means thereof and a reverse bit order inverse of a second vector input thereto at a second input means thereof; an input to said factorization means being capable of accessing, via a feedback means, said output means;

such that repeated application is made thereof in which, at each application after the first, the output of said primary factorization means produced at said output means thereof by a previous application, is input to said first input means thereof simultaneous with input of an inverted is reverse bit ordered vector, to said second input means.

17. A method as in claim 11 or 13, in which the step of providing an electronic system for receiving input vectors of length L, and outputting encrypted vectors of length L, each of which input and output vectors consists of a sequential plurality of binary digits, includes providing:

a primary composition means which functionally comprises a multiplier means with the operational property that an output vector produced thereby and made present at an output means thereof is a product of a first vector input thereto and of a second vector input thereto,; an input to said primary composition means being capable of accessing, via a feedback means, said output means;

such that repeated application is made thereof in which, at each application after the first, the output of said multiplier means produced at said output means thereof by a previous application, is input to said first input means thereof simultaneous with input of a vector to said second input means which is to be multiplied by said vector input to said first input means.

18. A method as in claim 10, 11, 12 or 13, in which the step of entering a first logarithmic signature to said first logarithmic signature containing storage means includes forming said first logarithmic signature by a process of:

a) defining a vector $I_s=(1,2,3, \ldots ,2^s)$;
   b) defining a vector $\hat{I}_s(2^2+I_2)$;
   c) defining an array $$J_1 = \begin{bmatrix} 1 & 2 \\ 1 & 2 \end{bmatrix}$$

d) defining an array $$\hat{J}_1 = \begin{bmatrix} 3 & 4 \\ 3 & 4 \end{bmatrix}$$

e) defining logarithmic signatures $$\alpha_1 = \begin{bmatrix} 1 & 2 \\ 2 & 1 \end{bmatrix}$$

and $$\hat{\alpha}_1 = \begin{bmatrix} 3 & 4 \\ 4 & 3 \end{bmatrix}$$

each of strength 1;

f) utilizing the above defined $I_s$, $\hat{I}_s$, $J_1$, $\hat{J}_1$, $\alpha_1$ and $\hat{\alpha}_1$ in a recursive manner to construct additional first logarithmic signatures of increasing strengths:

$\alpha_s$: 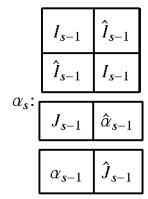

where the recursively progressing α's of increasing strengths s are the first logarithmic signature.

19. A method as in claim 18, in which the step of entering a first logarithmic signature to said first logarithmic signature containing storage means includes in the step of forming said first logarithmic signature, the forming of:

a first logarithmic signature of strength S, where s is an integer, in which, an input vector input to said vector accepting means for receiving input binary digit vectors consists of a plurality sequence of binary digits of length $L=2^s-1$.

20. A method as in claim 10, 11, 12, or 13, in which the step of entering a data key to said data key expanding pseudo-random number generator means for accepting a user provided input data key includes the step of providing a data key expanding pseudo-random number generator which comprises providing:

a fourth logarithmic signature and a fifth logarithmic signature in fourth logarithmic signature containing storage and fifth logarithmic signature containing storage means, respectively;

such that when a user provided data key is input to said pseudo-random number generator means and applied to said fourth logarithmic signature, by a procedure involving a selection from the group consisting of:
   factorization; and
   composition;

a first encrypted version of said data key is produced, and such that said first encrypted version of said data key is applied to said fifth logarithmic signature, by a procedure involving a selection independently selected from the group consisting of:
   factorization; and
   composition);

to produce a second encrypted version of said data key is produced, said second encrypted version of said data key being an expanded data key dependent sequence of pseudo-random numbers.

21. A method as in claim 10, 11, 12, or 13, in which the step of providing an electronic system for receiving input vectors, of length L, and outputting encrypted vector, of length L, versions of said input vectors, of length L, each of which input and output vectors consists of a sequential plurality of binary digits, includes providing a primary mathematical operations means which accesses said first logarithmic signature and produces said second logarithmic signature therefrom; wherein said primary mathematical operations means comprises means for performing at least one mathematical operation selection from the group functionally consisting of:

1) commutation shuffle;
2) fusion procedure;
3) randomization procedure; and
4) permutation shuffle;

A) wherein said commutation shuffle comprises the steps of:
  a) identifying at least one pair of adjacent mathematical construct blocks in said first logarithmic signature, in which permutations in one said mathematical construct block commute with permutations in the adjacent mathematical construct block in that the same product result is achieved when said permutations are multiplied together regardless of an order in which said pair of permutations are multiplied together; and
further proceed to:
  interchange the positions of said identified adjacent mathematical construct blocks in said first logarithmic signature or leave the positions of said identified adjacent permutations unchanged in said first logarithmic signature; and
  b) optionally repeating step a; and B) wherein said fusion procedure comprises the steps of:
  identifying at least one sequential grouping of mathematical construct blocks in said first logarithmic signature, each of which mathematical construct blocks contains two permutations of a sequential plurality of numbers;
  from each of said at least one sequential grouping of mathematical construct blocks in said first logarithmic signature forming and adding a separate mathematical construct block which contains more than two permutations of a sequential plurality of numbers;
such that the resulting logarithmic signature does not then consist entirely of a plurality of mathematical construct blocks each of which contain only two permutations of a sequential plurality of numbers, but rather consists of a number of mathematical construct blocks, some of which have more than two permutations therein; and C) wherein said randomization procedure comprises the steps of:
  a) selecting a mathematical construct block in a logarithmic signature which consists of a plurality of mathematical construct blocks, said selected mathematical construct block consisting of at least two permutations of a sequential plurality of numbers, then selecting a permutation therein;
  then for said selected permutation selecting permutation(s), one each, from at least one alternative, other, mathematical construct block located below said selected mathematical counstruct block in said logarithmic signature;
  then multiplying said selected permutations in said selected mathematical construct block and in said alternative, other, mathematical construct blocks together and replacing said selected permutation in said selected mathematical construct block with the result of said multiplication, to form a replacement mathematical construct block for said selected mathematical construct block, and
  b) optionally repeating step a for other permutations in said selected mathematical construct block in said logarithmic signature; and
  then replacing said selected mathematical construct block in said logarithmic signature with said replacement mathematical construct block; and
  c) repeating step a but selecting an alternative, other, mathematical construct block in said logarithmic signature to be the selected mathematical construct block than was selected in the first application of step a; and
  then replacing said selected alternative, other, mathematical construct block in said logarithmic signature with said replacement mathematical construct block; and D) wherein said permutation shuffle comprises the step(s) of:
  a. identifying at least one pair of permutations in a selected mathematical construct block in a logarithmic signature, and optionally proceed to reverse the positions of said identified permutations in said mathematical construct block; and
  b) optionally repeating step a for other permutation pairs in said selected mathematical construct block in said logarithmic signature; and
  c) optionally repeating step a but modified by the selection of an alternative, other, mathematical construct block in said logarithmic signature;

in which said electronic system for receiving input vectors of length L, and outputting encrypted vectors of length L, each of which input and output vectors consists of a sequential plurality of binary digits, is further structured so that any of said:

1) commutation shuffle;
2) fusion procedure;
3) randomization procedure; and
4) permutation shuffle;

is/are performed only if, and only in a sequence, which provides that the property of logarithmic signatures requiring that logarithmic signatures be a collection of ordered mathematical construct blocks in which each input vector encrypted by utilization thereof can be uniquely represented as one, and only one composition of permutations which are present in said logarithmic signature, one such permutation being composed being selected from each of said logarithmic signature ordered mathematical construct blocks, is preserved.

22. A method as in claim 10, 11, 12, or 13, wherein the step of entering at least one input vector, via said means for receiving input binary digit vectors; involves entering at least one compact form binary vector of length $L=2^n-1$, which compact form binary vector represent elements of a carrier group of permutations which is a Sylow-2 subgroup of a full symmetric group of degree $2^n$, said carrier group being of size $_2(2^n-1)$.

23. A system for receiving input vectors, of length L, and outputting encrypted vector, of length L, versions of said input vectors each of said input and output vectors consisting of a sequential plurality of binary digits, which system can also be used as a pseudo-random number generator means, said system functionally comprising a first logarithmic signature containing storage means and a second logarithmic signature containing storage means for containing first and second logarithmic signatures, respectively; said first and second logarithmic signature containing storage means having first and second non-identical logarithmic signatures, respectively, stored therewithin; logarithmic signatures being a collection of ordered mathematical construct blocks in which each input vector data key encrypted by utilization thereof can be uniquely represented as one, and only one composition of permutations which are present in said logarithmic signature, one such permutation being composed being selected from each of said logarithmic signature ordered mathematical construct blocks; and a vector data input means for inputting a user provided input vector data key thereinto;

said system being functionally structured such that after inputting a user provided input vector/data key thereto at said vector/data input means, said system for receiving input vectors and outputting encrypted vector versions of said input vectors each of said input and output vectors consisting of a sequential plurality of binary digits, said first logarithmic signature stored in said first logarithmic signature containing storage means is utilized in a procedure selected from the group consisting of:
    factorization; and
    composition, so that a once encrypted version of said user provided input vector data key is produced; and such that said once encrypted version of said input vector data key is then applied to said second logarithmic signature stored in said second logarithmic signature containing storage means by a procedure selected independently selected from the group consisting of:
    factorization; and
    composition;

so that a twice encrypted version of said input vector data key is produced.

24. A system as in claim 23;

wherein said system is further functionally structured such that said first logarithmic signature is produced by a procedure comprising the steps of:
    a) defining a vector $I_s=(1,2,3,\ldots,2^2)$;
    b) defining a vector $\hat{I}_s=(2^s+I_s)$;
    c) defining an array $$J_1 = \begin{bmatrix} 1 & 2 \\ 1 & 2 \end{bmatrix}$$

d) defining an array $$\hat{J}_1 = \begin{bmatrix} 3 & 4 \\ 3 & 4 \end{bmatrix}$$

e) defining logarithmic signatures $$\alpha_1 = \begin{bmatrix} 1 & 2 \\ 2 & 1 \end{bmatrix}$$

and $$\hat{\alpha}_1 = \begin{bmatrix} 3 & 4 \\ 4 & 3 \end{bmatrix}$$

each of strength 1;

f) utilizing the above defined $I_s$, $\hat{I}_s$, $J_1$, $\hat{J}_1$, $\alpha_1$ and $\hat{\alpha}_1$ in a recursive manner to construct additional first logarithmic signatures of increasing strengths:

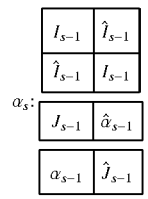

where the recursively progressing $\alpha$'s of increasing strengths s are the first logarithmic signature.

25. A system as in claim 24 wherein said system is further functionally structured such that after inputting a user provided input vector data key thereto at said vector/data input means, said first logarithmic signature is optionally further developed, and said second logarithmic signature is developed by applying mathematical manipulation to said first logarithmic signature, said mathematical manipulation comprising at least one mathematical operation selection from the group consisting of:
    1) commutation shuffle;
    2) fusion procedure;
    3) randomization procedure; and
    4) permutation shuffle;

A) wherein said commutation shuffle comprises the steps of:
    a) identifying at least one pair of adjacent mathematical construct blocks in said first logarithmic signature, in which permutations in one said mathematical construct block commute with permutations in the adjacent mathematical construct block in that the same product result is achieved when said permutations are multiplied together regardless of an order in which said pair of permutations are multiplied together; and further proceed to:
    interchange the positions of said identified adjacent mathematical construct blocks in said first logarithmic signature or leave the positions of said identified adjacent permutations unchanged in said first logarithmic signature; and
    b) optionally repeating step a; and B) wherein said fusion procedure comprises the steps of:
    identifying at least one sequential grouping of math ematical construct blocks in said first logarithmic signature, each of which mathematical construct blocks contains two permutations of a sequential plurality of numbers;

from each of said at least one sequential grouping of mathematical construct blocks in said first logarithmic signature forming and adding a separate mathematical construct block which contains more than two permutations of a sequential plurality of numbers;

such that the resulting logarithmic signature does not then consist entirely of a plurality of mathematical construct blocks each of which contain only two permutations of a sequential plurality of numbers, but rather consists of a number of mathematical construct blocks, some of which have more than two permutations therein; and C) wherein said randomization procedure comprises the steps of:

a) selecting a mathematical construct block in a logarithmic signature which consists of a plurality of mathematical construct blocks, said selected mathematical construct block consisting of at least two permutations of a sequential plurality of numbers, then selecting a permutation therein;

then for said selected permutation selecting permutation(s), one each, from at least one alternative, other, mathematical construct block located below said selected mathematical construct block in said logarithmic signature;

then multiplying said selected permutations in said selected mathematical construct block and in said alternative, other, mathematical construct blocks together and replacing said selected permutation in said selected mathematical construct block with the result of said multiplication, to form a replacement mathematical construct block for said selected mathematical construct block, and b) optionally repeating step a for other permutations in said selected mathematical construct block in said logarithmic signature; and then replacing said selected mathematical construct block in said logarithmic signature with said replacement mathematical construct block; and c. repeating step a but selecting an alternative, other, mathematical construct block in said logarithmic signature to be the selected mathematical construct block than was selected in the first application of step a; and then replacing said selected alternative, other, mathematical construct block in said logarithmic signature with said replacement mathematical construct block; and D) wherein said permutation shuffle comprises the step(s) of:

a. identifying at least one pair of permutations in a selected mathematical construct block in a logarithmic signature, and optionally proceed to reverse the positions of said identified permutations in said mathematical construct block; and b) optionally repeating step a for other permutation pairs in said selected mathematical construct block in said logarithmic signature; and c) optionally repeating step a but modified by the selection of an alternative, other, mathematical construct block in said logarithmic signature;

any of said:
1) commutation shuffle;
2) fusion procedure;
3) randomization procedure; and
4) permutation shuffle;

being performed being performed only if, and only in a sequence, which provides that the property of logarithmic signatures requiring that logarithmic signatures be a collection of ordered mathematical construct blocks in which each input vector data key encrypted by utilization thereof can be uniquely represented as one, and only one composition of permutations which are present in said logarithmic signature, one such permutation being composed being selected from each of said logarithmic signature ordered mathematical construct blocks, is preserved.

* * * * *